(12) United States Patent
Yoshida

(10) Patent No.: US 9,454,262 B2
(45) Date of Patent: *Sep. 27, 2016

(54) INFORMATION OUTPUT DEVICE

(71) Applicant: IP SOLUTIONS INC., Chyoda-ku, Tokyo (JP)

(72) Inventor: Kenji Yoshida, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/043,792

(22) Filed: Oct. 1, 2013

(65) Prior Publication Data
US 2014/0098066 A1    Apr. 10, 2014

Related U.S. Application Data

(63) Continuation of application No. 12/440,011, filed as application No. PCT/JP2007/067555 on Sep. 4, 2007, now Pat. No. 8,547,346.

(30) Foreign Application Priority Data

Sep. 4, 2006   (JP) ................. 2006-239593
Feb. 5, 2007   (JP) ................. 2007-025669

(51) Int. Cl.
  G06F 3/042    (2006.01)
  A63F 13/98    (2014.01)
  G06F 3/03     (2006.01)

(52) U.S. Cl.
  CPC ............ *G06F 3/0425* (2013.01); *A63F 13/02* (2013.01); *G06F 3/0321* (2013.01); *G06F 3/0421* (2013.01); *G06F 3/0428* (2013.01); *A63F 2300/1068* (2013.01)

(58) Field of Classification Search
  CPC .................................................... G06F 3/042
  USPC ....... 345/104, 173, 178, 589, 619; 358/1.15, 358/1.18, 537, 458, 452, 453; 235/439, 235/472.01, 380, 494, 454, 462.1; 348/46, 348/E13.07; 715/224; 382/100, 175
  See application file for complete search history.

(56) References Cited

U.S. PATENT DOCUMENTS 3,279,826 A   10/1966   Rudershausen et al.
3,821,518 A    6/1974   Miller
(Continued)

FOREIGN PATENT DOCUMENTS

EP    1319430 A     6/2003
JP    56-166544 A  12/1981
(Continued)

OTHER PUBLICATIONS

Ullmer, Brygg, et. al., "The metaDESK: Models and Prototypes for Tangible User Interfaces", UIST '97. 10th Annual Symposium on User Interface Software and Technology. Proceedings of the ACM Symposium on User Interface and Technology. Banff, Alberta, Canada, Oct. 14-17, 1997; [ACM Symposium on User Interface Software and Technology, Oct. 14, 1997, pp. 223-232, XP008123713, ISBN: 978-0-89791-881-7, ACM, Inc., Banff, Canada.
(Continued)

*Primary Examiner* — Prabodh M Dharia
(74) *Attorney, Agent, or Firm* — Westerman, Hattori, Daniels & Adrian, LLP

(57) ABSTRACT

Recognition of a player's touch on a surface of a medium is made possible, as well as recognition of the medium such as a card by a dot pattern printed on a back surface of the medium placed on a stage. Input instructions according to each feature of a game or information processing device are made possible just by preparing a card on which a region for a touch operation is printed, by making possible recognition of a player's touch on a surface of a medium, as well as recognition of the medium such as a card by a dot pattern printed on a back surface of the medium placed on a stage, calculating where on a card placed on the stage is touched, and causing to perform a process according to a feature of the card.

36 Claims, 47 Drawing Sheets

(56) References Cited

U.S. PATENT DOCUMENTS

| | | | |
|---|---|---|---|
| 5,506,395 | A | 4/1996 | Eppley |
| 5,892,846 | A | 4/1999 | Davis |
| 6,119,937 | A | 9/2000 | Wang et al. |
| 6,446,866 | B1 | 9/2002 | Tatsuta |
| 6,587,591 | B1 | 7/2003 | Matsui |
| 6,983,886 | B2 | 1/2006 | Natsukari |
| 7,100,821 | B2 | 9/2006 | Rasti |
| 7,234,645 | B2 | 6/2007 | Silverbrook et al. |
| 7,475,824 | B2 | 1/2009 | Yoshida |
| 7,592,901 | B2* | 9/2009 | Furusho ............ 340/407.1 |
| 7,920,102 | B2 | 4/2011 | Breed |
| 7,967,217 | B2* | 6/2011 | Yoshida ............ 235/494 |
| 2003/0117371 | A1 | 6/2003 | Roberts et al. |
| 2003/0132913 | A1 | 7/2003 | Issinski |
| 2003/0171142 | A1 | 9/2003 | Kaji |
| 2004/0046024 | A1 | 3/2004 | Natsukari et al. |
| 2004/0160430 | A1 | 8/2004 | Tokunaga et al. |
| 2005/0187018 | A1 | 8/2005 | Takeda et al. |
| 2005/0245302 | A1 | 11/2005 | Bathiche et al. |
| 2006/0038009 | A1* | 2/2006 | Russell et al. ............ 235/383 |
| 2006/0154559 | A1* | 7/2006 | Yoshida ............ 446/297 |
| 2006/0155619 | A1* | 7/2006 | Rhiando et al. ............ 705/35 |
| 2007/0290043 | A1* | 12/2007 | Russell et al. ............ 235/462.14 |
| 2008/0029599 | A1 | 2/2008 | Tskos et al. |
| 2008/0240565 | A1 | 10/2008 | Kitazaki |
| 2008/0253608 | A1* | 10/2008 | Long et al. ............ 382/100 |
| 2010/0121737 | A1 | 5/2010 | Yoshida |
| 2011/0011925 | A1* | 1/2011 | Yoshida ............ G08C 19/28 235/375 |
| 2011/0049234 | A1* | 3/2011 | Yoshida ............ G06F 3/0317 235/380 |
| 2011/0109641 | A1 | 5/2011 | Yoshida |
| 2011/0187832 | A1 | 8/2011 | Yoshida |
| 2011/0188071 | A1* | 8/2011 | Yoshida ............ G06F 3/03545 358/1.15 |

FOREIGN PATENT DOCUMENTS

| | | |
|---|---|---|
| JP | 2-226323 A | 9/1990 |
| JP | 2005-46649 A | 2/2005 |
| JP | 2005-275599 A | 10/2005 |
| JP | 2005-276139 A | 10/2005 |
| JP | 2006-190270 A | 7/2006 |
| WO | 2004091956 A2 | 10/2004 |

OTHER PUBLICATIONS

Supplementary European Search Report for EP 07806987, Dec. 3, 2012. 10 pages.

International Search Report for PCT/JP2007/067555, Nov. 20, 2007. 4 pages.

* cited by examiner

| $C_{31}$ | $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ | $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|---|---|---|---|---|---|---|---|---|---|---|---|---|---|---|---|
| PARITY | | | | CONTROL CODE | | | 00 | COMPANY CODE | | | | | | | | | | | | | | | | DATA REGION 8bit | | | | | | | |
| | | | | | | | 01 | COMPANY CODE | | | | | | | | | | | | | | | | DATA REGION 12bit | | | | | | | |
| | | | | | | | 10 | COMPANY CODE | | | | | | | | | | | | | | | | DATA REGION 16bit | | | | | | | |
| | | | | | | | 11 | COMPANY CODE | | | | | | | | | DATA REGION 20bit | | | | | | | | | | | | | | |

FIG. 5

FIG. 10A
00100001
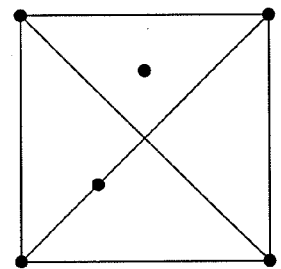
FIG. 10B
00100001
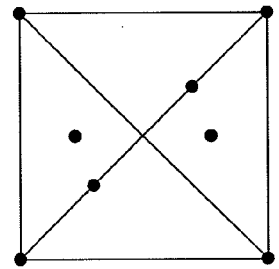
FIG. 10C
00100001
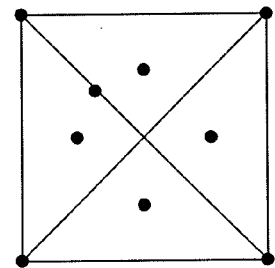
FIG. 11A
| $I_3$ | $I_4$ | $I_5$ |
| --- | --- | --- |
| $I_2$ | $I_1$ | $I_6$ |
2 × 3
FIG. 11B
| $I_3$ | $I_4$ | $I_5$ |
| --- | --- | --- |
| $I_2$ | $I_1$ | $I_6$ |
| $I_9$ | $I_8$ | $I_7$ |
3 × 3
FIG. 11C
| $I_5$ | $I_6$ | $I_7$ |
| --- | --- | --- |
| $I_4$ | $I_1$ | $I_8$ |
| $I_3$ | $I_2$ | $I_9$ |
| $I_{12}$ | $I_{11}$ | $I_{10}$ |
3 × 4
FIG. 11D
| $I_{36}$ | $I_{17}$ | $I_{18}$ | $I_{19}$ | $I_{20}$ | $I_{21}$ |
| --- | --- | --- | --- | --- | --- |
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |
6 × 6

SENSORS ARE DISPOSED SO THAT THEY CAN READ CODES WITHOUT FAIL WHEREVER CARDS MAY BE PLACED.

| $C_0$ | OPERATION CODE |
| --- | --- |
| $C_1$ | |
| $C_2$ | |
| $C_3$ | |
| $C_4$ | |
| $C_5$ | |
| $C_6$ | CONTENT/APPLICATION CODE |
| $C_7$ | |
| $C_8$ | |
| $C_9$ | |
| $C_{10}$ | |
| $C_{11}$ | |
| $C_{12}$ | |
| $C_{13}$ | |
| $C_{14}$ | |
| $C_{15}$ | |
| $C_{16}$ | PARITY |
| $C_{17}$ | |

FIG. 21

CARD

CARD

FIG. 35A
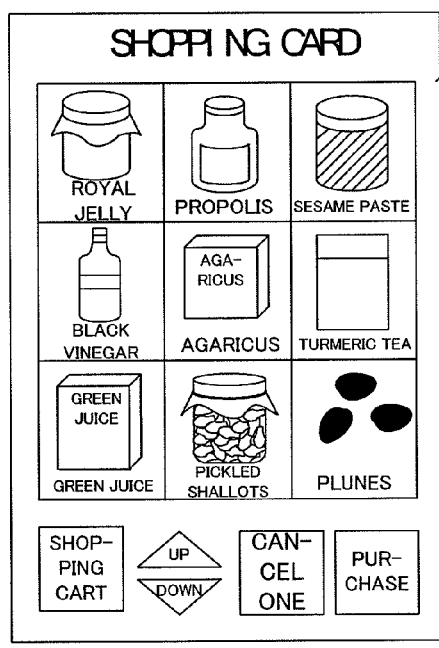
FIG. 35C
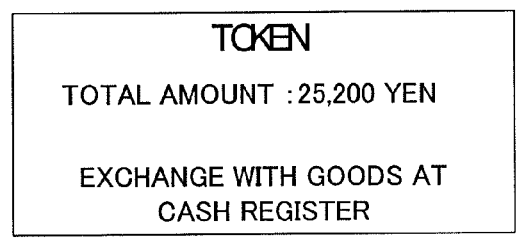
FIG. 35B

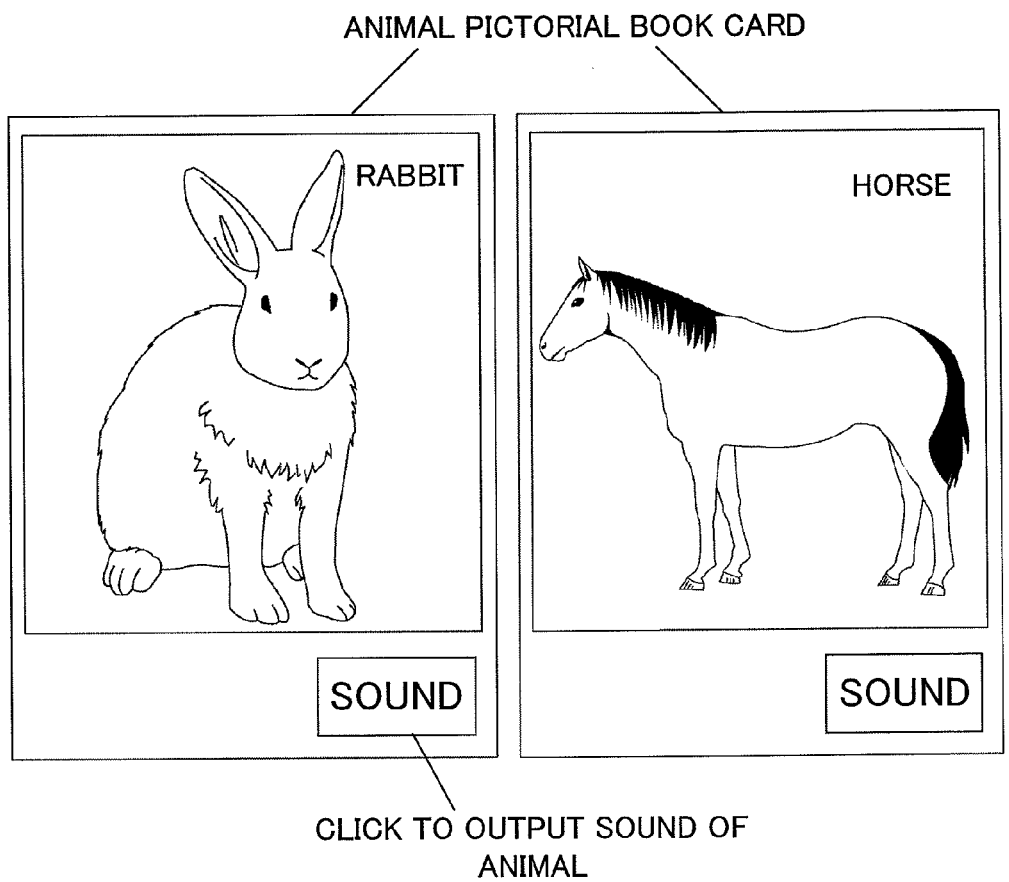

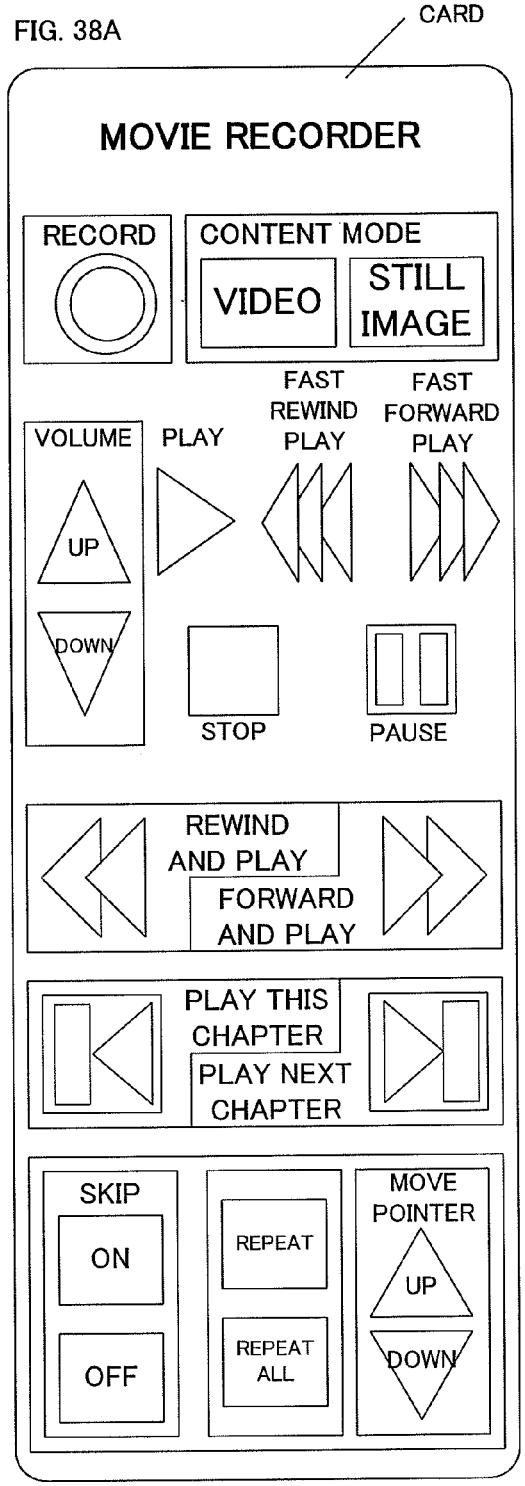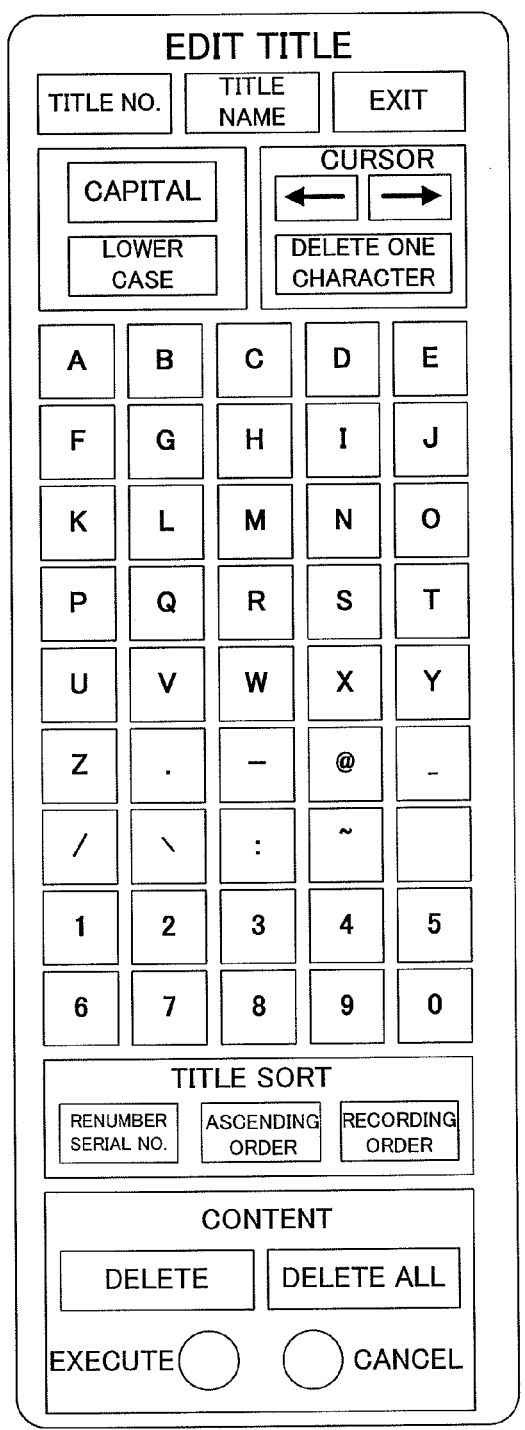

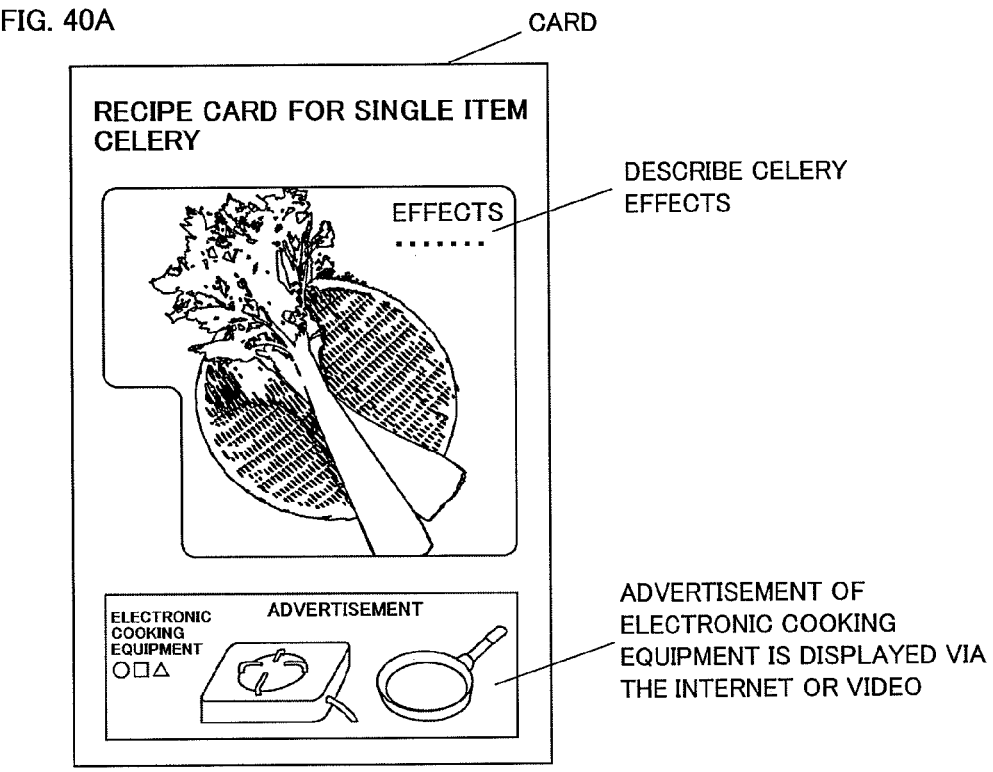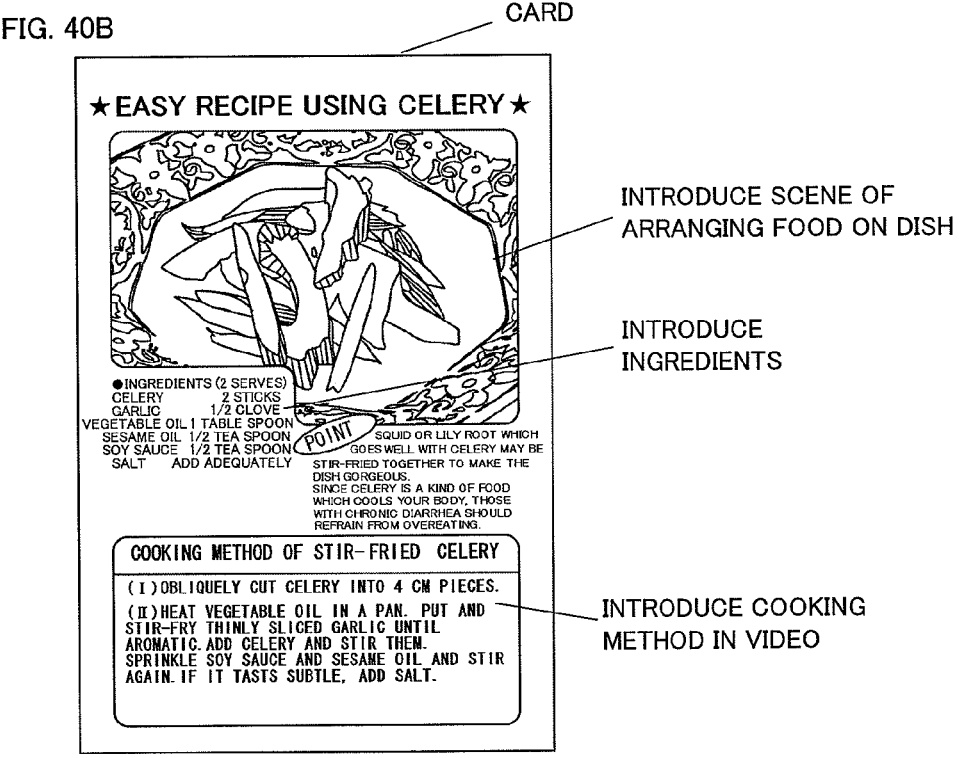

FRONT COVER

MAGAZINE

DOTS ARE ATTACHED ONLY ON BACK COVER

CARD

CARD

FIG. 46A CARD-SLOTTING TYPE
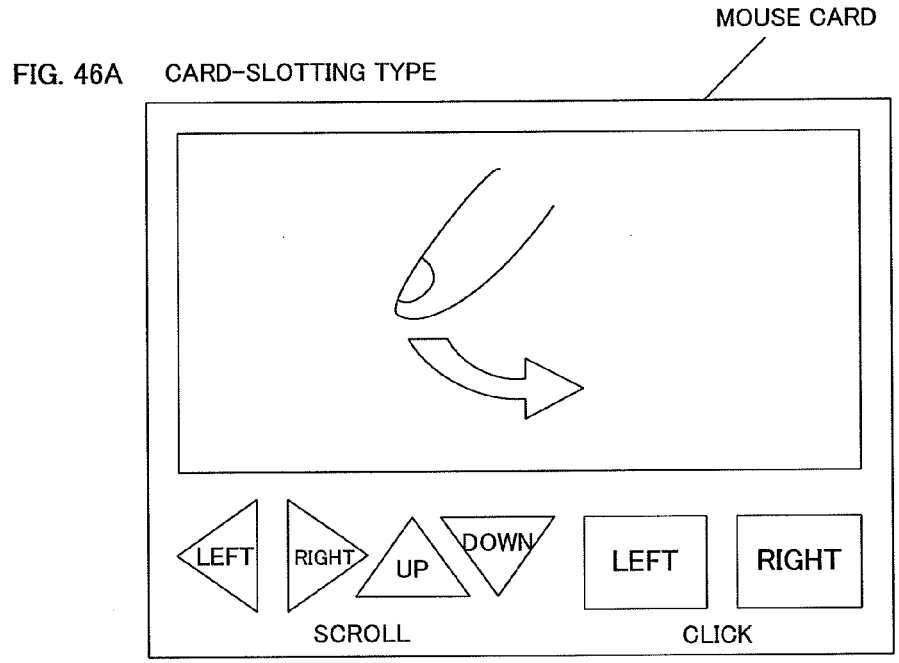
FIG. 46B CARD-PLACING TYPE
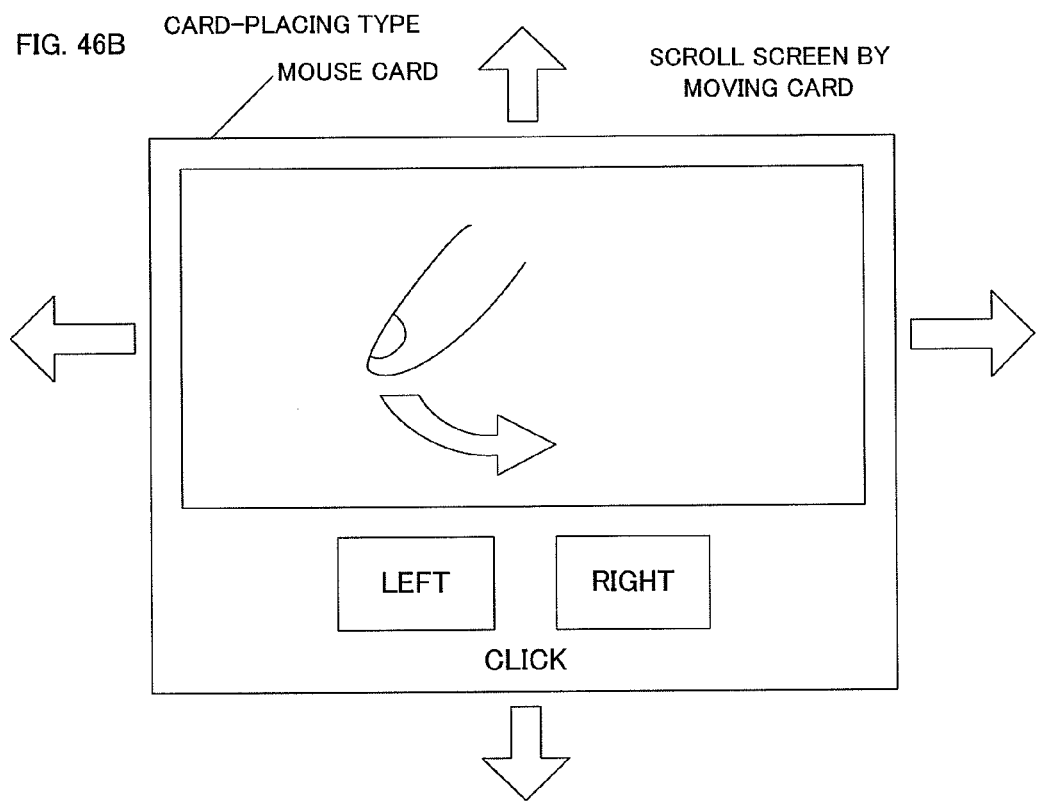

| $_{11}I_1$ | $_{11}I_5$ | $_{11}I_9$ | $_{11}I_{13}$ | $_{12}I_1$ | $_{12}I_5$ | $_{12}I_9$ | $_{12}I_{13}$ |
|---|---|---|---|---|---|---|---|
| $_{11}I_2$ | $_{11}I_6$ | $_{11}I_{10}$ | $_{11}I_{14}$ | $_{12}I_2$ | $_{12}I_6$ | $_{12}I_{10}$ | $_{12}I_{14}$ |
| $_{11}I_3$ | $_{11}I_7$ | $_{11}I_{11}$ | $_{11}I_{15}$ | $_{12}I_3$ | $_{12}I_7$ | $_{12}I_{11}$ | $_{12}I_{15}$ |
| $_{11}I_4$ | $_{11}I_8$ | $_{11}I_{12}$ | $_{11}I_{16}$ | $_{12}I_4$ | $_{12}I_8$ | $_{12}I_{12}$ | $_{12}I_{16}$ |
| $_{21}I_1$ | $_{21}I_5$ | $_{21}I_9$ | $_{21}I_{13}$ | $_{22}I_1$ | $_{22}I_5$ | $_{22}I_9$ | $_{22}I_{13}$ |
| $_{21}I_2$ | $_{21}I_6$ | $_{21}I_{10}$ | $_{21}I_{14}$ | $_{22}I_2$ | $_{22}I_6$ | $_{22}I_{10}$ | $_{22}I_{14}$ |
| $_{21}I_3$ | $_{21}I_7$ | $_{21}I_{11}$ | $_{21}I_{15}$ | $_{22}I_3$ | $_{22}I_7$ | $_{22}I_{11}$ | $_{22}I_{15}$ |
| $_{21}I_4$ | $_{21}I_8$ | $_{21}I_{12}$ | $_{21}I_{16}$ | $_{22}I_4$ | $_{22}I_8$ | $_{22}I_{12}$ | $_{22}I_{16}$ | y-coordinate → x-coordinate → y-coordinate → x-coordinate →

FIG. 51A

| DOT PATTERN (3)<br>X=10<br>Y=21 | DOT PATTERN (4)<br>X=11<br>Y=21 |
|---|---|
| DOT PATTERN (1)<br>X=10<br>Y=20 | DOT PATTERN (2)<br>X=11<br>Y=20 |

FIG. 51B

| | Y COORDINATE | | | | | | | | X COORDINATE | | | | | | | | OPERATION CODE | | | | | | CONTENTS/APPLICATION CODE | | | | | | | | | PARITY | |
|---|---|---|---|---|---|---|---|---|---|---|---|---|---|---|---|---|---|---|---|---|---|---|---|---|---|---|---|---|---|---|---|---|
| | $C_0$ | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | $C_{17}$ | $C_{18}$ | $C_{19}$ | $C_{20}$ | $C_{21}$ | $C_{22}$ | $C_{23}$ | $C_{24}$ | $C_{25}$ | $C_{26}$ | $C_{27}$ | $C_{28}$ | $C_{29}$ | $C_{30}$ | $C_{31}$ |
| (1) | 0 | 0 | 1 | 0 | 1 | 0 | 0 | 0 | 0 | 1 | 0 | 1 | 0 | 0 | 0 | 0 | 0 | 1 | 0 | 1 | 0 | 0 | 0 | 1 | 0 | 0 | 1 | 1 | 0 | 0 | 1 | 1 |
| (2) | 0 | 0 | 1 | 0 | 1 | 0 | 0 | 0 | 1 | 1 | 0 | 1 | 0 | 0 | 0 | 0 | 0 | 1 | 0 | 1 | 0 | 0 | 0 | 1 | 0 | 0 | 1 | 1 | 0 | 0 | 1 | 0 |
| (3) | 1 | 0 | 1 | 0 | 1 | 0 | 0 | 0 | 0 | 1 | 0 | 1 | 0 | 0 | 0 | 0 | 0 | 1 | 0 | 1 | 0 | 0 | 0 | 1 | 0 | 0 | 1 | 1 | 0 | 0 | 1 | 0 |
| (4) | 1 | 0 | 1 | 0 | 1 | 0 | 0 | 0 | 1 | 1 | 0 | 1 | 0 | 0 | 0 | 0 | 0 | 1 | 0 | 1 | 0 | 0 | 0 | 1 | 0 | 0 | 1 | 1 | 0 | 0 | 1 | 1 |

INFORMATION OUTPUT DEVICE

CROSS REFERENCE TO RELATED APPLICATIONS

This application is a continuation application of U.S. patent application Ser. No. 12/440,011 filed on Mar. 4, 2009, now U.S. Pat. No. 8,547,346 on Oct. 1, 2013, and that application is the National Stage of International Application No. PCT/JP/2007/067555, filed on Sep. 4, 2007. The disclosures of U.S. patent application Ser. No. 12/440,011 and International Application No. PCT/JP/2007/067555 are hereby incorporated by reference.

This application is also based on Japanese Patent Application No. 2006-239593 filed on Sep. 4, 2006, and Japanese Patent Application No. 2007-025669 filed on Feb. 5, 2007, the contents of which are also incorporated hereinto by reference.

TECHNICAL FIELD

The present invention relates to a medium having printed thereon a dot pattern and an information output device thereof.

BACKGROUND ART

There is known a game machine installed at a game center or the like, where a card is placed on a stage surface. The game proceeds according to the attributes of such card (JPA-2005-46649).

According to JPA-2005-46649, the stage surface is configured to transmit invisible light. An imaging unit such as an image sensor disposed under the stage reads a code of a particular shape printed on the back surface of the card with invisible ink, thereby causing the game to proceed.

DISCLOSURE OF THE INVENTION

Problem that the Invention is to Solve

However, since the above-described game machine has a simple system of reading a code on the back surface of a card, the game itself does not have entertaining trait. Also, only a design of some character or the like was printed on the front surface of the card.

The present invention was undertaken in consideration of the above problems. When the present invention is used as a game device, ingenuity in designing of stage surface further promotes entertainment trait of the game. Meanwhile, when used as an input interface, the present invention provides an input control instruction system having a flexible interface which enables operations on a printing region of buttons and icons printed on the front surface of the card as well as on a code on the back surface of the card.

Means for Solving the Problem

The present invention has employed the following means to solve the problems.

According to a first aspect of the invention, there is provided an information output device comprising a touch panel chassis having a touch panel on at least one surface thereof, the touch panel having a medium, on which a coordinate value based on a predetermined rule and a dot pattern signifying a code value are printed, placed on the touch panel with a surface on which the dot pattern is printed facing the touch panel, a coordinate recognition unit, disposed on a side of the touch panel, for recognizing, as a coordinate value, a position of a player/operator's fingertip or a position of a pen or three dimensional object on the medium of the touch panel, an imaging unit for imaging the dot pattern of the medium or a portion thereof from a back surface side of the touch panel via an imaging portion disposed on a predetermined location in the touch panel chassis, a control unit for computing the coordinate value, the code value and an orientation signified by the dot pattern based on a captured image by the imaging unit, and for inputting a coordinate information from the coordinate recognition unit of the touch panel, and an output unit for outputting multimedia information such as a text, figure, image, motion picture, or sound information according to a instruction from the control unit, wherein the control unit calculates where on the medium a placing of the player/operator's fingertip or a placing of the pen or three dimensional object is performed, based on the coordinate value and code value of the dot pattern printed on the medium and the orientation of the medium, predetermined location information of the imaging portion, and the coordinate information from the coordinate recognition unit, and the control unit causes the output unit to output the multimedia information which differs depending on the location on the medium calculated.

According to a second aspect of the invention, there is provided an information output device according to the first aspect, wherein the dot pattern printed on the medium has at least the code value, and the medium is fixed at a predetermined location and orientation on the touch panel, wherein the control unit calculates where on the medium a placing of the player/operator's fingertip, an operation, or the three dimensional object is performed, based on the code value of the medium and the coordinate information from the coordinate recognition unit, and the control unit causes the output unit to output the multimedia information which differs depending on the location on the medium calculated.

Further, according to a third aspect of the invention, there is provided an information output device according to the first aspect, wherein the imaging portion in the touch panel chassis is a transmissive portion which transmits irradiation light from an infrared irradiation unit and reflected light thereof, and at least one or two or more of the transmissive portions are provided.

Based on these aspects, an imaging unit reads a dot pattern of a medium, enabling calculation of a location, orientation, and the like of the medium on a touch panel as well as recognizing as coordinates a position of a player/operator's finger tip and a position of a pen operation or three dimensional object. By arithmetically processing these values with the values obtained based on the location and orientation of the card, for example, where on the surface of the card a placing of a player/operator's fingertip or pen operation is performed can be recognized. In this way, a medium (e.g., a card) can be used as your own input interface. In addition, this will be an interface with high flexibility as the medium (card) may be placed at any location on the panel.

Such information output device may realize an input device with a compact input interface connected to a personal computer or the like.

With regard to the medium, a card having a dot pattern printed on the back surface or a figure on which a dot pattern is printed may be possible.

Further, the output unit includes a speaker for outputting sound as well as a display for displaying an image and a motion picture.

According to a forth aspect of the invention, there is provided an information output device comprising a stage chassis having a stage on at least one surface thereof, configured to, after placing a medium, on which back surface a dot pattern based on a predetermined rule is printed, on the stage with the back surface of the medium facing the surface of the stage, read the dot pattern on the back surface of the medium placed at a certain location on the surface of the stage by an imaging unit disposed in a space in the stage chassis, calculate a code value signified by the dot pattern, based on a captured image obtained from the imaging unit, and an orientation of the medium, based on a recognition result of the dot pattern, compute a location of the medium placed on the surface of the stage which is defined by XY coordinates, and output information according to a computing result, wherein, on the stage, a coordinate recognition unit for recognizing a position of a player/operator's fingertip or a position of a pen or three dimensional object with respect to the medium on the stage is provided.

Based on this aspect, since nearly the whole surface of the stage can be read by an imaging unit, a large-scale input interface such as a game for a plurality of persons may be realized.

According to a fifth aspect of the invention, there is provided an information output device according to the forth aspect, wherein, on the stage, a printing with ink which transmits infrared rays is made or a sheet printed with the same ink is removably attached.

Based on this aspect, printing can be made on the stage surface, which permits expressing a world view of a game or the like as well as facilitates a recognition of placing location of a card or the like.

According to a sixth aspect of the invention, there is provided an information output device comprising a control unit for reading, after a medium on which a dot pattern based on a predetermined rule is printed is placed on a stage in a state where the dot pattern faces a surface of the stage, the dot pattern on a back surface of the medium placed at a certain location on the stage by an imaging unit disposed in a stage chassis, calculating a code value signified by the dot pattern, based on a captured image obtained from the imaging unit, and an orientation of the medium, based on a recognition result of the dot pattern, and computing a location of the medium placed on the surface of the stage which is defined by XY coordinates, and an output unit for outputting information according to a computing result, wherein, on the stage, a coordinate recognition unit for recognizing a position of a player/operator's fingertip or a position of a pen or three dimensional object with respect to the medium on the stage as a coordinate value on the stage is provided, wherein a projection unit for projecting a motion picture or an image from a back surface side with respect to the stage is given, wherein the control unit controls the image or the motion picture projected from the back surface side of the stage by the projection unit, by interlocking with a placing of the player/operator's fingertip, a touching with the pen, or a placing of the three dimensional object recognized by the coordinate recognition unit.

Based on this aspect, a motion picture projected on the stage may be controlled by a dot pattern printed on the back surface of a medium such as a card placed on the stage. Moreover, the motion picture can be further modified by performing a touch operation by an operator's fingertip or pen on the surface of the medium such as a card.

According to a seventh aspect of the invention, there is provided an information output device according to any one of the first to sixth aspects, further having a peripheral wall on a periphery of the surface of the touch panel or the stage and a notch portion on part of the peripheral wall so that a medium on the surface of the touch panel or the stage can be retracted from the surface of the touch panel or the stage.

Based on this aspect, removing a card from a touch panel surface or a stage surface may be extremely easy.

According to an eighth aspect of the invention, there is provided an information output device according to the seventh aspect, further having one or a plurality of infrared irradiation elements and one or a plurality of light-receiving elements adjacently disposed one after another to cause the touch panel or the stage to function as a coordinate recognition unit, wherein a location in an X direction or a Y direction on the touch panel or the stage can be recognized by a reception, by the light-receiving elements, of reflected light of infrared light irradiated from the infrared irradiation elements and reflected by a player/operator's fingertip, pen or three dimensional object placed on the touch panel or the stage or on the medium on the touch panel or the stage, and a notch so that the medium on other side of the peripheral wall or on the touch panel or the stage can be retracted from the touch panel or the stage.

Based on this aspect, a location of a fingertip or a pen operation may be recognized even if part of a peripheral wall does not exist.

According to a ninth aspect of the invention, there is provided an information output device according to the seventh aspect, wherein, on sides adjacent to the one side of the peripheral wall, peripheral walls are provided on which infrared irradiation elements or light-receiving elements are disposed respectively, and the peripheral walls enable a recognition of a location in a Y direction or an X direction on the touch panel or the stage, based on the fact that the light-receiving elements on an opposed side do not receive infrared light as irradiated light irradiated from the infrared irradiation elements and blocked by a player/operator's fingertip, pen, or three dimensional object placed on the touch panel or the stage or on the medium placed on the touch panel or the stage.

Based on this aspect, this touch panel is generally configured to have one side of the peripheral wall on which one or a plurality of infrared irradiation elements and light-receiving elements are adjacently disposed one after another and have adjacent sides on which only infrared irradiation elements or light-receiving elements are disposed. Therefore, a side opposed to the one side of the peripheral wall need not be provided and a notch portion can be provided here.

According to a tenth aspect of the invention, there is provided an information output device according to the seventh aspect, wherein a recognition of XY coordinates of a player/operator's fingertip, pen, or three dimensional object on the touch panel or the stage is made possible by providing a pair of infrared imaging devices, which allows the touch panel or the stage to function as a coordinate recognition unit, on both inner ends of one side of a peripheral wall of the touch panel or the stage, and by having a control unit analyze images captured by each of the infrared imaging devices, wherein at least one side of the peripheral wall has the notch portion so that a medium on the touch panel or the stage can be retracted from the touch panel or the stage.

Based on this aspect, XY coordinate values of a fingertip or the like on the touch panel or the stage are calculated using infrared imaging devices, permitting high recognition accuracy and a provision of a notch portion on part of the peripheral wall, which does not affect the captured images of the infrared irradiation devices and facilitates a retraction of a card or the like from a surface of the touch panel or the stage.

According to an eleventh aspect of the invention, there is provided an information output device according to any one of the first to tenth aspects, further having a peripheral wall on a periphery of the touch panel or the stage, embedding a coordinate recognition unit of the touch panel or the stage in the peripheral wall, and comprising a side wall curved from the touch panel or the stage so that a medium on the touch panel or the stage can be retracted from the touch panel or the stage.

Based on this aspect, a card or other media can be easily retracted from the stage surface due to a provision of a curved side wall.

According to a twelfth aspect of the invention, there is provided an information output device according to any one of the first to tenth aspects, further having a peripheral wall on a periphery of the touch panel or the stage, embedding a coordinate recognition unit of the touch panel or the stage on the peripheral wall, and providing a card loading slot on the touch panel or the stage so that a medium can be inserted or retracted therethrough.

Based on this aspect, a card can be inserted or ejected through a card loading slot, facilitating a retraction of the card from the touch panel without providing a notch portion.

Further, since the card inserted from the card loading slot is correctly positioned on the surface of the stage or the touch panel, an XY coordinate system on the surface of the card completely matches an XY coordinate system recognized by the coordinate recognition unit. Therefore, a touch location on a card by a fingertip or a medium can be easily recognized without a complicated calculation.

According to a thirteenth aspect of the invention, there is provided an information output device according to any one of the first to twelfth aspects, wherein a selection button of the multimedia information is directly printed or a sheet on which a selection button of the multimedia information is printed is removably attached on a portion of the touch panel or the stage, and a position of a player/operator's fingertip, pen operation, or three dimensional object in relation to the selection button is recognized based on the coordinate information from the coordinate recognition unit to thereby output selected multimedia information from an output unit.

Based on this aspect, users can be easily instructed operations by attaching in advance a sheet on which instructions indicating operations are printed on the touch panel or the stage.

According to a fourteenth aspect of the invention, there is provided an information output device according to any one of the first to fifth aspects, wherein part of the touch panel or the stage is configured as a display portion which is able to display display information of a display unit provided on the touch panel or the stage.

Based on this aspect, since at least part of the touch panel or the stage constitutes a display portion, a motion picture, image, or text information which instructs an operation of a game can be displayed.

Moreover, as a projection unit, any display unit, for example an LDC display, plasma display, or projector, may be used.

According to a fifteenth aspect of the invention, there is provided an information output device according any one of the first to fifth aspects, wherein a suction opening for absorbing a medium to the touch panel or the stage is provided, and the suction opening makes the medium in close contact with the touch panel or the stage by forming negative pressure in the suction opening.

As such, absorbing a card or other media to the stage or the touch panel by providing a suction opening allows accurate imaging of a dot pattern, preventing the card or other media from lifting or unintentionally moving from the stage or the touch panel, even when the stage or the touch panel is inclined. Accordingly, an information output device comprising a standing-type touch panel or stage can be realized.

According to a sixteenth aspect of the invention, there is provided an information output device according to the fifteenth aspect, wherein a negative pressure generation unit controlled by a control unit is provided in a touch panel chassis where the touch panel is provided or in a stage chassis where the stage is provided, and the control unit, when it recognizes a location of a medium in a vicinity of the touch panel or the stage based on a change of a captured image captured by the imaging unit, instructs the negative pressure generation unit to vacuum suction from the suction opening.

As such, since the negative pressure generation unit (vacuum pump) is activated by recognizing an access of a card or other media to the touch panel or the stage, a card or other media can be more reliably absorbed to the stage or the touch panel only when necessary, and the negative pressure unit is not activated when it is not used. This results in noise reduction and power conservation, and prevents a clog in the suction opening.

Advantage of the Invention

According to the aspects of the present invention, when used as a game device, it is possible that ingenuity in designing of stage surface further promotes entertainment trait of the game. Meanwhile, when used as an input interface of a general-use computer or the like, the present invention is able to provide an input control instruction system having a flexible interface which enables operations on a printing region of buttons and icons printed on the front surface of the card as well as on a code on the back surface of the card.

BRIEF DESCRIPTION OF THE DRAWINGS

FIG. 5 is an explanatory diagram showing a dot pattern format.

FIGS. 10A to 10C are examples of information dots and bit displays of data defined therein. Particularly, FIG. 10A is a diagram of disposing two dots, FIG. 10B is a diagram of disposing four dots, and FIG. 10C is a diagram of disposing five dots.

FIGS. 11A to 11D are modification examples of a dot pattern. Particularly, FIG. 11A is a schematic view of a six information dot arrangement, FIG. 11B is a schematic view of a nine information dot arrangement, FIG. 11C is a schematic view of a 12 information dot arrangement, and FIG. 11D is a schematic view of a 36 information dot arrangement.

FIG. 21 is an explanatory diagram showing a dot pattern format.

FIGS. 35A to 35C are diagrams illustrating a specific use example of a card, when the card is used a card for shopping.

FIG. 37 is a diagram illustrating a specific use example of a card, when the card is used as an animal pictorial book card.

FIGS. 38A and 38B are diagrams illustrating specific use examples of a card, when the card is used as a controller for a movie recorder.

FIGS. 40A and 40B are diagrams illustrating a specific use example of a card, when the card is used as a recipe card.

FIGS. 46A and 46B are diagrams illustrating a specific use example of a card, when the card is used in lieu of a mouse.

FIGS. 51A and 51B are explanatory diagrams showing an arrangement and format of a dot pattern having XY coordinate values.

DESCRIPTION OF NUMERALS AND SIGNS

1 DOT PATTERN
2 KEY DOT
3 INFORMATION DOT
4 REFERENCE GRID POINT DOT
5 VIRTUAL GRID POINT

BEST MODE FOR CARRYING OUT THE INVENTION

Figure 1:
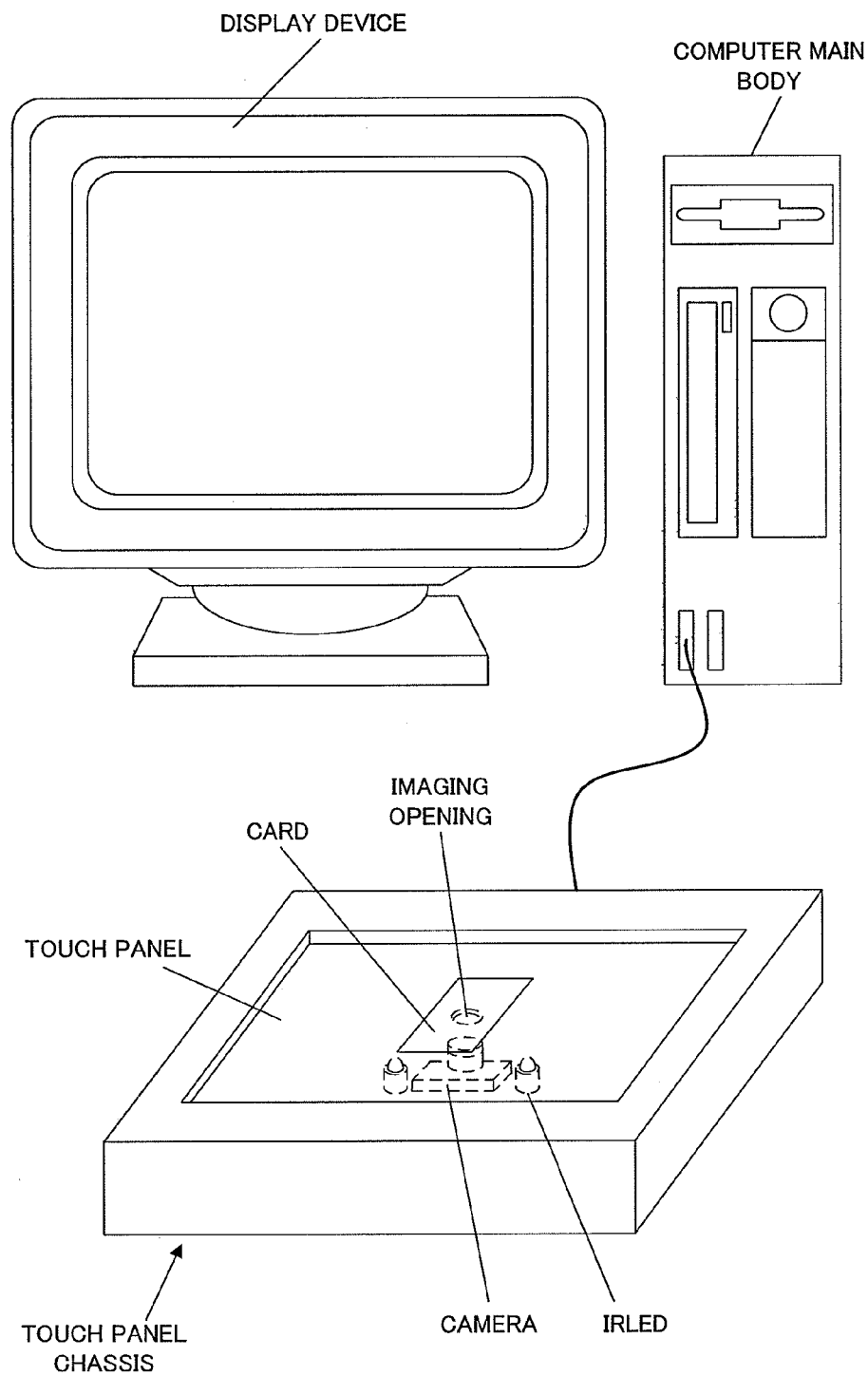
FIG. 1 is an explanatory diagram illustrating a use state of the touch panel chassis in an embodiment of the present invention.

Referring to FIG. 1, a touch panel chassis, which is a feature of the present invention, is connected to a general-use computer system.

Figure 2:
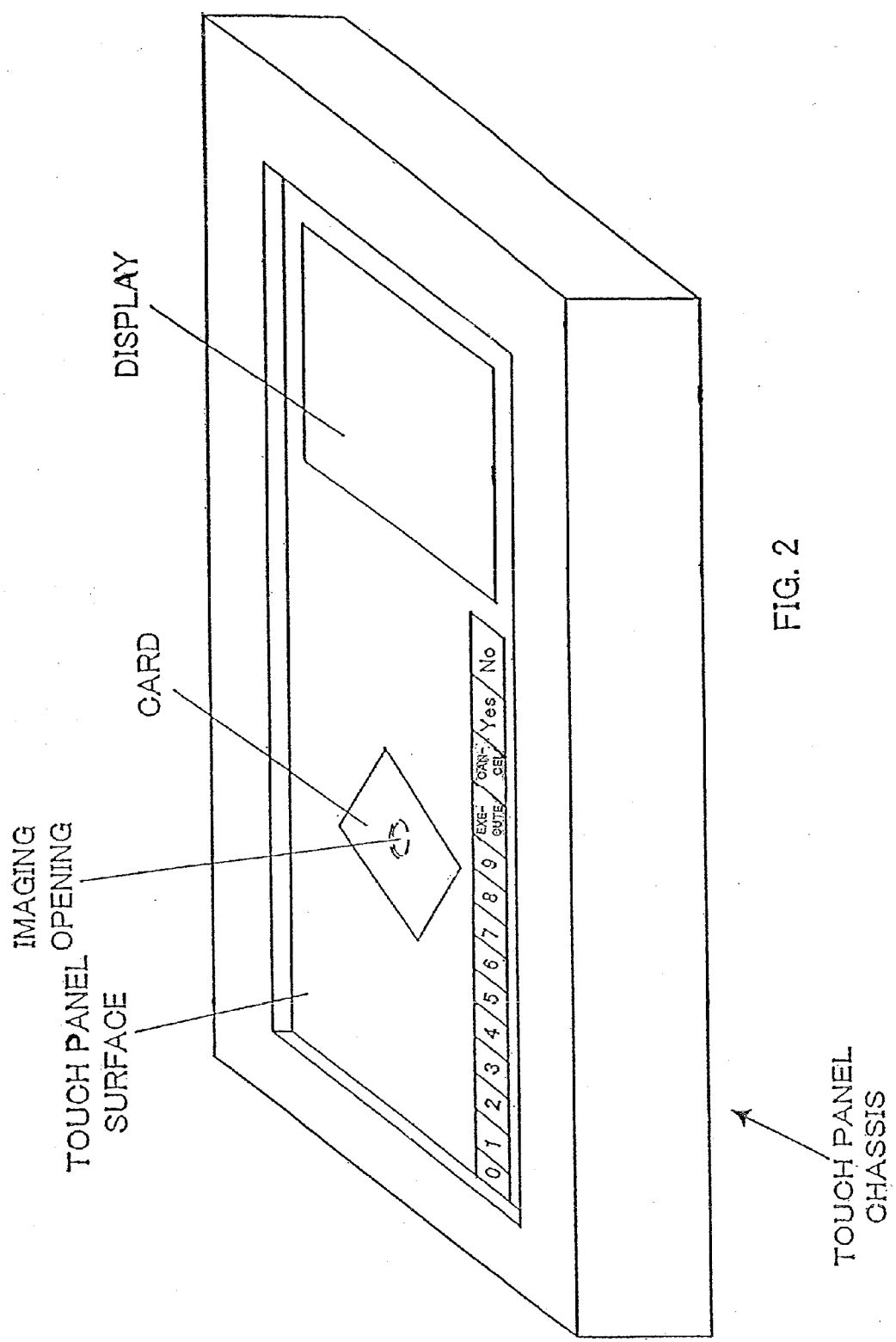
FIG. 2 is a perspective view showing a modification example of the touch panel chassis.

This system has a computer main body, a display device, and a touch panel chassis. The upper surface of the touch panel chassis of this embodiment is configured as a touch panel. Specifics of this system are illustrated in FIGS. 1 and 2. More specifically, a group of light-emitting elements and a group of light-receiving elements are disposed in pairs. When light emitted from the light-emitting elements are blocked by a medium such as a fingertip, a touch pen, or a figure, the light supposed to be received by the light-receiving elements cannot be received. Coordinate inputs are enabled by recognizing the existence of such light blocking object at the corresponding location. An imaging opening opens at the center of the upper surface of the touch panel. When placed on the upper side of the imaging opening, a dot pattern printed on the back surface of a card can be captured by a camera provided in the chassis.

The touch panel may be other structures such as using an infrared imaging device, as shown in FIGS. 48A to 49B.

IRLEDs as lighting units are disposed around the camera in the touch panel chassis, irradiating the imaging opening. That is, a dot pattern on the back surface of a card can be captured by imaging the reflected light of infrared light irradiated by the IRLEDs, on the back surface of the card placed at the imaging opening.

For the dot pattern on the back surface of the card, further described later, since the dot pattern is printed with ink which absorbs infrared rays, superimposing and printing the dot pattern on normal printings do not affect an imaging of the dot pattern by the camera.

FIG. 2 shows a modification example of a touch panel chassis. Touch panel structure is the same as those described in above FIG. 12 and FIG. 48A to FIG. 49B, with exceptions that a sheet with operation buttons printed is attached on a surface of the touch panel and that a display is disposed on part of the touch panel.

Figure 3:
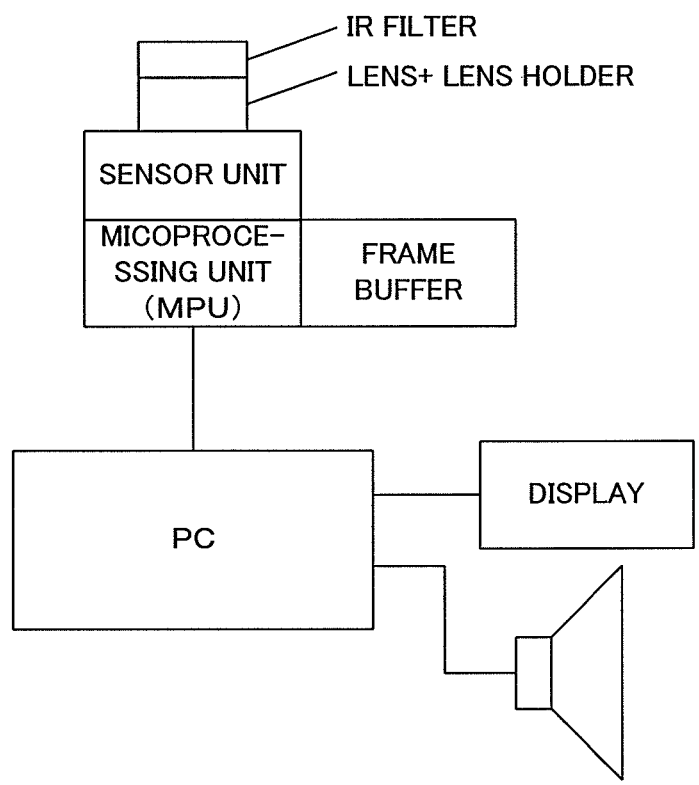
FIG. 3 is a block diagram of hardware in an embodiment of the present invention.

FIG. 3 is a block diagram of hardware in an embodiment of the present invention.

As shown in FIG. 3, the camera has a sensor unit, a lens and a lens holder, and an IR filter disposed at the leading end of the lens.

Further, the imaging opening of the sensor unit may be processed by a micro processing unit (MPU) and a frame buffer of the camera, or by software of a central processing unit (CPU) of the computer main body.

The micro processing unit of the camera or the central processing unit of the computer main body analyzes dots from a captured dot pattern image, converts the dot pattern into codes signifying the dot pattern, reads information corresponding to the codes from memory, and outputs from a display or a speaker.

Such dot pattern is described in FIG. 4 to FIG. 11D.

Figure 4:
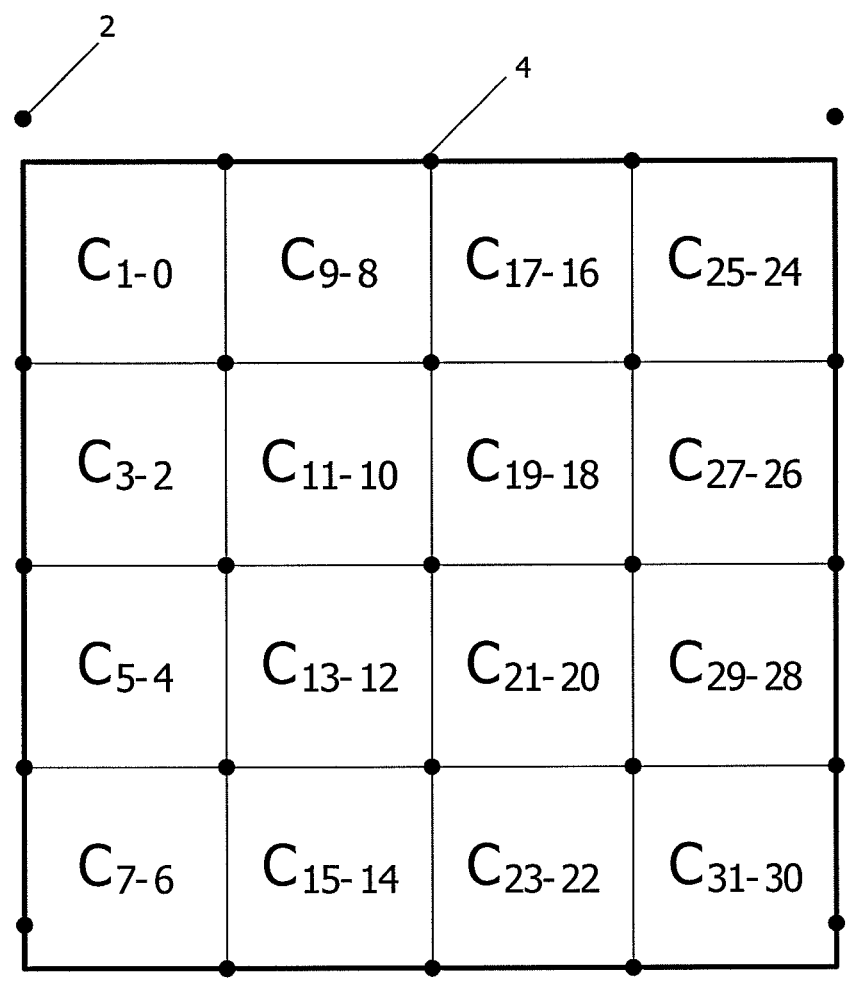
FIG. 4 is an explanatory diagram illustrating an arrangement of each dot in a dot pattern.

FIG. 4 and FIG. 5 are explanatory diagrams showing a relationship among a dot pattern, a code value, and an identifier.

The dot pattern shown in FIG. 4 is a dot pattern composed of 4×4-block regions. These blocks are separated into $C_{1-0}$ to $C_{31-30}$. Each region's dot code format is shown in FIG. 5.

As shown in FIG. 5, $C_0$ to $C_{23}$ mean a data region and a company code, $C_{24}$ and $C_{25}$ mean a code category, $C_{26}$ to $C_{29}$ mean a control code, and $C_{30}$ and $C_{31}$ mean parity. There are four types of formats; $C_{24}$ and $C_{25}$ values determine bit numbers of a data region and a company code. That is, when $C_{24}$ and $C_{25}$ are 00, the data region is eight bits and the company code is 16 bits; when 01, the data region is 12 bits and the company code is 12 bits; when 10, the data region is 16 bits and the company code is eight bits; when 11, the data region is 20 bits and the company code is four bits.

Next, a dot pattern used in this invention is described using FIG. 6 to FIG. 11D.

Figure 6:
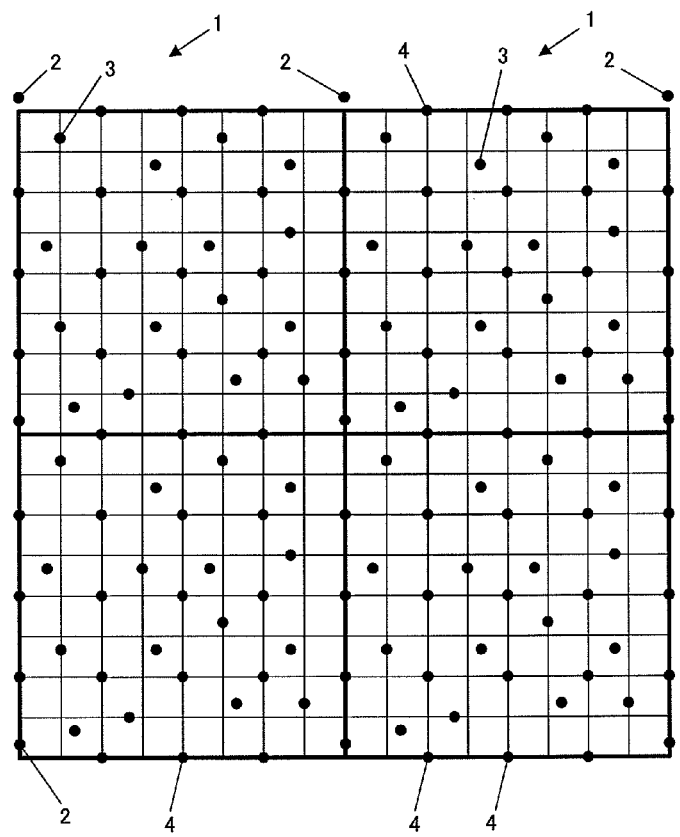
FIG. 6 is an explanatory diagram showing an example of a dot pattern.

FIG. 6 is an explanatory diagram showing an example of a dot pattern, GRID1.

In these diagrams, grid lines in horizontal and vertical directions are drawn for convenience of explanation, and do not exist in real printing surface. It is desirable that when the scanner as an imaging unit has infrared irradiation units, the dot pattern constituents, such as a key dot 2, information dot 3, and reference grid point dot 4, are printed with invisible ink which absorbs such infrared light or with carbon ink.

Figure 7A:
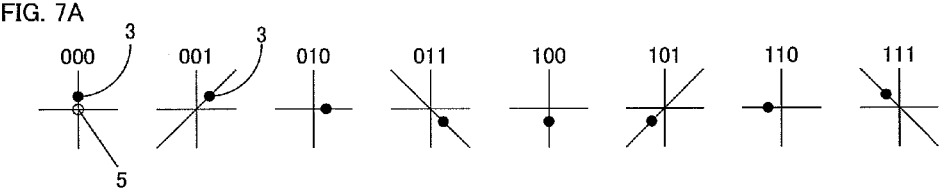
FIGS. 7A and 7B are enlarged views showing an example of a information dot of a dot pattern.
Figure 7B:
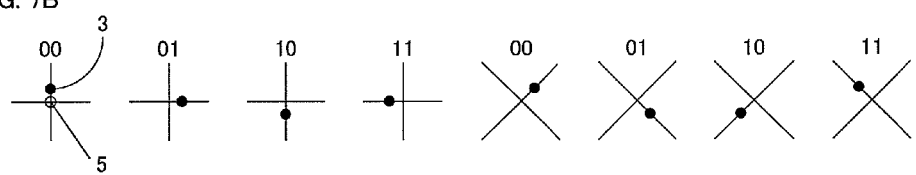
Figure 8A:
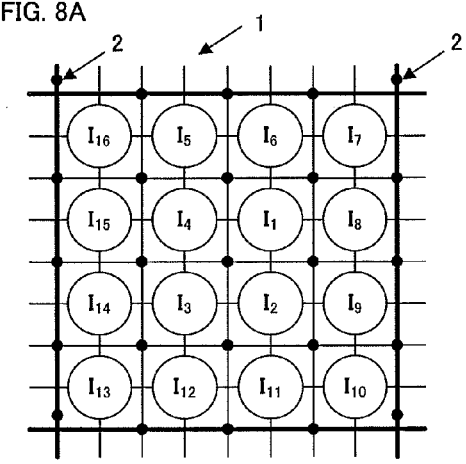
FIGS. 8A and 8B are explanatory diagrams showing an arrangement of information dots.
Figure 8B:
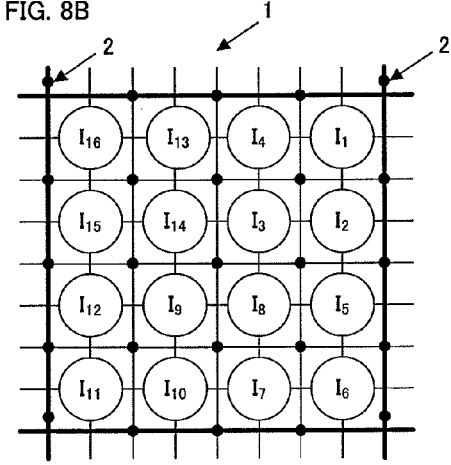

FIGS. 7A and 7B are enlarged views showing an example of an information dot of a dot pattern and a bit display of data defined therein. FIGS. 8A and 8B are explanatory views showing information dots arranged around a key dot.

The information input/output method using the dot pattern of the present invention comprises a unit for generating a dot pattern 1, a unit for recognizing the dot pattern 1, and a unit for outputting information and a program from this dot pattern 1. That is, after retrieving a dot pattern 1 as image data by a camera, first, the method extracts a reference grid point dot 4, next, extracts a key dot 2 based on the fact that there is no dot at the location where a reference grid point dot 4 supposed to be, extracts an information dot 3, and digitizes the information dot 3 to extract the information region and convert the information into numerical values. Based on the numerical information, information and a program are output from this dot pattern 1. For example, information such as a sound and a program are output, from this dot pattern 1, on an information output device, a personal computer, a PDA, a mobile phone, or the like.

To generate the dot pattern 1 of the present invention, based on a dot code generation algorithm, fine dots used for recognition of information such as sound including a key dot 2, an information dot 3, and a reference grid point dot 4 are arranged according to a predetermined rule. As shown in FIG. 6, in a block of the dot pattern 1 which represents information, 5×5-reference grid point dots 4 are arranged with reference to a key dot 2, and information dots 3 are arranged around a virtual grid point 5 which is surrounded by four reference grid point dots 4. Arbitrary numerical information is defined in this block. The example illustrated in FIG. 6 shows four blocks of the dot pattern 1 arranged in parallel (in bold frame), provided, however, that the dot pattern 1 is not limited to four blocks.

One piece of information and a program corresponding to one block can be output, or one piece of information and a program corresponding to a plurality of blocks can be output.

When a camera retrieves this dot pattern 1 as image data, the reference grid point dots 4 can correct a distortion of the lens of the camera, skewed imaging, expansion and contraction of a paper surface, curvature of a medium surface, and distortion during printing. Specifically, a function for calibration $(Xn, Yn) = (Xn', Yn')$ is calculated to convert a distorted four reference grid point dots 4 into the original square, then the vector of the correct information dots 3 is obtained by calibrating the information dots 3 by the same function.

If reference grid point dots 4 are arranged in the dot pattern 1, since the image data of this dot pattern 1 retrieved by a camera is calibrated its distortion attributable to the camera, image data of the dot pattern 1 can be recognized accurately even though retrieved by a popular camera with a lens with high distortion rate. Moreover, the dot pattern 1 can be accurately recognized even when the dot pattern 1 is read by a camera inclined with reference to a surface of the dot pattern 1.

Key dots 2 are dots, as shown in FIG. 6, arranged by shifting four reference grid point dots 4 which are disposed at four corners of a block, in a certain directions. The key dot 2 is a representative point of one block of the dot pattern 1 which represents an information dot 3. For example, key dots 2 are the dots being shifted the reference grid point dots 4 disposed at four corners of a block of the dot pattern 1 by 0.1 mm upward. If an information dot 3 represents X, Y coordinate values, the coordinate points are the locations obtained by shifting the key dots 2 by 0.1 mm downward. However, these numbers are not limited to these, and may change depending on the size of a block of the dot pattern 1.

Information dots 3 are dots used for recognition of a variety of information. The information dot 3 is arranged around a key dot 2 as a representative point. The information dot 3 is also disposed at the ending point of a vector with the starting point being a virtual grid point 5 at the center surrounded by four reference grid point dots 4. For example, this information dot 3 is surrounded by four reference grid point dots 4. As shown in FIG. 7A, since dots 0.1 mm away from the virtual grid point 5 have direction and length as expressed by vectors, the dots can express three bits by being disposed in eight directions by shifting by 45 degrees in clockwise direction. Therefore, one block of the dot pattern 1 may express 3 bits×16=48 bits.

FIG. 7B is a method of defining information dots 3 having two bits for each grid, in the dot pattern of FIG. 6. Two bit information is each defined by shifting a dot in + direction and x direction. In this way, although 48 bit information can be indeed defined, data may be allocated to each 32 bits by dividing for an intended purpose. Maximum of $2^{16}$ (65,000 approx.) dot pattern formats can be realized depending on the combination of + direction and x direction.

It should be noted that dot pattern formats are not limited to these, and may vary including a possibility of four bit expression by arranging the dots in 16 directions.

Preferably, the dot diameter of a key dot 2, information dot 3, or reference grid point dot 4 is approximately 0.05 mm in consideration of visual quality, printing accuracy in respect of a paper quality, resolution of a camera, and optimal digitalization.

Moreover, in consideration of information amount required for an imaging area and possible false recognition of dots 2, 3, 4, distance between reference grid point dots 4 is preferably around 0.5 mm in both vertical and horizontal directions. Displacement of a key dot 2 is preferably around 20% from the grid distance, taking into account the possible false recognition with reference grid point dots 4 and information dots 3.

A distance between this information dot 3 and a virtual grid point surrounded by four reference grid point dots 4 is preferably the distance of around 15-30% of the gap between adjacent virtual grid points 5. If the gap between an information dot 3 and a virtual grid point 5 is shorter than this distance, the dots are easily recognized as a big cluster, and are ugly as a dot pattern 1. On the other hand, if the gap between an information dot 3 and a virtual grid point 5 is wider than this distance, the judgment of which one of adjacent virtual grid points 5 is the center of a vector of the information dot 3.

For example, for information dots 3, as shown in FIG. 8A, when arranging $I_1$ to $I_{16}$ from the center of the block in clockwise direction, the grid distance is 0.5 mm; 2 bits× 16=32 bits may be expressed in 2 mm×2 mm.

Additionally, there can be provided sub-blocks in a block, which have independent information content, and are not affected by other information content. FIG. 8B illustrates these sub-blocks. Sub-blocks $[I_1, I_2, I_3, I_4]$, $[I_5, I_6, I_7, I_8]$, $[I_9, I_{10}, I_{11}, I_{12}]$, $[I_{13}, I_{14}, I_{15}, I_{16}]$ are each composed of four information dots 3, and each lay out independent data (3 bits×4=12 bits) in the information dots 3. In this way, having sub-blocks makes an error check easier per each sub-block.

Vector directions of information dots 3 (rotation direction) are preferably set evenly for each 30-90 degrees.

Figure 9:
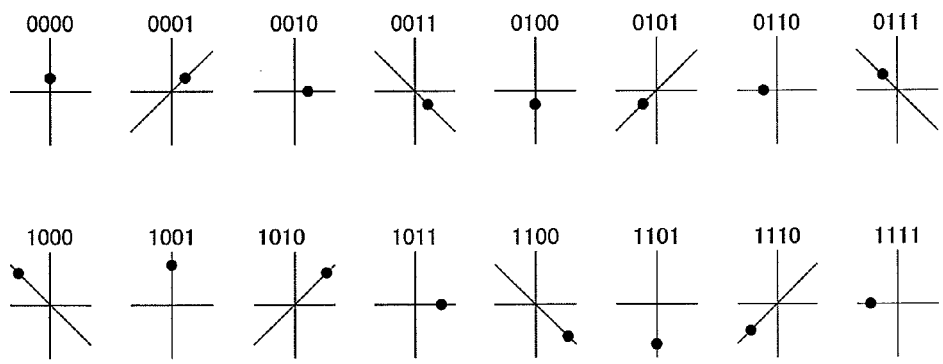
FIG. 9 is an example showing an information dot and a bit display of data defined therein and showing another embodiment.
Figure 12:
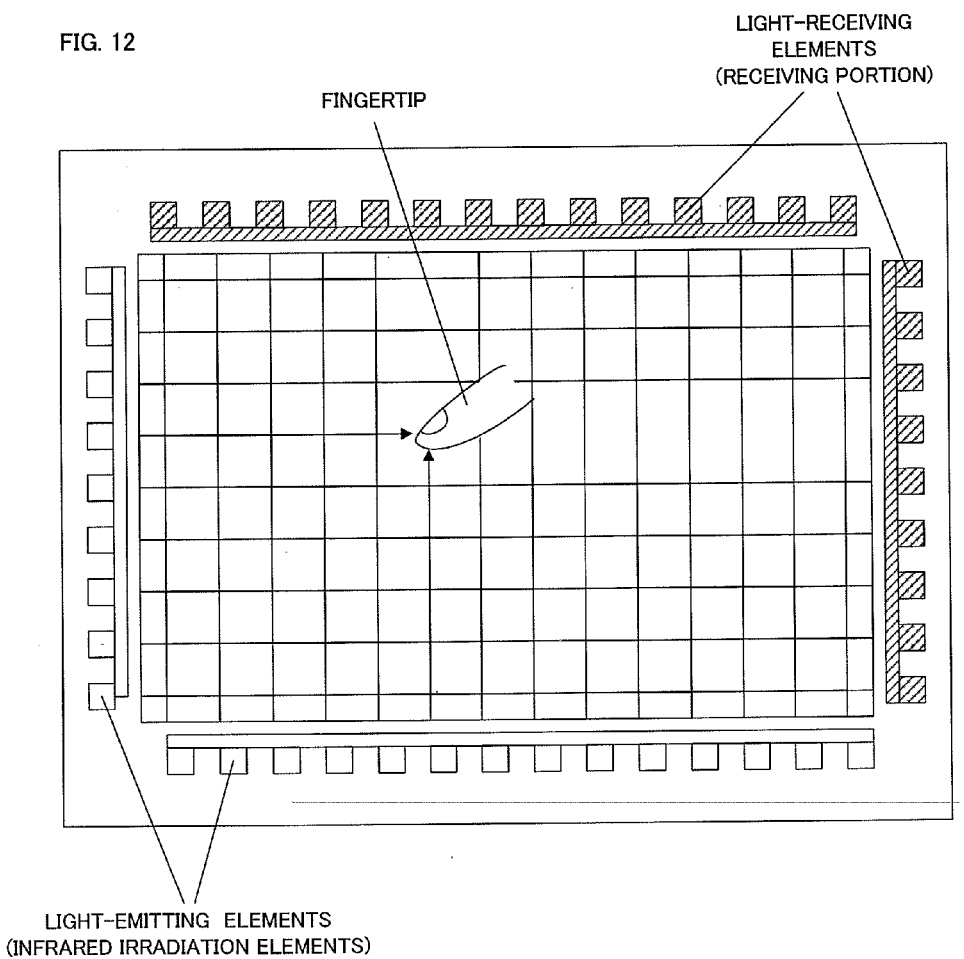
FIG. 12 is a diagram illustrating a touch panel structure.

FIG. 9 is an example showing an information dot 3 and a bit display of data defined therein and showing another embodiment. If two types of information dots 3, long and short distance from a virtual grid point 5 surrounded by reference grid point dots 4 are used, and vector directions are eight directions, four bits can be expressed. Here, the long distance of information dots 3 is preferably about 25-30% of the gap between adjacent virtual grid points 5. The short distance of information dots 3 is preferably about 15-20% of the gap between adjacent virtual grid points 5. However, a distance between the centers of long and short information dots 3 is preferably longer than the diameter of these dots.

The information dot 3 surrounded by four reference grid point dots 4 is preferably one dot, taking into account the visual quality. However, if visual quality is disregarded and information amount should be increased, one bit may be allocated to one vector and an information dot 3 may be expressed with a plurality of dots, thereby including voluminous information. For example, in eight direction concentric vectors, an information dot 3 surrounded by four grid dots 4 can express $2^8$ pieces of information; 16 information dots in one block accounts for $2^{128}$.

FIGS. 10A to 10C are examples of information dots and bit displays of data defined therein. Particularly, FIG. 10A is a diagram of disposing two dots, FIG. 10B is a diagram of disposing four dots, and FIG. 10C is a diagram of disposing five dots.

FIGS. 11A to 11D are modification examples of a dot pattern. Particularly, FIG. 11A is a schematic view of six information dot arrangement, FIG. 11B is a schematic view of nine information dot arrangement, FIG. 11C is a schematic view of 12 information dot arrangement, and FIG. 11D is a schematic view of 36 information dot arrangement.

The dot patterns 1 shown in FIGS. 6 and 8A to 8B illustrate examples where 16 (4×4) information dots 3 are arranged in one block. However, this information dot 3 is not limited to 16-dot arrangement, and can vary. For example, depending on the size of required information amount and the resolution of a camera, six information dots 3 (2×3) may be arranged in one block (FIG. 11A), nine information dots 3 (3×3) may be arranged in one block (FIG. 11B), 12 information dots 3 (3×4) may be arranged in one block (FIG. 11C), or 36 information dots 3 may be arranged in one block (FIG. 11D).

Figures 50A, 50B:
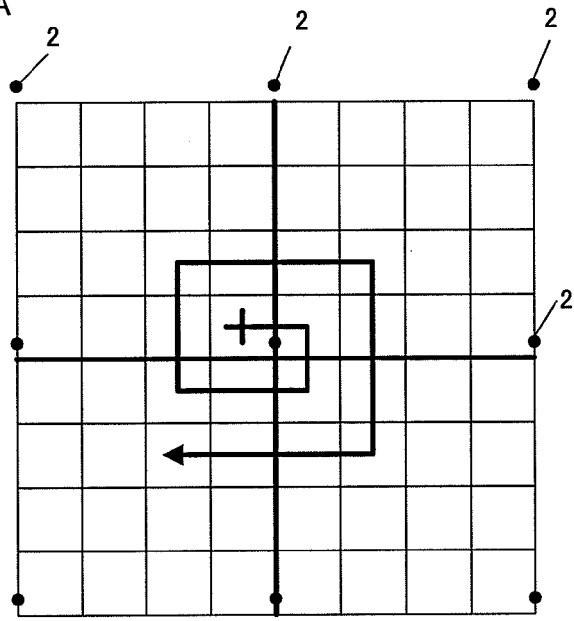
FIG. 50A is an explanatory diagram showing an order for inputting information dots.
FIG. 50B is an explanatory diagram showing a method for reading a dot pattern and computing XY coordinate values.

Further, a method for computing XY coordinate values using above-described dot patterns is described using FIGS. 50A and 50B.

When dot pattern 1 is retrieved as image data by a camera, after computing XY coordinate values at the location of key dot 2 as a representative point of information, XY coordinate values at the center of the imaging area is computed by complementing the coordinate values, based on the orientation of the dot pattern 1 obtained from the key dot 2, increment of XY coordinate values at an adjacent representative point, and the distance from the center of the imaging area to the key dot 2 for which XY coordinate values are calculated.

Alternatively, when a block of a dot pattern 1 is retrieved as image data by a camera, in a region where the same data is defined or in a region where XY coordinate values are defined, the dot pattern 1 is read within a minimum area from the center of the imaging area of the camera to thereby compute data at the location of the center of the imaging area, by starting to read from an information dot 3 in vicinity of the center of the imaging area and sequentially reading information dots 3 until information dots 3 equivalent to one block are read.

FIG. 50A illustrates an order for inputting information dots equivalent to one block within a minimum area from the center of the imaging area of a camera. 4×4 rows=16 information dots are inputted in clockwise direction.

FIG. 50B is an explanatory view illustrating the method for reading a dot pattern and computing XY coordinate values.

As shown in FIG. 50B, XY coordinate values to be calculated are XY coordinate values of a block where the center of the imaging area of the camera exists. If the XY coordinate values are defined as +1 increment in X direction (rightward) and Y direction (upward) per block, information dots input from other blocks should be calibrated. It should be noted that $K_8 K_7 K_6 K_5$ ($i_{16} i_{15} i_{14} i_{13} i_{12} i_{11} i_{10} i_9$) which represent X coordinate values and $K_4 K_3 K_2 K_1$ ($i_8 i_7 i_6 i_5 i_4 i_3 i_2 i_1$) which represent Y coordinate values are subject to calibration; $K_{16}$-$K_9$ ($i_{32}$-$i_{17}$) are the same values in any blocks and not needed to be calibrated.

These calculations are solved by the following equations (1)-(16). If a calculation in brackets ([ ]) produces a carry, it will be assumed not to affect a bit sequence before brackets ([ ]). K is information dot I excluding error check bits.

(1) When $_{11}I_{11}$ is the starting point (i.e., center of the imaging area of a camera), $X$ coordinates=$_{11}K_8 \cdot _{11}K_7 \cdot _{11}K_6 \cdot _{21}K_5$ $Y$ coordinates=$_{12}K_4 \cdot _{12}K_3 \cdot _{12}K_2 \cdot [_{22}K_1+1]$.

(2) When $_{11}I_{15}$ is the starting point (i.e., center of the imaging area of a camera), $X$ coordinates=$_{12}K_8 \cdot _{12}K_7 \cdot _{12}K_6 \cdot _{22}K_5-1$ $Y$ coordinates=$_{12}K_4 \cdot _{12}K_3 \cdot _{12}K_2 \cdot [_{22}K_1+1]$.

(3) When $_{12}I_3$ is the starting point (i.e., center of the imaging area of a camera), $X$ coordinates=$_{12}K_8 \cdot _{12}K_7 \cdot _{12}K_6 \cdot _{22}K_5$ $Y$ coordinates=$_{12}K_4 \cdot _{12}K_3 \cdot _{12}K_2 \cdot [_{22}K_1+1]$.

(4) When $_{12}I_7$ is the starting point (i.e., center of the imaging area of a camera), $X$ coordinates=$_{12}K_8 \cdot _{12}K_7 \cdot _{12}K_6 \cdot _{22}K_5$ $Y$ coordinates=$_{12}K_4 \cdot _{12}K_3 \cdot _{12}K_2 \cdot [_{22}K_1+1]$.

(5) When $_{11}I_{12}$ is the starting point (i.e., center of the imaging area of a camera), $X$ coordinates=$_{11}K_8 \cdot _{11}K_7 \cdot _{21}K_6 \cdot _{21}K_5$ $Y$ coordinates=$_{12}K_4 \cdot _{12}K_3 \cdot [_{22}K_2 \cdot _{22}K_1+1]$ (6) When $_{11}I_{16}$ is the starting point (i.e., center of the imaging area of a camera), $X$ coordinates=$_{12}K_8 \cdot _{12}K_7 \cdot _{22}K_6 \cdot _{22}K_5-1$ $Y$ coordinates=$_{12}K_4 \cdot _{12}K_3 \cdot [_{12}K_2 \cdot _{22}K_1+1]$.

(7) When $_{12}I_4$ is the starting point (i.e., center of the imaging area of a camera), $X$ coordinates=$_{11}K_8 \cdot _{12}K_7 \cdot _{22}K_6 \cdot _{22}K_5$ $Y$ coordinates=$_{12}K_4 \cdot _{12}K_3 \cdot [_{22}K_2 \cdot _{22}K_1+1]$.

(8) When $_{12}I_8$ is the starting point (i.e., center of the imaging area of a camera), $X$ coordinates=$_{12}K_8 \cdot _{12}K_7 \cdot _{22}K_6 \cdot _{22}K_5$ $Y$ coordinates=$_{12}K_4 \cdot _{12}K_3 \cdot [_{22}K_2 \cdot _{22}K_1+1]$.

(9) When $_{21}I_9$ is the starting point (i.e., center of the imaging area of a camera), $X$ coordinates=$_{11}K_8 \cdot _{21}K_7 \cdot _{21}K_6 \cdot _{21}K_5$ $Y$ coordinates=$_{12}K_4 \cdot [_{22}K_3 \cdot _{22}K_2 \cdot _{22}K_1+1]-1$.

(10) When $_{21}I_{13}$ is the starting point (i.e., center of the imaging area of a camera), $X$ coordinates=$_{12}K_8 \cdot _{22}K_7 \cdot _{22}K_6 \cdot _{21}K_5-1$ $Y$ coordinates=$_{12}K_4 \cdot [_{22}K_3 \cdot _{22}K_2 \cdot _{22}K_1+1]-1$.

(11) When $_{22}I_1$ is the starting point (i.e., center of the imaging area of a camera), $X$ coordinates=$_{12}K_9 \cdot _{22}K_7 \cdot _{22}K_6 \cdot _{22}K_5$ $Y$ coordinates=$_{12}K_4 \cdot [_{22}K_3 \cdot _{22}K_2 \cdot _{22}K_1+1]-1$.

(12) When $_{22}I_5$ is the starting point (i.e., center of the imaging area of a camera), $X$ coordinates=$_{12}K_8 \cdot _{22}K_7 \cdot _{22}K_6 \cdot _{22}K_5$ $Y$ coordinates=$_{12}K_4 \cdot [_{22}K_3 \cdot _{22}K_2 \cdot _{22}K_1+1]-1$.

(13) When $_{21}I_{10}$ is the starting point (i.e., center of the imaging area of a camera), $X$ coordinates=$_{21}K_8 \cdot _{21}K_7 \cdot _{21}K_6 \cdot _{21}K_5$ $Y$ coordinates=$_{22}K_4 \cdot _{22}K_3 \cdot _{22}K_2 \cdot _{22}K_1$.

(14) When $_{21}I_{14}$ is the starting point (i.e., center of the imaging area of a camera), $X$ coordinates=$_{22}K_8 \cdot _{22}K_7 \cdot _{22}K_6 \cdot _{22}K_5-1$ $Y$ coordinates=$_{22}K_4 \cdot _{22}K_3 \cdot _{22}K_2 \cdot _{22}K_1$.

(15) When $_{22}I_2$ is the starting point (i.e., center of the imaging area of a camera), $X$ coordinates=$_{22}K_8 \cdot _{22}K_7 \cdot _{22}K_6 \cdot _{22}K_5$ $Y$ coordinates=$_{22}K_4 \cdot _{22}K_3 \cdot _{22}K_2 \cdot _{22}K_1$.

(16) When $_{22}I_6$ is the starting point (i.e., center of the imaging area of a camera), $X$ coordinates=$_{22}K_8 \cdot _{22}K_7 \cdot _{22}K_6 \cdot _{22}K_5$ $Y$ coordinates=$_{22}K_4 \cdot _{22}K_3 \cdot _{22}K_2 \cdot _{22}K_1$.

When an error occurs with an information dot 3 while retrieving the dot pattern 1 as image data by a camera, it is possible to read the dot pattern 1 within a minimum area from the center of the imaging area of the camera by reading an information dot 3 which is equivalent and most adjacent to the above information dot 3 to correct the error.

The above-described information retrieving method may be used to realize a tablet, digitizer, and input interface using XY coordinates. For example, a tablet or a digitizer inputs XY coordinate values of a dot pattern 1, after superimposing a transparent sheet on which a dot pattern 2 is printed on a subject and capturing the image by a camera.

Figure 52:
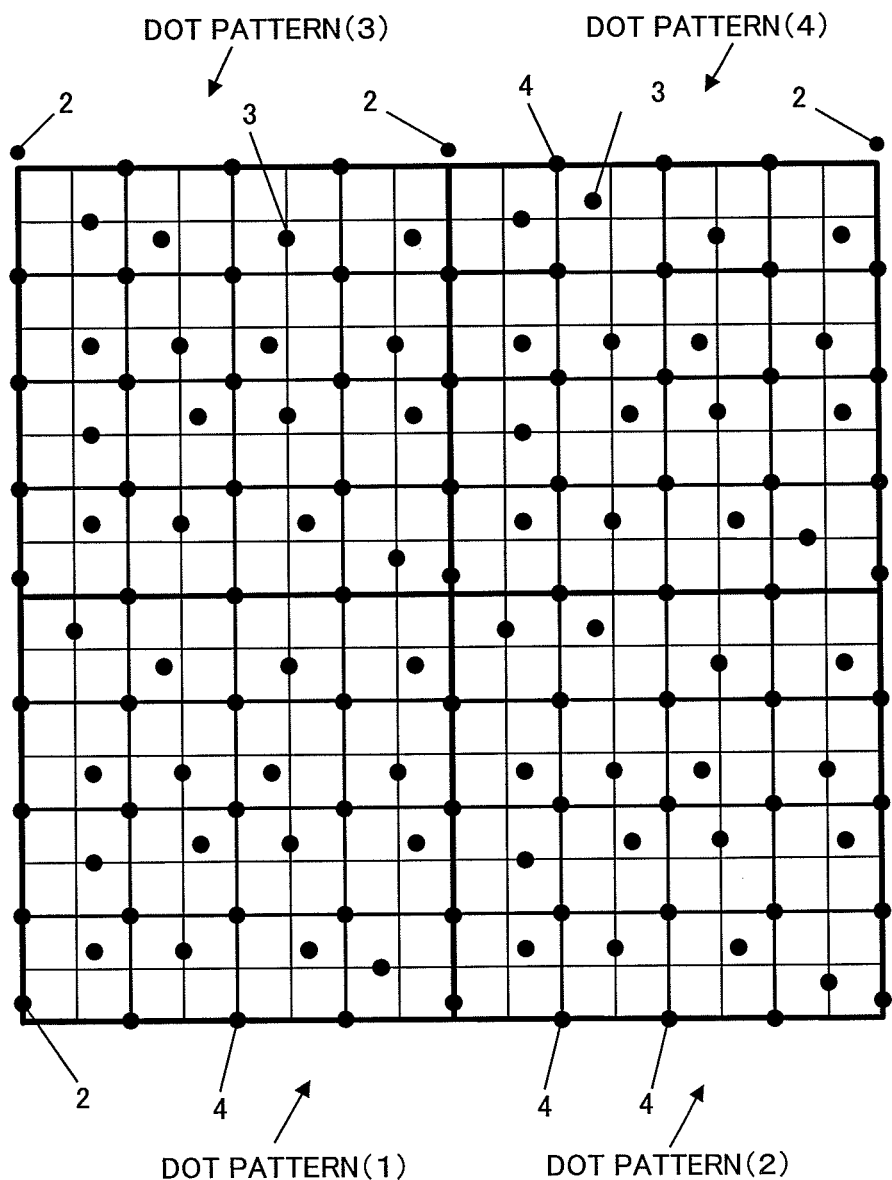
FIG. 52 is an explanatory diagram showing a specific example of a dot pattern having XY coordinate values.

FIGS. 51A to 52 are diagrams showing a specific example of a dot pattern defining XY coordinates.

As shown in FIG. 51A, four dot patterns (1)-(4) are formed. Dot code formats for each dot pattern are shown in FIG. 51B. That is, $C_0$-$C_7$ mean Y coordinates, $C_8$-$C_{15}$ mean X coordinates, $C_{16}$-$C_{20}$ mean operation codes, $C_{21}$-$C_{29}$ mean content/application codes, and $C_{30}$-$C_{31}$ mean parities, respectively. Operation codes and content/application codes are coded information about card content or coded card operations.

Here, if an X coordinate value of the dot pattern (1) is 10 and a Y coordinate value is 20, X coordinate and Y coordinate values of dot patterns (2)-(4) become the values shown in FIG. 51A. Moreover, if an operation code is 10 and a content/application code value is 100, formats of dot patterns (1)-(4) become those shown in FIG. 51B.

FIG. 52 is a diagram expressing the values shown in FIG. 51B specifically in a dot pattern.

As described before, FIG. 12 is a diagram illustrating a touch panel structure for recognition of coordinates.

Figures 13A, 13B:
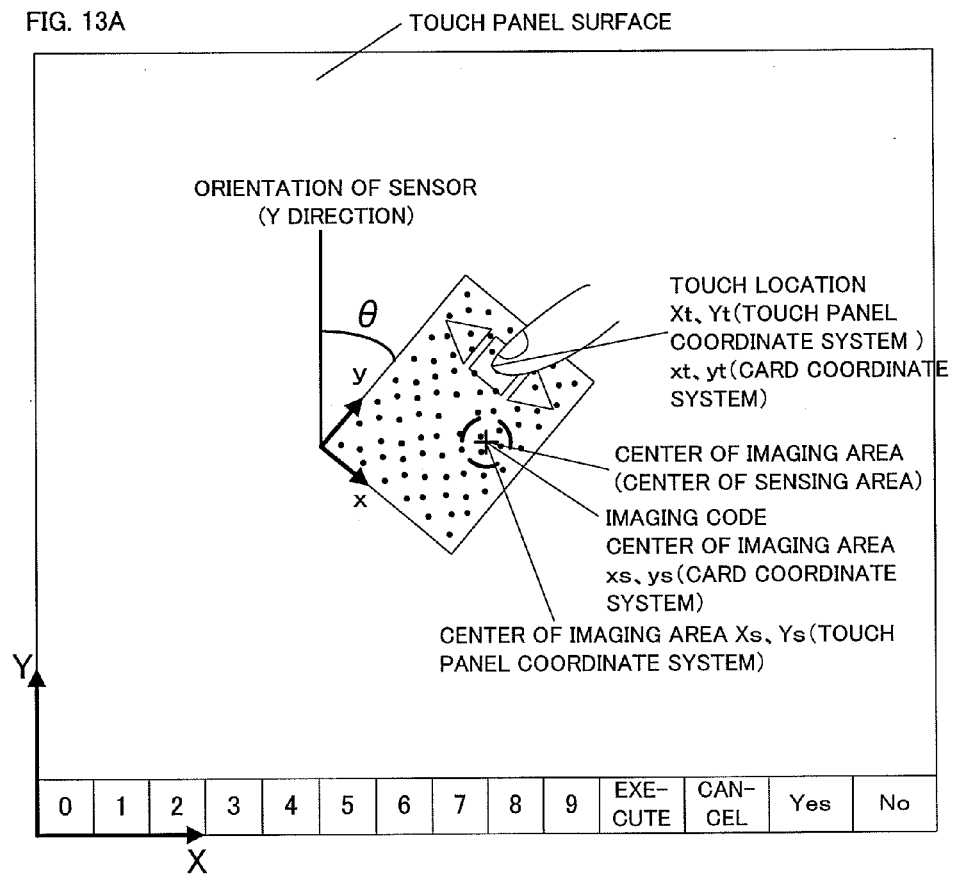
FIGS. 13A and 13B are explanatory diagrams illustrating a method for computing a location of a fingertip touched by a user.

FIGS. 13A and 13B are diagrams illustrating a method for computing a location touched by a fingertip of a player/operator (touch location).

It is assumed that, in a touch panel (coordinate recognition unit) coordinate system, coordinates of a central position of a camera (imaging unit) are $(X_s, Y_s)$.

It is also assumed that a central position of imaging of a card imaged by the camera expressed by the card coordinate system is $(X_s, Y_s)$.

At the same time, an angle between Y direction in the touch panel coordinate system and y direction in the card coordinate system is $\theta$.

In such case, the touch location by the fingertip of the player/operator as expressed in the touch panel coordinate system is $(X_t, Y_t)$.

Here, the touch location in the card coordinate system is expressed by the following equation:

$$\begin{Bmatrix} x_t \\ y_t \end{Bmatrix} = \begin{Bmatrix} x_s \\ y_s \end{Bmatrix} + \begin{Bmatrix} \cos\theta & \sin\theta \\ -\sin\theta & \cos\theta \end{Bmatrix} \begin{Bmatrix} X_t - X_s \\ Y_t - Y_s \end{Bmatrix}$$

By performing such arithmetic processing, it is possible to recognize which part of the print on the card surface is touched by a fingertip, regardless of the orientation of the card placed on the surface of the touch panel.

It should be noted that although the case in which a card surface is touched by a fingertip of a player/operator is explained in FIG. 13A, this may be done by a touch pen, etc.

Figure 14A:
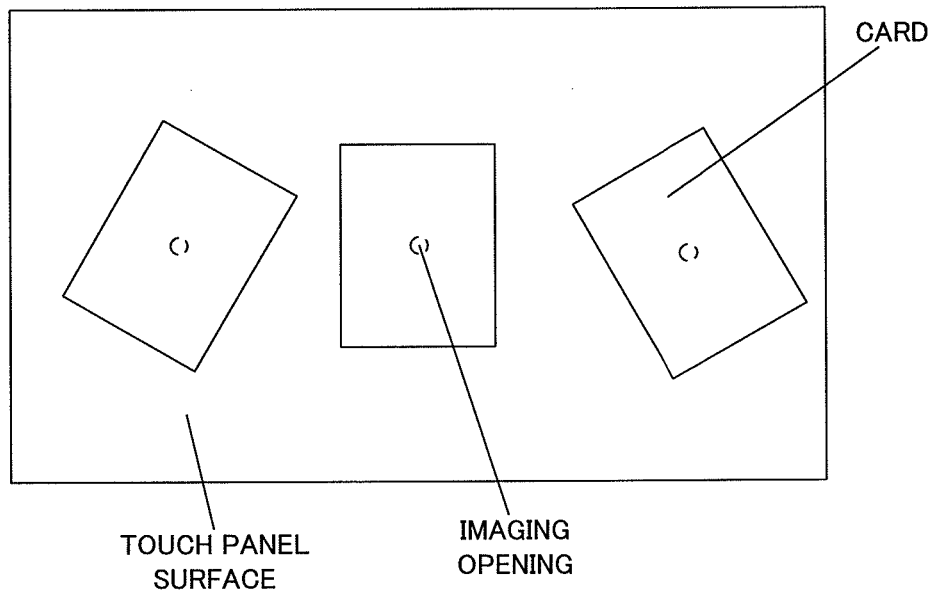
FIGS. 14A and 14B are explanatory diagrams illustrating modification examples of the touch panel chassis of the present invention.
Figure 14B:
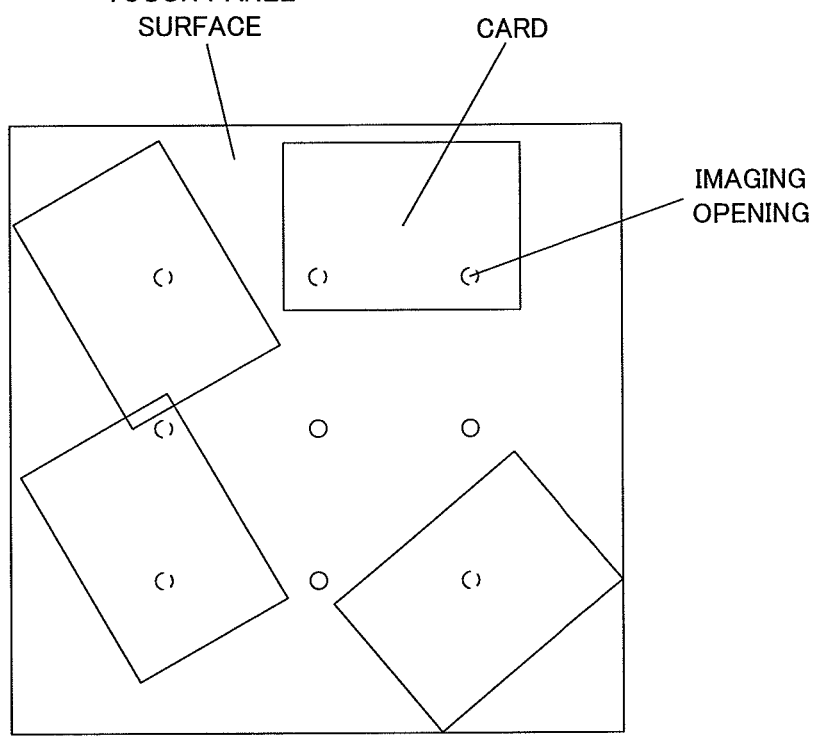

FIGS. 14A and 14B are explanatory diagrams illustrating a modification example of this embodiment.

This touch panel chassis is characterized by having a plurality of imaging openings. In the same way as the one shown in FIG. 1, in the touch panel chassis, a camera is disposed corresponding to each imaging opening, in a state capable to image the direction of the corresponding opening. In FIG. 14A, if a card is placed on any of the imaging openings on the surface on the touch panel, the corresponding camera images a dot pattern on the back surface of the card. As a result, a processing corresponding to each dot pattern at each imaging opening is performed. That is, the dot pattern is analyzed from the captured image, and corresponding sound, image, and motion picture are output.

In FIG. 14B, a plurality of imaging openings (in this example, nine) are disposed such that the back surface of a card is able to be imaged, regardless of a position of the card placed on the surface of the touch panel. Such positioning of the imaging openings allows imaging of a dot pattern on the back surface of a card regardless of the location of the card placed on the surface of the touch panel, without having a user aware thereof.

As such, according to this embodiment, recognition of a medium such as a card placed on the surface of a touch panel as the dot pattern printed on the back surface thereof, as well as recognition of a touch by a player, are enabled. Then, a process corresponding to the feature of the card can be performed by calculating which part of the card placed on the touch panel is touched based on the results of both recognitions. Therefore, it is possible to make input instructions tailored to respective features of a game or other information processing devices, simply by preparing a card on which a region for touch operation is printed.

Figure 15:
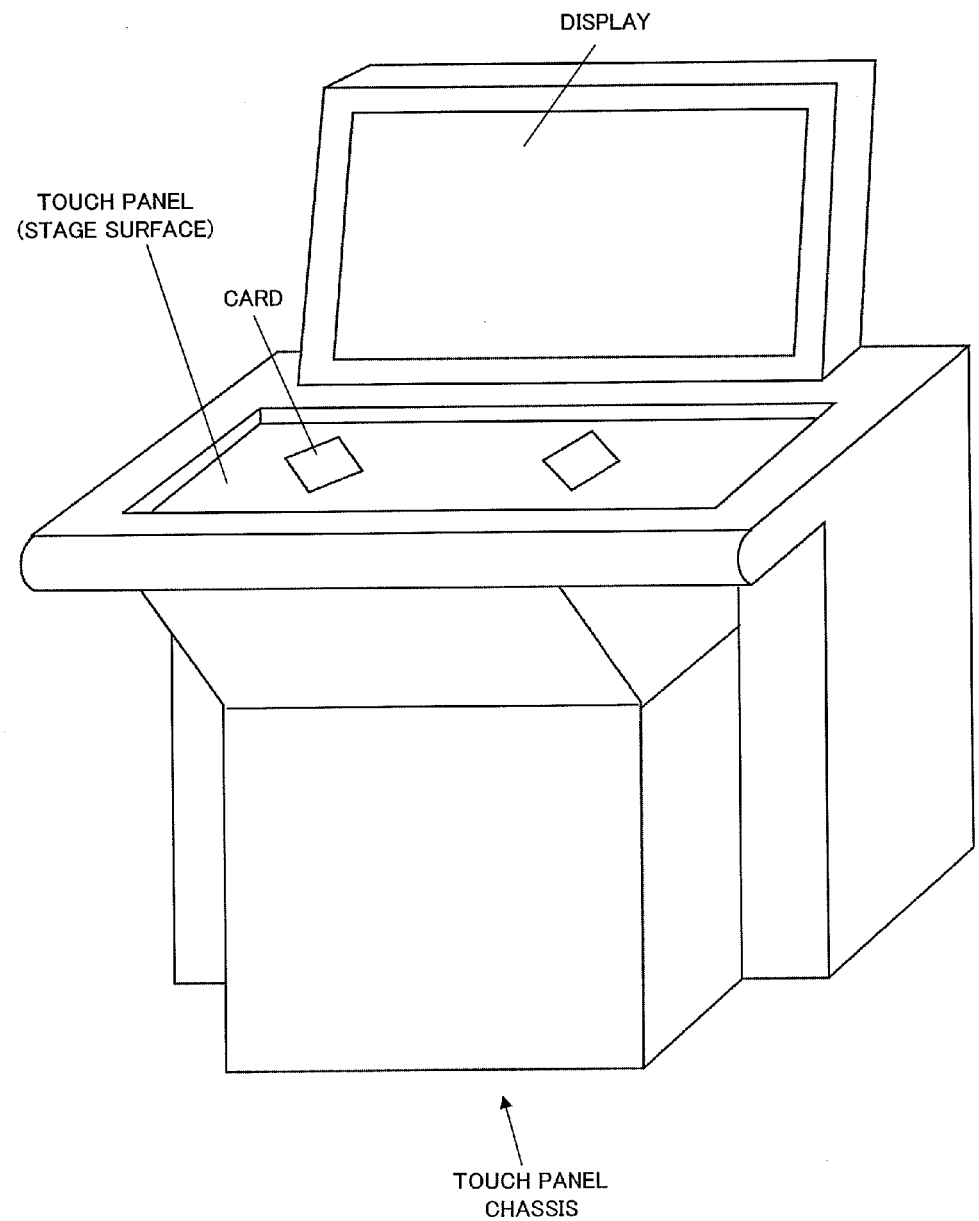
FIG. 15 is another embodiment of a touch panel chassis, and a perspective view illustrating a stage-type touch panel chassis, that is a stage chassis.

FIG. 15 is a perspective view showing an overview of a stage chassis in another embodiment of the invention.

As shown in FIG. 15, the stage chassis has a display in front of a touch panel (stage surface). The game progress varies according to a positioning of a card, a touch by a fingertip of a player on the touch panel (stage surface), or a touch by a fingertip on the surface of the card placed on the touch panel (stage surface). Accordingly, images or motion pictures shown on the display also change.

Figure 16:
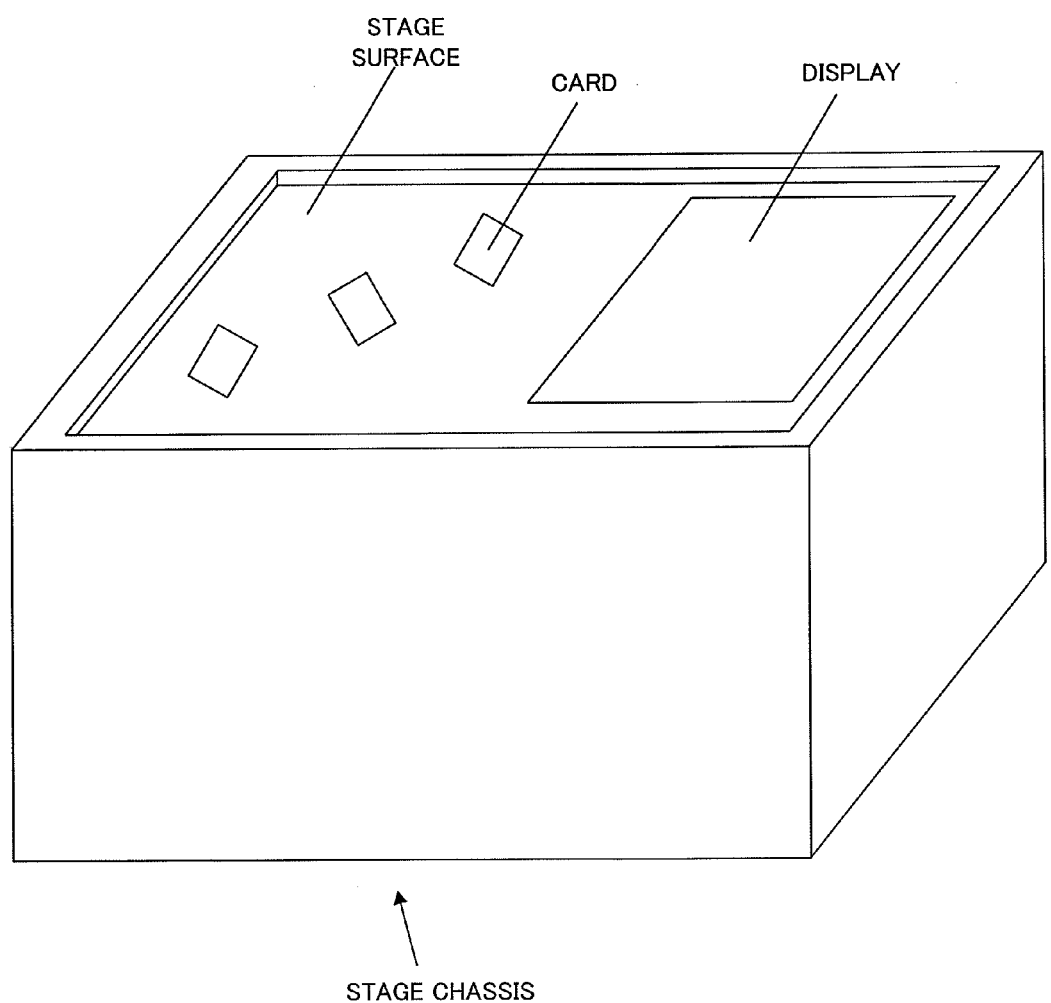
FIG. 16 is a perspective view illustrating a modification example of the stage chassis.

FIG. 16 is a perspective view illustrating another embodiment of the touch panel chassis (game device) in this embodiment, which has a display on right side of the stage surface. In this way, a display configured as part of a touch panel surface of a stage surface permits a display of motion pictures, scores, or the like in line with progress of the game. Further, in FIG. 16, even though a card is placed in a display region, a dot pattern on the back surface of the card cannot be recognized; the display portion also has the touch panel function; thus, icons and buttons displayed on the display can be directly touched and controlled by a player.

Figure 17A:
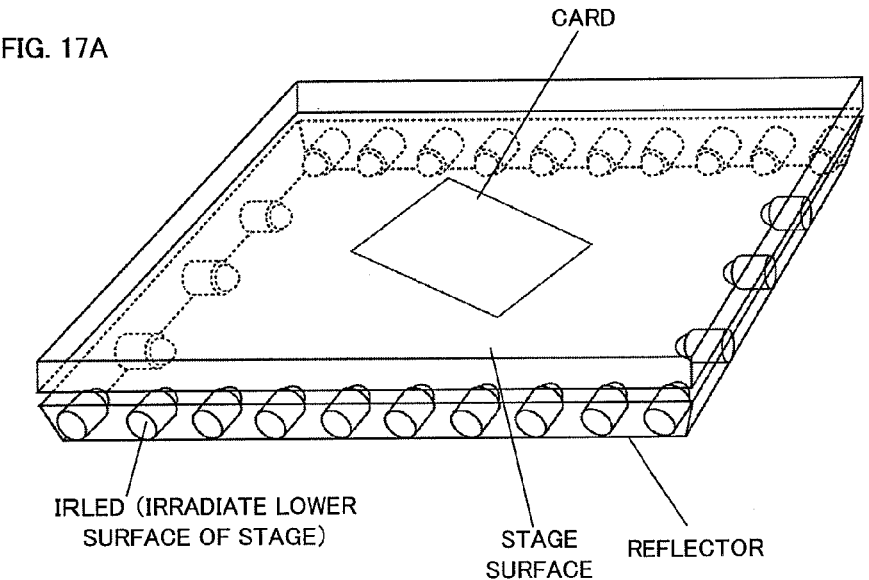
FIGS. 17A and 17B are perspective views of an arrangement of a card, IRLED, and touch panel.
Figure 17B:
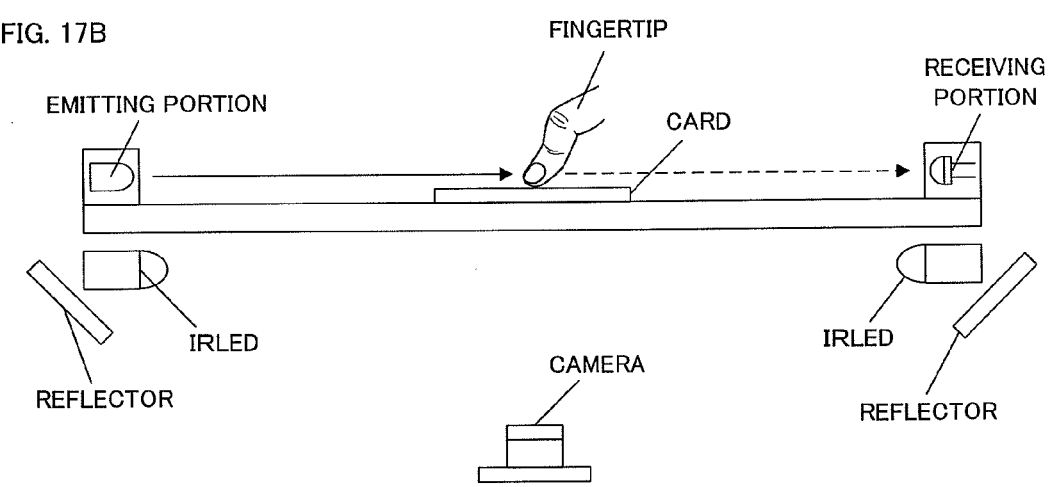

Inner structure of this stage chassis is as shown in FIGS. 17A and 17B. In this embodiment, if a card on which a dot pattern is printed is placed on a touch panel (stage surface), infrared irradiation light irradiated from IRLED irradiates the whole back surface of the touch panel via a reflector on a frame. The infrared irradiation light reflected by the back surface of the card is captured by a camera.

When a sensor unit and a micro processing unit (MPU) read a dot pattern printed on the card, the dot pattern is converted into code values, and images or motion pictures corresponding to the code values are displayed on a display device.

Figure 53A:
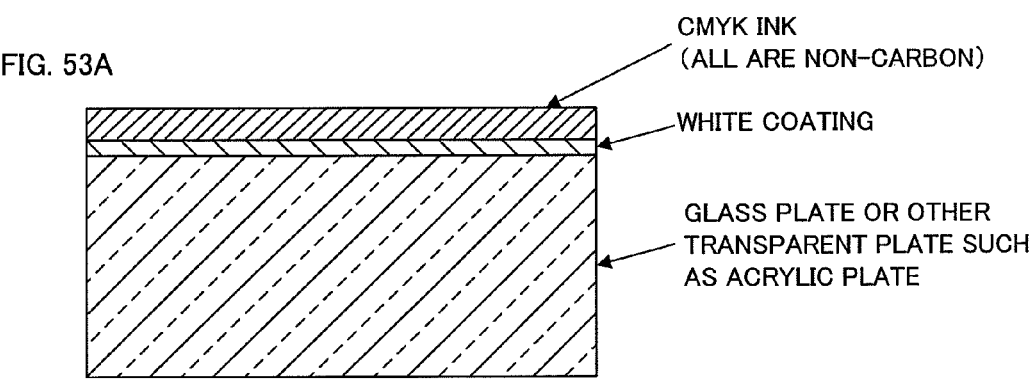
FIGS. 53A and 53B are longitudinal cross-sectional view showing an enlarged cross section structure of a stage of a stage chassis.
Figure 53B:
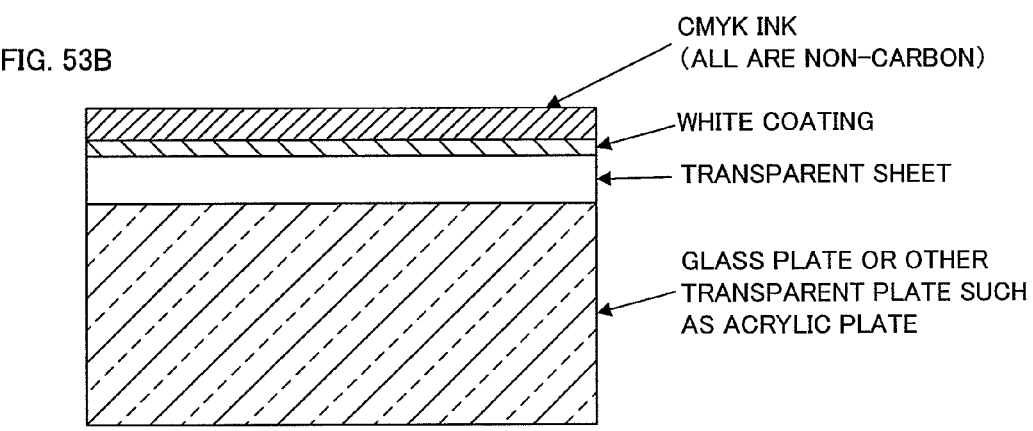

Additionally, cross-section structure of the stage surface on the upper surface of this stage chassis is the structure shown in FIGS. 53A and 53B.

As shown in FIG. 53A, the stage surface is a layered structure where non-carbon ink is applied on the upper surface of the transparent glass plate. Applied on the upper surface of the glass plate is white ink. Further on the white ink, an image is drawn with CMYK non-carbon ink. The white ink and non-carbon ink are ink which transmits infrared rays. The dot pattern printed on the back surface of a card placed on the stage surface is printed with carbon ink which has infrared ray absorption characteristics. When infrared rays are irradiated from the lower surface of the stage surface, the infrared rays are transmitted through non-carbon ink portion and absorbed at the dot pattern portion on the back surface of the card. Therefore, when the reflected light is imaged, only the dot pattern portion is imaged as black.

Due to the white ink applied on the upper surface of the glass plate, an image printed on a layer above the white ink layer stands out.

Also, as shown in FIG. 53B, a transparent sheet on which an image is printed with white and CMYK non-carbon inks may be removably attached on the upper surface of the glass plate.

In the present invention, a transparent plate other than a glass plate, such as an acrylic plate, may be used.

Figure 18:
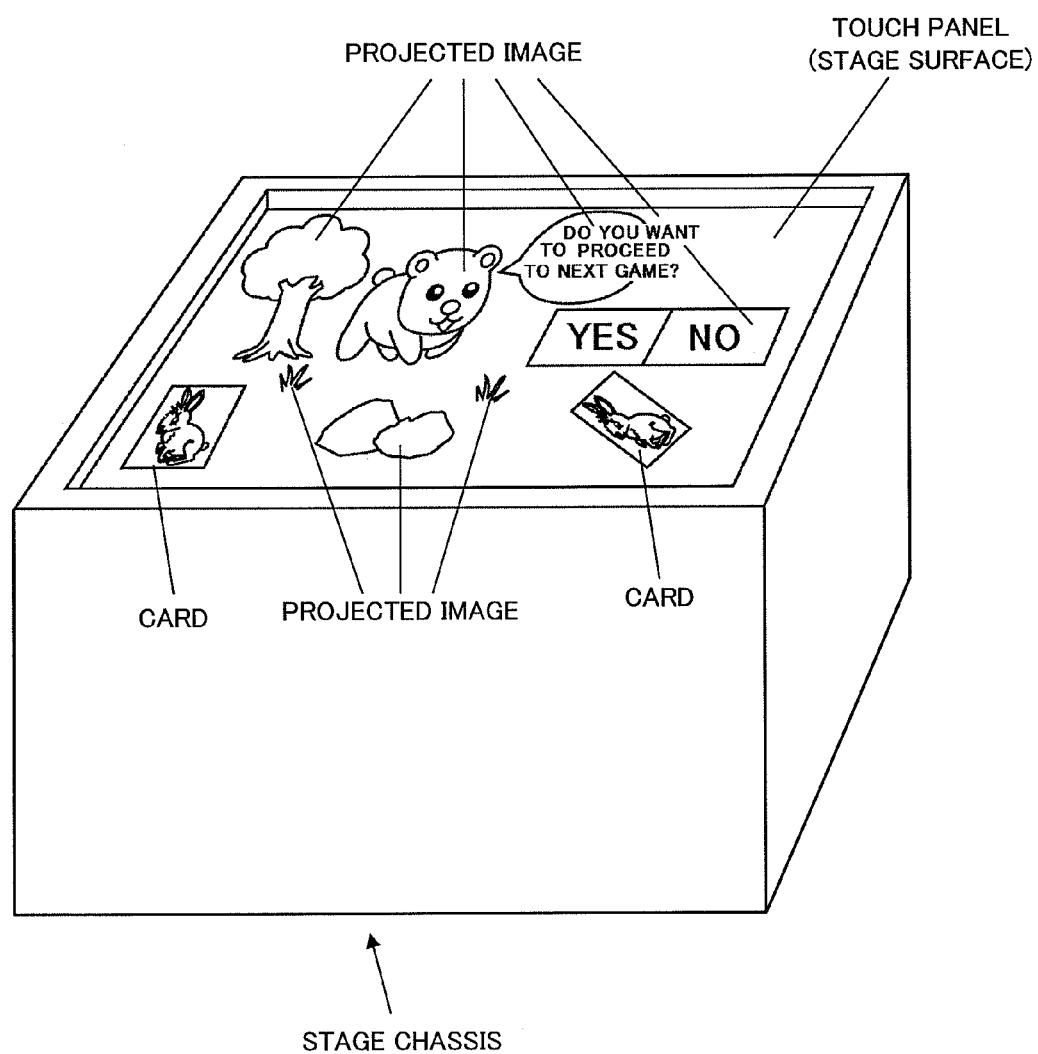
FIG. 18 is a perspective view showing a modification example of the stage chassis.
Figure 19:
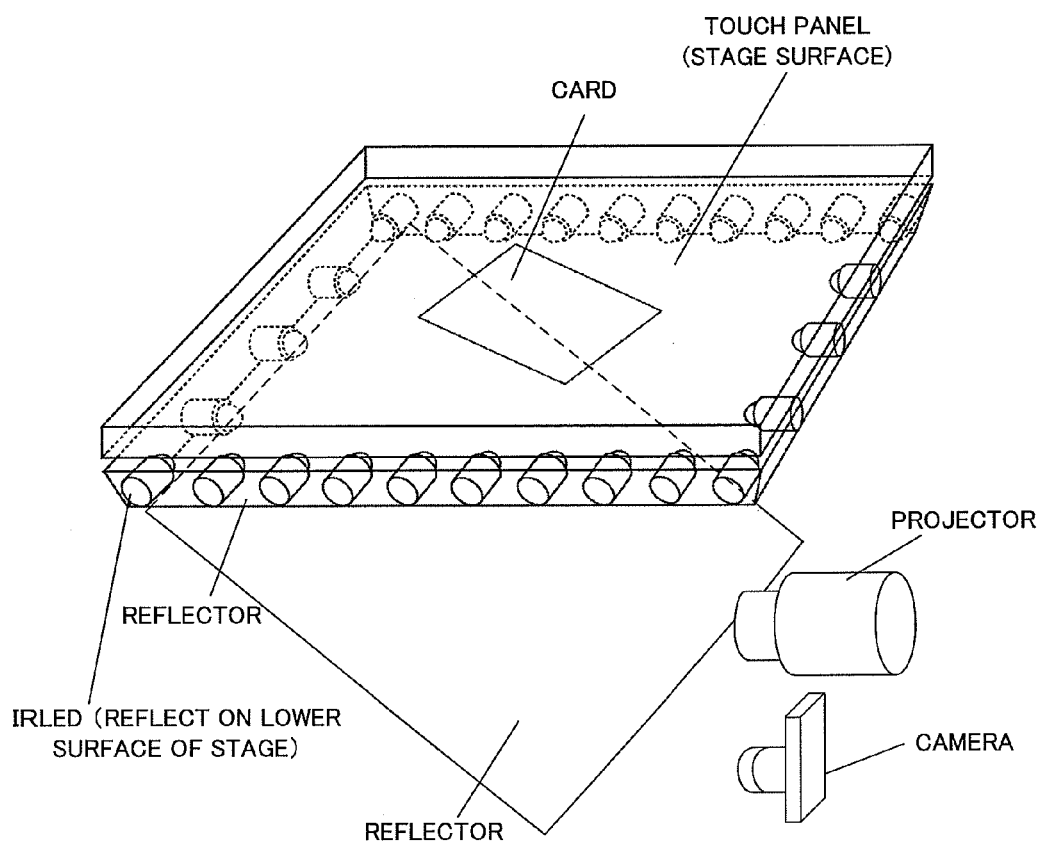
FIG. 19 is a perspective view illustrating an arrangement of a card, IRLED, and touch panel.

FIGS. 18 and 19 illustrate, in another stage chassis of this embodiment, a stage chassis characterized by a video displayed on a touch panel (stage surface).

This embodiment features a camera (imaging unit) and a projector as a projection unit disposed on the side of the space under the touch panel (space under the stage). The projector controls images or motion pictures projected on the stage surface based on code values or coordinate values of a dot pattern obtained from a captured image of the camera.

In this embodiment, if a card on which a dot pattern is printed is placed on a touch panel (stage surface), for example, infrared irradiation light irradiated from IRLED irradiates the entire lower surface of the touch panel via a frame-shaped reflector. Infrared irradiation light reflected by the back surface of the card is further reflected by a mirror and captured by the camera. At this time, the projector projects an image or motion pictures on the lower surface of the stage via a mirror.

After a sensor unit and a micro processing unit (MPU) read the dot pattern printed on the card and convert the dot pattern into code values, the projector projects images or motion pictures corresponding to the code values.

In this way, as well as images or motion pictures are projected by the projector from the lower surface of the stage surface, the images and motion pictures projected are controlled by the card on which a dot pattern is printed placed on the stage surface.

Even in such system where a projector is provided, images and motion pictures displayed on the stage surface may be controlled by a positioning of the card on the touch panel. Also, for example, icons for playback, fast-forward, rewind and the like may be printed on the surface of the card, and motion pictures projected from below the touch panel (below stage) may be controlled by touching the icon region with a finger (see FIGS. 38A and 38B).

FIGS. 20 to 23 are diagrams explaining a dot pattern used on a card used for the stage chassis illustrated in FIGS. 15 to 19. It should be noted that the basic algorithm of this dot pattern is almost the same as the one described in FIGS. 4-11D, but is different in the facts that only one dot pattern for representing a single code is printed and a direction dot which indicates a direction of the dot pattern exists.

Figure 20:
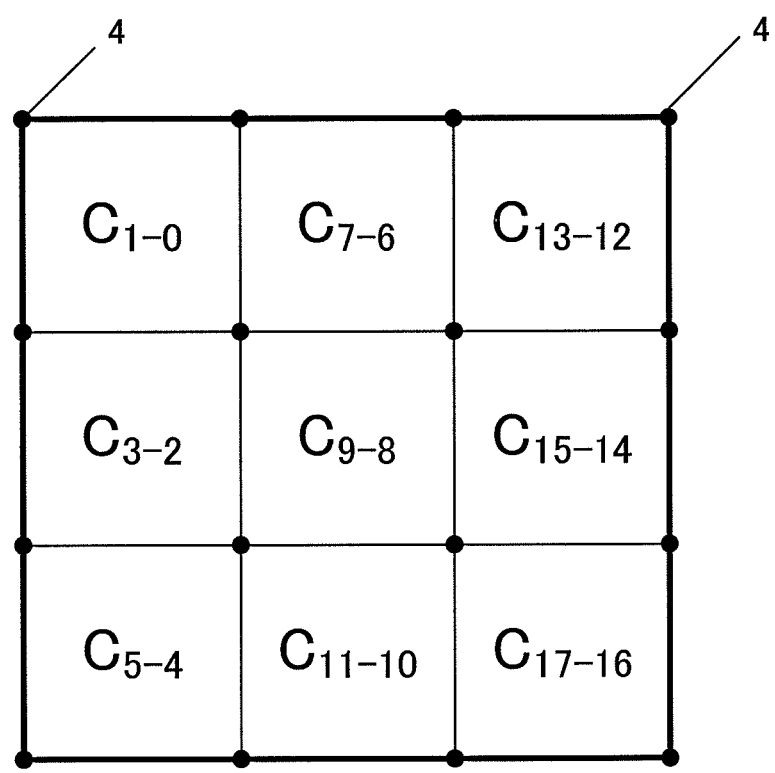
FIG. 20 is an explanatory diagram illustrating an arrangement of dot patterns shown in FIGS. 22 and 23.

FIGS. 20 and 21 are explanatory diagrams showing a relationship among a dot pattern, a code value, and an identifier.

As shown in FIG. 20, the dot pattern is a dot pattern constituted by 3×3 block regions and divided into $C_{1-0}$-$C_{17-16}$ blocks. FIG. 21 shows a dot code format of each region.

As shown in FIG. 21, $C_0$-$C_5$ are operation codes, $C_6$-$C_{15}$ are content/application codes, $C_{15}$-$C_{17}$ are parities.

Figure 22:
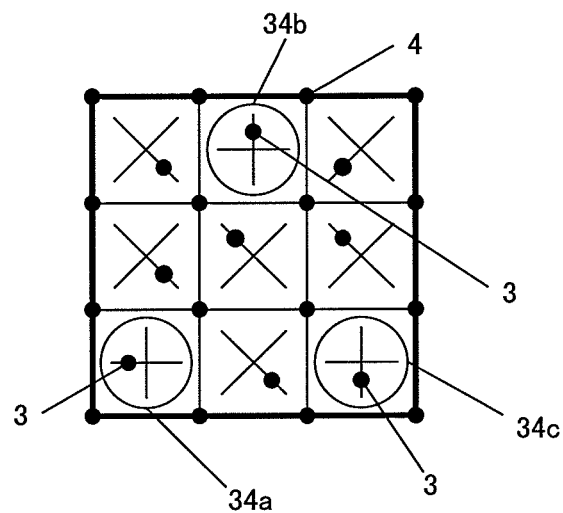
FIG. 22 is an explanatory diagram of a dot pattern in FIGS. 7A to 12 that defines a direction of a block by changing the way of arranging information dots.

In FIG. 22, block directions of the dot pattern illustrated in FIGS. 6-11D, a dot pattern having blocks constituted by 3×3=9 grid regions, are defined by changing, within a specific grid region (direction region), the orientation of only information dot 3 from the orientations of other grid regions (direction region).

That is, in FIG. 22, information dots 3 are arranged in horizontal and vertical directions from the center in the lower left grid region 34A, central grid region 34B, and lower left grid region 34C. In other grid regions, information dots 3 are arranged diagonally from the center. Since the grid regions 34A, 34B and 34C are arranged in this way, according to a triangle shaped by connecting these grid regions, that is the apex 34B in relation to the base (34A to 34C), the blocks are recognized as facing upward.

In this way, arrangement relationship of grid regions 34A, 34B, and 34C, where arrangement directions of information dots 3 are changed (information dots are arranged in horizontal and vertical directions from the center), (in this example, triangle) can define the direction of the block. Therefore, since information dots 3 can be arranged in all grid regions of blocks, information dots 3 can be arranged in all grid regions without sacrificing grid regions for key dots.

Figure 23:
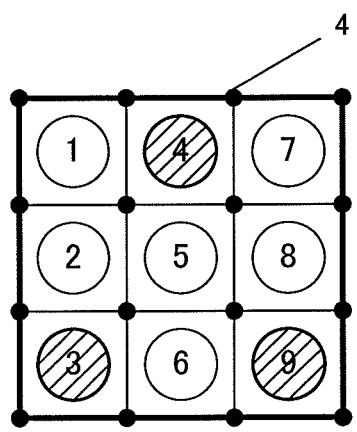
FIG. 23 is an explanatory diagram of a dot pattern in FIGS. 7A to 12 that defines a direction of a block by changing the way of arranging information dots, and showing an information dot arrangement.

FIG. 23 is a diagram showing an arrangement of information dots 3 corresponding to FIG. 22.

When printing a dot pattern on the back surface of a card, the gap between grids are preferably about 15 mm, and the size of a dot is preferably about 15% of the gap between dots. Thus, 2 mm to 2.5 mm is preferable without limitation for these. Upon imaging, the resolution of the gap between dots is preferably 14 pixels or above.

Figures 24A, 24B:
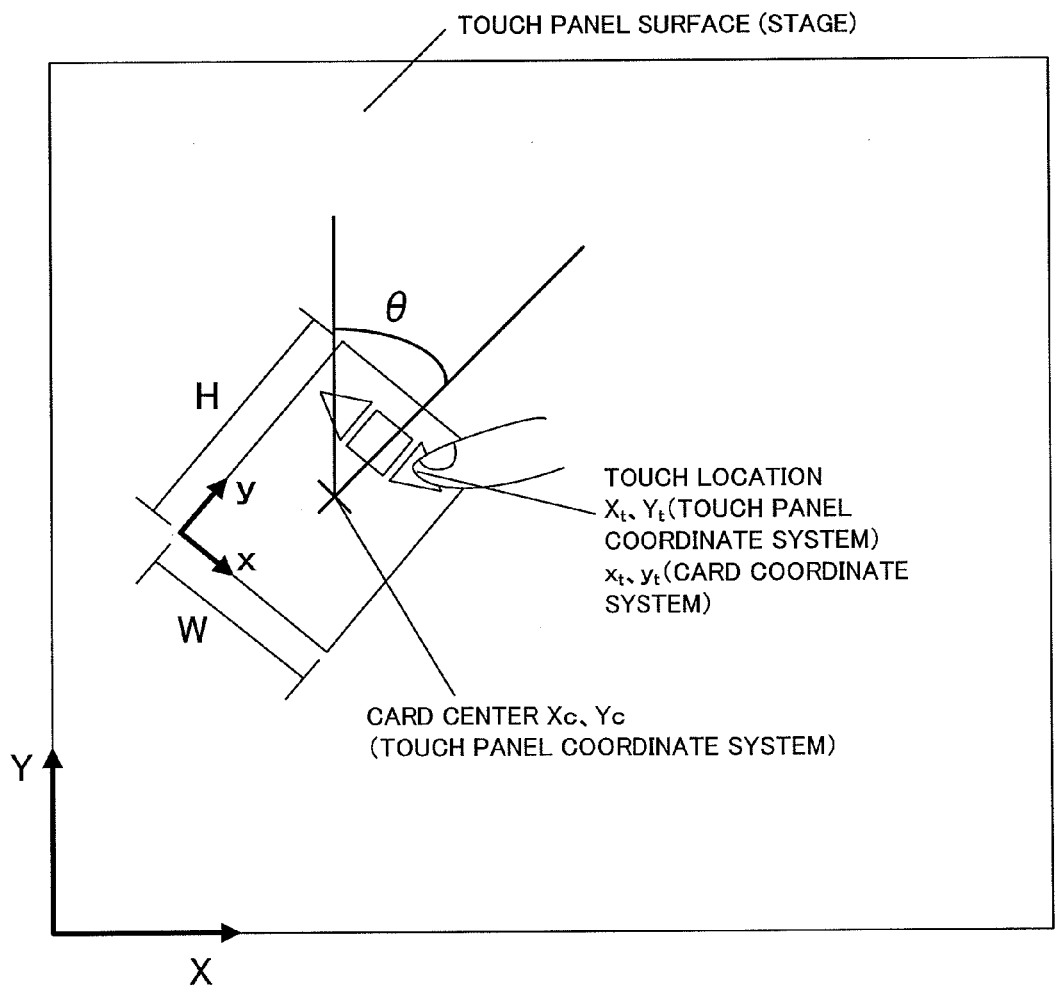
FIGS. 24A and 24B are explanatory views illustrating a method for computing a location of a fingertip when touched by a user.

FIGS. 24A and 24B are diagrams illustrating a method for computing a location touched by a fingertip of a player/operator (touch location).

It is assumed that W represents the width of a card, H represents the height of the card, and the coordinates of the central position of the card in touch panel coordinate system are $(X_c, Y_c)$. Also, it is assumed that θ represents the card's rotation angle, that is, the angle between Y direction of the touch panel coordinate system and y direction of the card's coordinate system.

In this case, a touch location by a fingertip of a player/operator is assumed as $(X_t, Y_t)$, when described in the touch panel coordinate system. The touch location $(X_t, Y_t)$ in the card's coordinate system is expressed by the following equation:

$$\begin{Bmatrix} x_t \\ y_t \end{Bmatrix} = \begin{Bmatrix} \frac{W}{2} \\ \frac{H}{2} \end{Bmatrix} + \begin{Bmatrix} \cos\theta & \sin\theta \\ -\sin\theta & \cos\theta \end{Bmatrix} \begin{Bmatrix} X_t - X_c \\ Y_t - Y_c \end{Bmatrix}$$

By performing such arithmetic processing, the portion of a printing on the surface of a card touched by a finger can be recognized, regardless of the orientation of the card placed on the touch panel (stage).

Although the case the touch on the card surface is done by a fingertip of a player/operator is described in FIG. 24A, this may be performed by a touch pen, etc. as a matter of course.

Figure 25A:
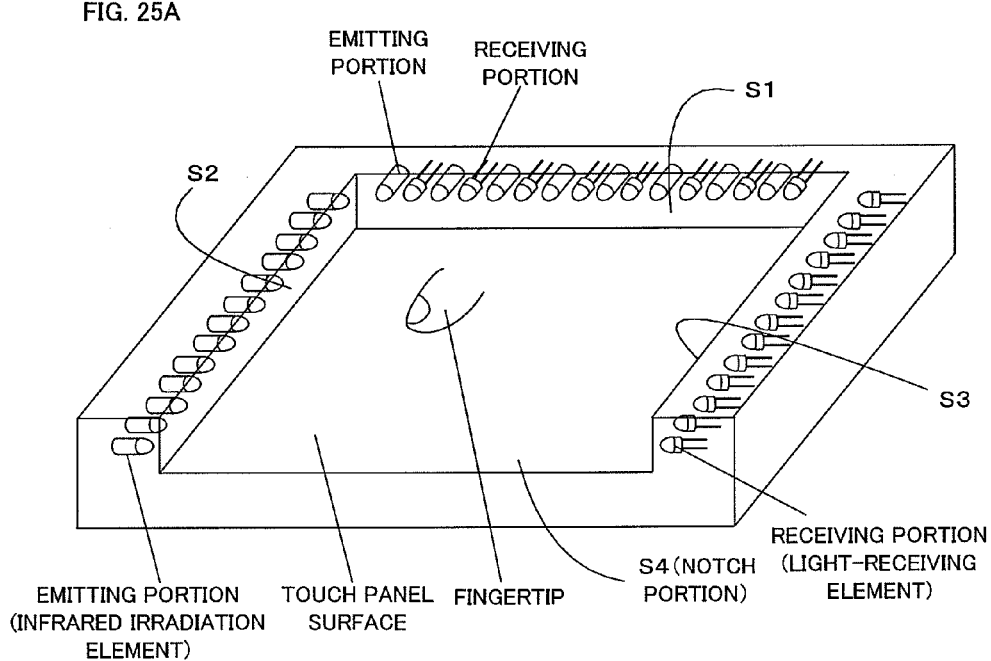
FIGS. 25A and 25B are perspective views illustrating a touch panel chassis having a notch portion or a curved side wall portion.
Figure 25B:
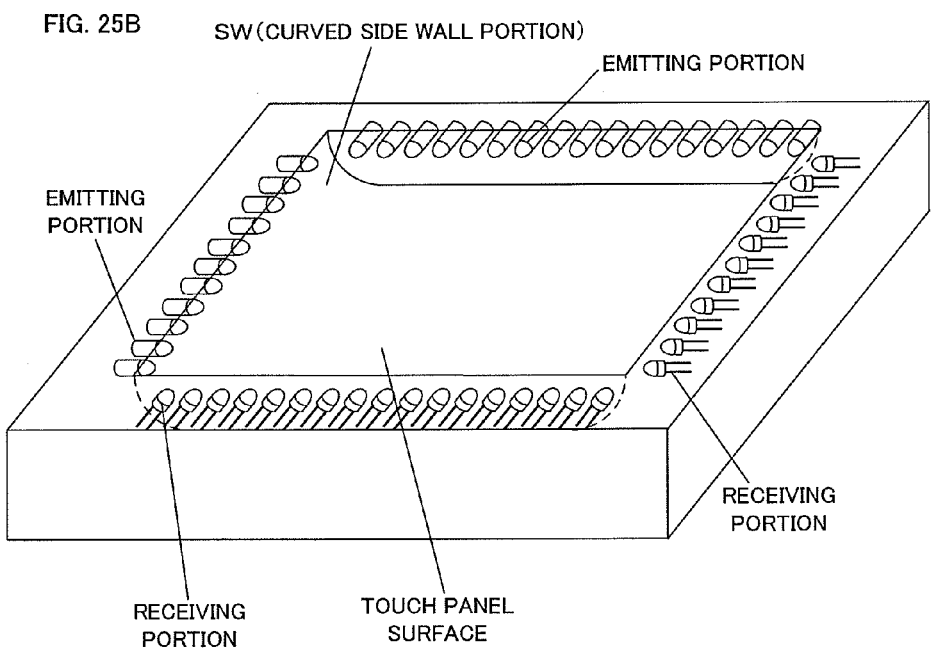

FIGS. 25A and 25B are diagrams illustrating a coordinate recognition unit (touch panel) having a notch or curved side wall portion on part of the peripheral wall portion of the panel, in order to retract the touch panel or a medium on the stage surface from the panel surface.

In FIG. 25A, on one side of the peripheral wall S1, one or a plurality of infrared irradiating elements as an emitting portion and one or a plurality of light-receiving elements as a receiving portion are adjacently disposed one after the other. On sides S2 and S3 adjacent to the one side of the peripheral wall S1, infrared irradiation elements or light-receiving elements are disposed respectively. XY coordinates of a finger on a touch panel or a stage can be recognized based on the fact that the light-receiving elements on the opposed surface do not receive the infrared light as irradiation light irradiated from the infrared irradiating elements and blocked by an operator's finger directly touching the touch panel or the stage, or a player/operator's finger touching a medium on the touch panel or the stage.

Here, a side S4 opposed to the one side S1 is configured as a notch portion. A medium such as a card can be retracted by a finger from the touch panel or the stage surface through this notch portion.

It should be noted that although in the example of FIGS. 25A and 25B diagrams of a state in which a finger of a player touching the touch panel or the stage surface are illustrated, the finger can be replaced with other three-dimensional object such as a touch pen or a figure.

FIG. 25B is a diagram illustrating a coordinate recognition unit of the touch panel, embedded in the peripheral wall portion of the touch panel or the stage. The coordinate recognition unit (touch panel) has a side wall (curved side wall portion SW) curved from the touch panel or the stage surface in order to retract a medium on the touch panel or the stage surface from the touch panel surface.

Infrared irradiation elements and light-receiving elements, which receive the infrared light, are disposed on the peripheral wall portion (peripheral wall) as a coordinate recognition unit.

As such, by making part of the side wall a curved side wall portion SW curved from the touch panel surface, removal of the card becomes very easy.

Figure 26A:
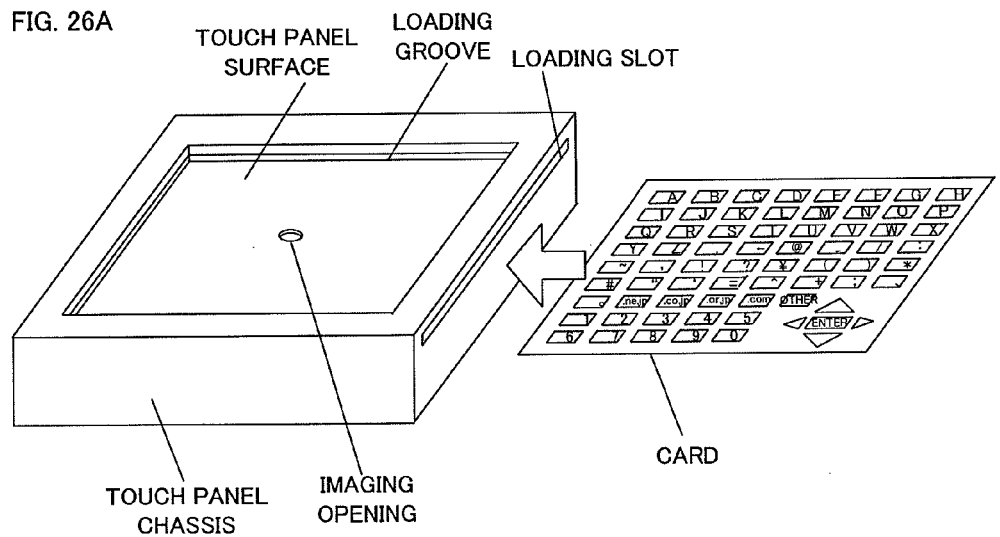
FIGS. 26A and 26B are perspective views illustrating a touch panel chassis having an insertion opening for insertion of a card.
Figure 26B:
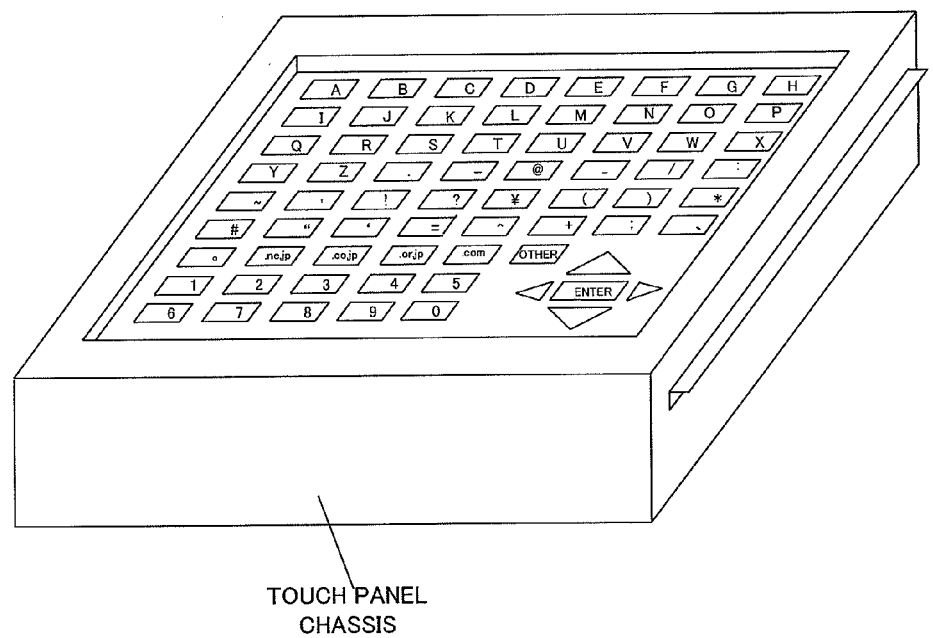

In FIGS. 26A and 26B, a card loading slot is provided on a side of a touch panel chassis. A card having cords printed on the back surface of which as a dot pattern and key buttons such as alphabet buttons printed on the front surface of which can be loaded from the card loading slot. An imaging opening is provided on the touch panel surface side of the touch panel chassis so that the dot pattern printed on the back surface of the card loaded from the loading slot can be read by an imaging unit (camera) from inside the chassis.

That is, the control unit can recognize which region printed on the surface of the card is touched by recognizing codes read from a dot pattern on the back surface of the card and the position of XY coordinates on the surface of the touch panel touched by an operator or player, or a user.

In this way, according to the touch panel chassis shown in FIGS. 26A and 26B, since a card can be inserted of ejected from the card loading slot, the card can be removed from the touch panel without having a notch portion.

As shown in FIGS. 26A and 26B, as a card loaded from the card loading slot is assuredly positioned on the touch panel surface, XY coordinate system on the surface of the card can perfectly match XY coordinate system recognized by the touch panel. A location touched by a finger or a medium on the card is easily recognized without performing a complicated calculation.

Although an alphabet key top layout which is similar to a keyboard is printed on the surface of the card as a pattern, it is not limited to alphabet; an icon, photograph, illustration and the like may be printed on divided regions.

Information output device in the present invention can be used for a variety of usages, by changing the card content. FIGS. 27 to 46B are diagrams illustrating the specific examples of cards.

Any and all cards described below are used by being placed on the touch panel chassis or the stage chassis.

When a card is placed by an operator/player, the dot pattern is read from a camera in the touch panel chassis or the stage chassis, then central processing unit of the camera or a computer converts the dot pattern into code values. As a result, the card content is recognized. Moreover, an icon, a picture, or the like printed on the card surface is touched by an operator/player, as described above, a location touched is recognized and a process corresponding to the instruction of the icon or the content of the picture or the like is performed.

Figure 27:
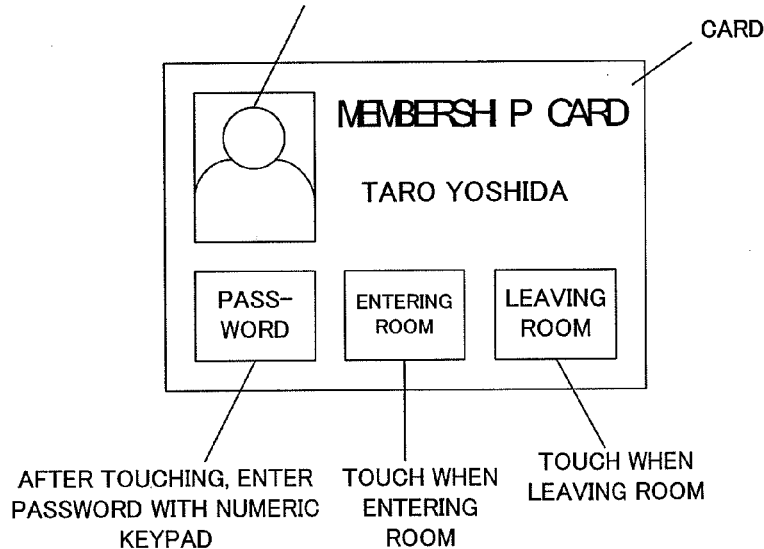
FIG. 27 is a diagram illustrating a specific use example of a card, when the card is used as a membership card.

FIG. 27 is a diagram when the card is used as a membership card.

After touching the "PASSWORD" printed lower left of the card, an operator enters the password using a numeric keypad. Next, the operator touches a photograph of a face printed upper left of the card to display registered personal information on a display. Further, entering and leaving the room are possible by touching "ENTERING ROOM" upon entering the room and "LEAVING ROOM" upon leaving the room.

Figure 28A:
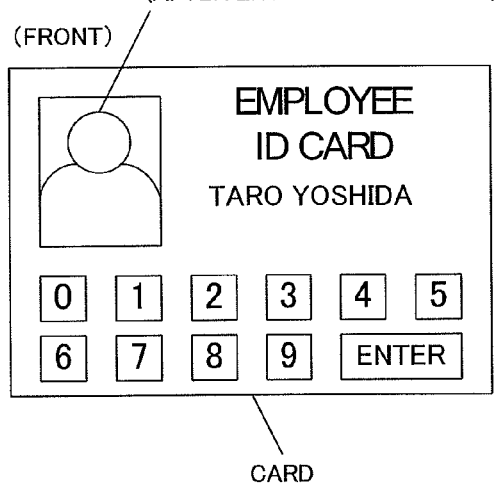
FIGS. 28A and 28B are diagrams illustrating specific use examples of a card, when the card is used as an employee ID card.
Figure 28B:
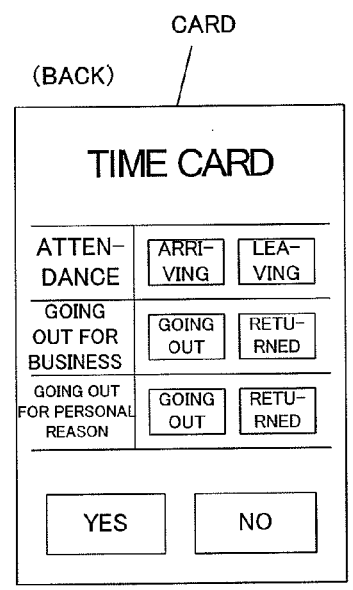

FIGS. 28A and 28B are diagrams when the card is used as an employee ID card.

An operator enters a password by touching numbers printed lower left of the card and then "Enter." Next, a registered personal information is displayed on a display device by touching a photograph of a face printed lower left of the card.

The back surface of the card constitutes a time card. For example, processing for arriving and leaving office is performed, by touching "ARRIVING" upon arrival of the office and touching "LEAVING" upon leaving the office.

Figure 29:
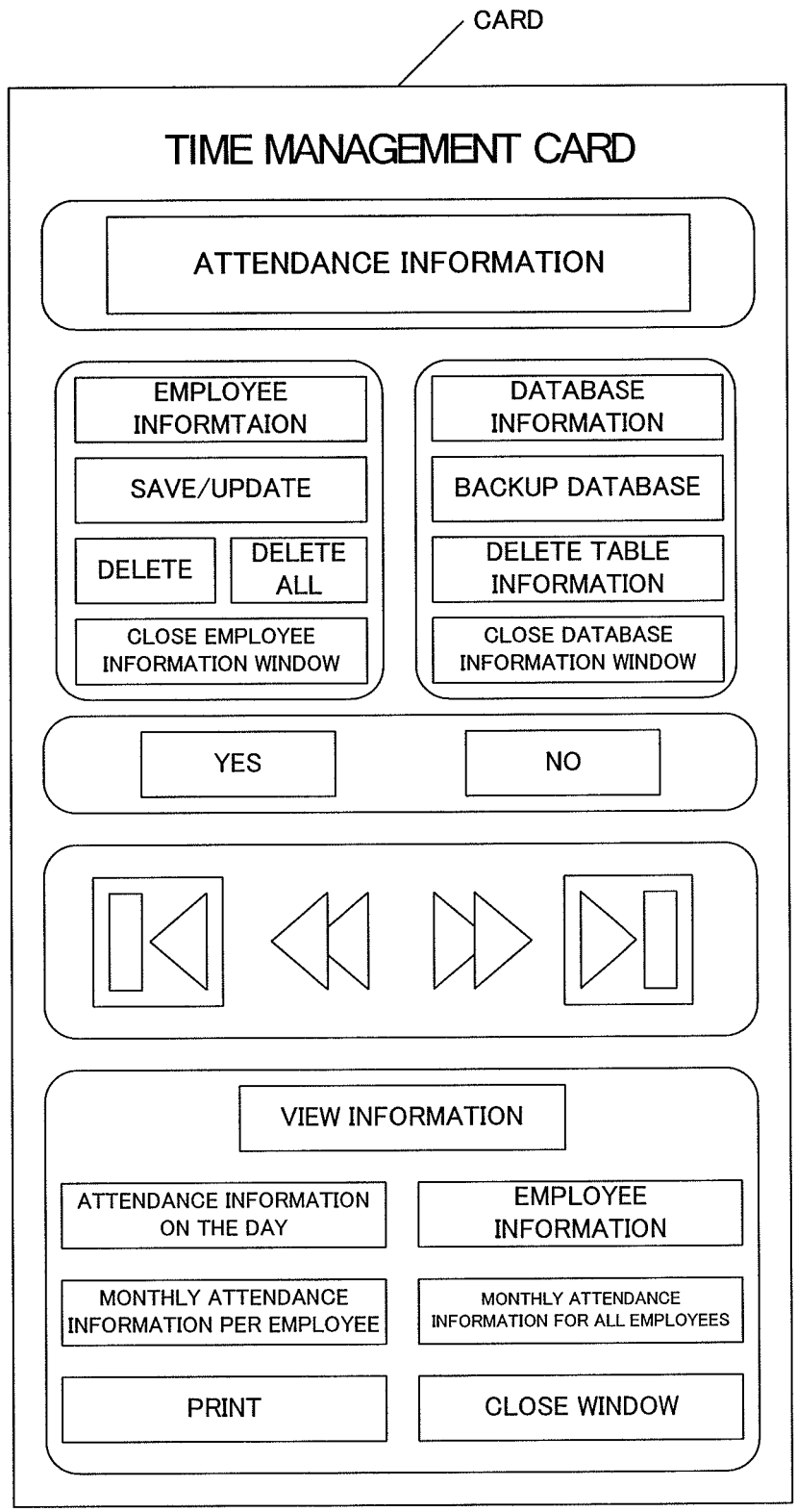
FIG. 29 is a diagram illustrating a specific use example of a card, when the card is used as a card for time management.

FIG. 29 is a diagram when the card is used as a card for time management.

The card is primarily used by a manager for managing the attendance states of employees. When an operator touches "ATTENDANCE INFORMATION," information including arriving time and leaving time of each employee is displayed on a display device. Further, if the operator touches "EKPLOYEE INFORMATION," more detailed information of the employee is displayed. Likewise, if the operator touches icons, a variety of information may be displayed on the display device.

Figure 30:
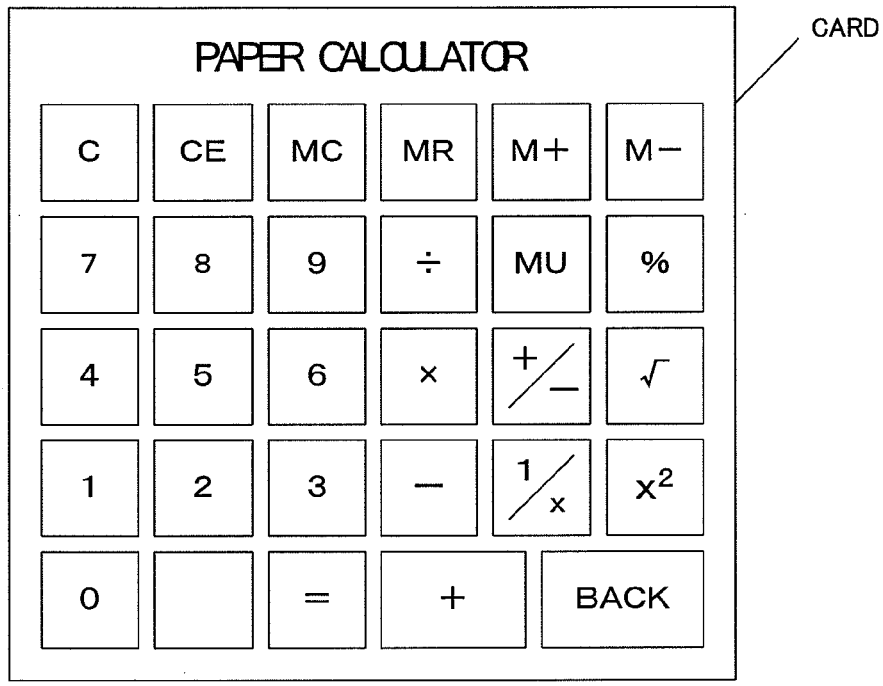
FIG. 30 is a diagram illustrating a specific use example of a card, when the card is used as a calculator.

FIG. 30 is a diagram when the card is used as a calculator.

When an operator touches a number, symbol of calculation or the like printed on the card surface, the number, etc. and the calculation results are displayed.

Figure 31:
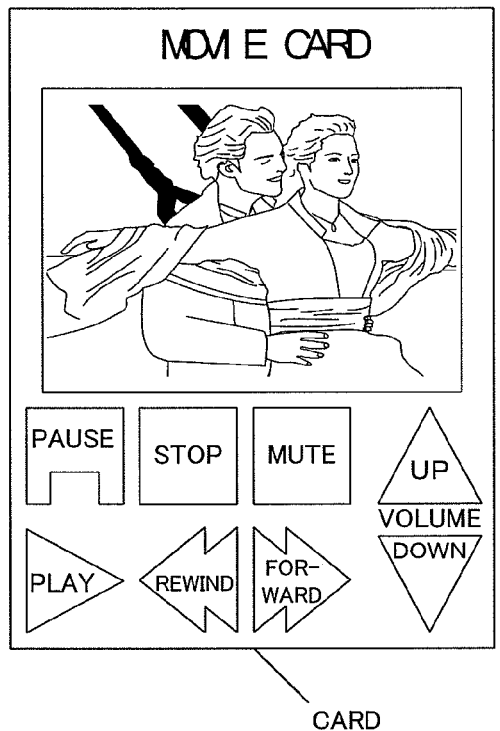
FIG. 31 is a diagram illustrating a specific use example of a card, when the card is used as a card for movie viewing.

FIG. 31 is a diagram when the card is used as a card for movie viewing.

Upper half of the card displays a picture of one scene of a movie, photograph, or the like. When an operator touches "PLAY," a movie is played on the display device. When "STOP" is clicked, playback stops. When "MUTE" is touched, sound is muted. Further, when the operator wants to change sound volume, operator may touch "UP" or "DOWN." When the operator wants to rewind, he or she may touches "REWIND," and when the operator wants to fast-forward, he or she mat touches "FORWARD."

Figure 32:
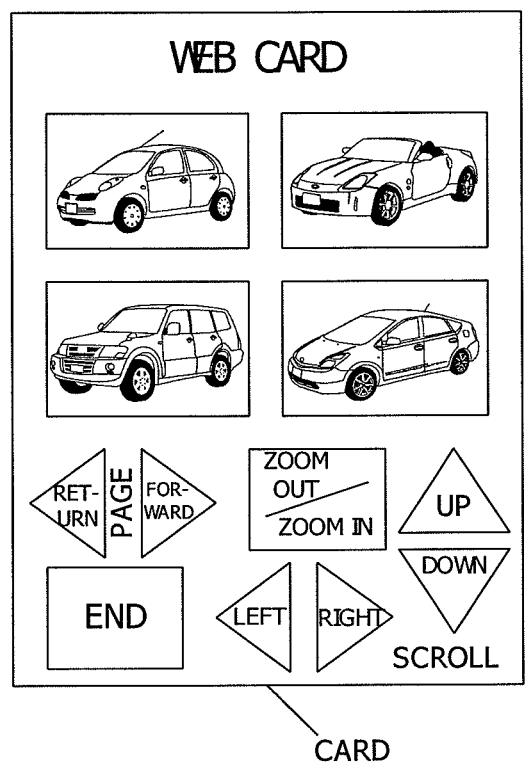
FIG. 32 is a diagram illustrating a specific use example of a card, when the card is used as a card for Web browsing.

FIG. 32 is a diagram when the card is used as a card for Web browsing.

Pictures of cars are displayed on the upper portion through center portion. When one of the pictures is touched by an operator, a Web page related to the displayed picture is accessed. When the operator wants to proceed to the page following the page displayed, he or she touches "NEXT." When the operator wants to return to the previous page, he or she touches "RETURN." When the operator wants to change the size of the photograph or the like on the page, he or she touches "ZOOM IN/ZOOM OUT." When the operator wants to scroll the screen, he or she touches any one of "UP," "DOWN," "LEFT," or "RIGHT." When ending the Web browsing, the operator touches "End."

Figure 33A:
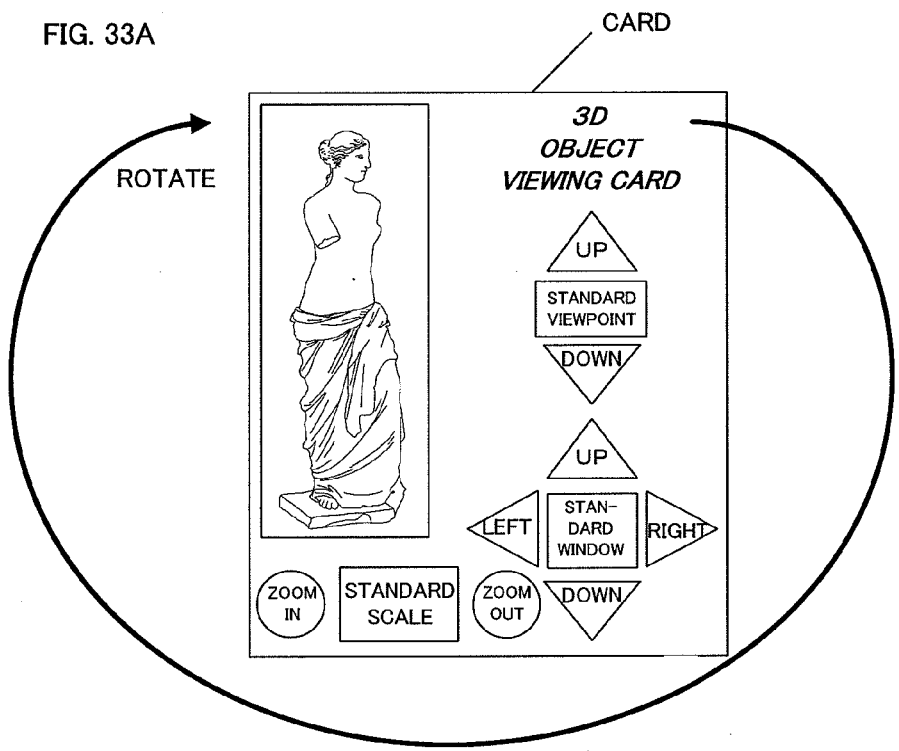
FIGS. 33A and 33B are diagrams illustrating specific use examples of a card, when the card is used as a card for viewing 3D objects.
Figure 33B:
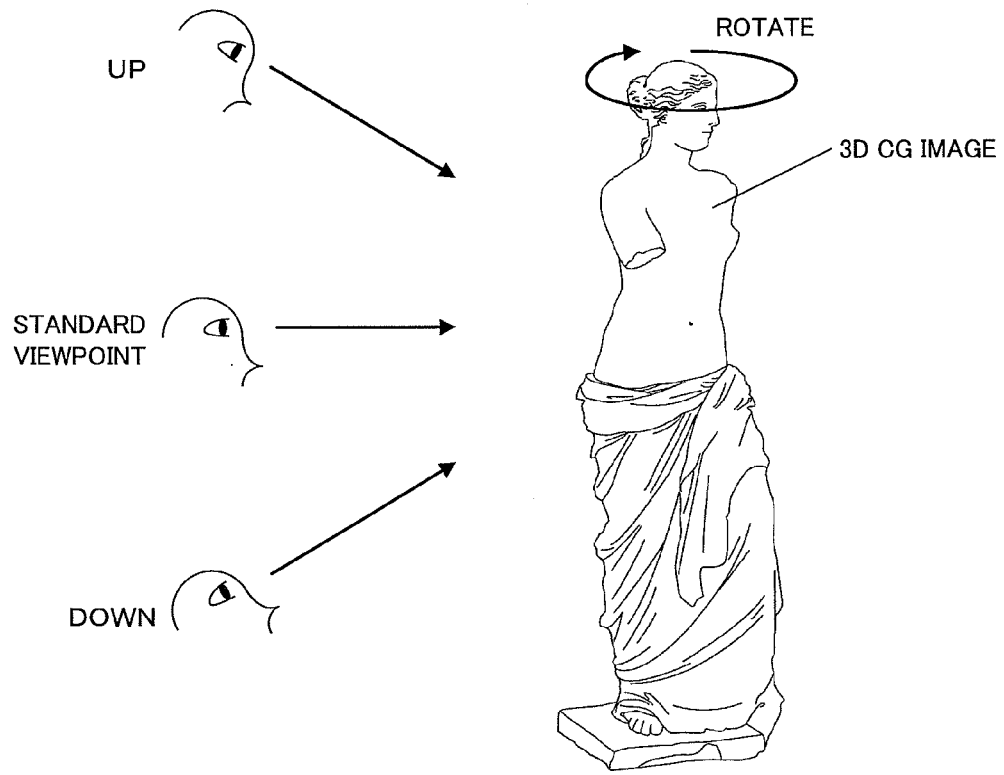

FIGS. 33A and 33B are diagrams when the card is used as a card for viewing 3D objects.

The card shown in FIG. 33A is placed on the upper panel surface of the touch panel chassis, 3D-CG image of an object (three dimensional video) is displayed. When an operator touches a photograph of the object, a description about the object is displayed. When the "UP" symbol is touched, as shown in FIG. 33B, a video of the object in a way when looked up from below is displayed. When "STANDARD VIEWPOINT" symbol is touched, a standard video is displayed. When a "DOWN" symbol is touched, a video of the object in a way when looked down from above is displayed. "UP" of "STANDARD WINDOW" raises the viewpoint without changing viewpoint's angle, and upper portion of the object is displayed. When the "STANDARD WINDOW" symbol is touched, the center of the object is displayed as the center of the video. "ZOOM IN" displays an enlarged video in a way when the operator approaches toward the viewpoint direction, without changing viewpoint's angle. "ZOOM OUT" is the contrary; a reduced video is displayed. When the "STANDARD SCALE" symbol is touched, the video is displayed in a standard scale. Also, as shown in FIG. 33A, when the card is rotated, the object rotates 360 degrees.

Figure 34:
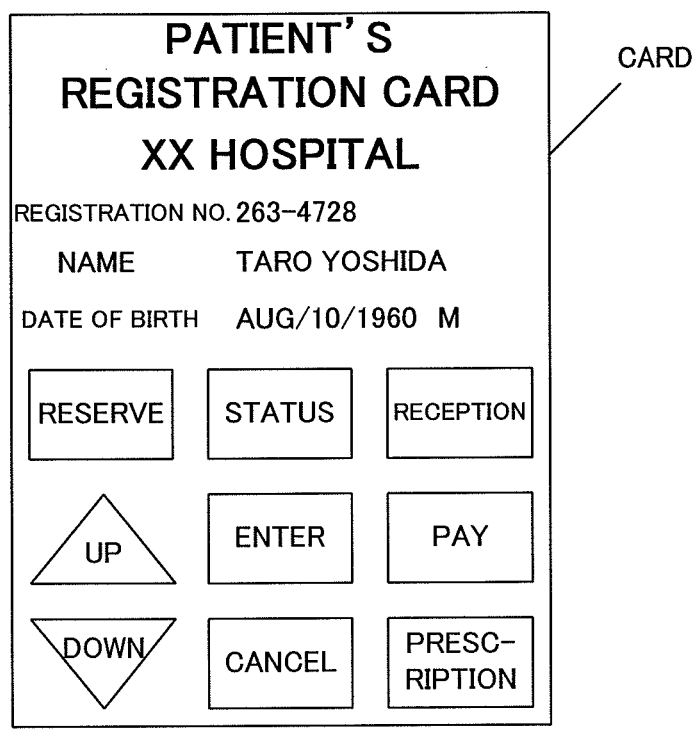
FIG. 34 is a diagram illustrating a specific use example of a card, when the card is used as a patient's registration card.

FIG. 34 is a diagram when the card is used as a patient's registration card.

A touch panel chassis is installed in a hospital or clinic. When an operator places the card on the touch panel chassis, first, the operator's personal information is recognized by the dot codes in the back surface of the card. When the operator touches "RECEPTION," reception processing is performed. The operator touches "PAY" to pay after medical consultation, and "PRESCRIPTION" to receive a prescription.

FIGS. 35A to 35C are diagrams when the card is used as a card for shopping.

One or a plurality of touch panel chassis is installed in a shop such as a convenience store, the card shown in FIG. 35A is equipped in the vicinity of the touch panel chassis. When an operator clicks a photograph of goods displayed in the shopping card, as shown in FIG. 35B, a description of the goods is displayed in the left side of the display. "SHOPPING CART" on the lower portion of the card is touched to buy the goods displayed. Touching once orders one goods, touching twice orders two goods. The goods ordered and the number thereof are displayed on the right side of the display. When "UP" is touched, the highlight moves upward. When "DOWN" is touched, the highlight moves downward. When the operator touches "CANCEL ONE," the quantity of the goods highlighted decreases by one.

After goods and the number thereof are determined, "PURCHASE" is touched. As a result, a token shown in FIG. 35C is output. The operator, on later day, brings this token to a cash register of the shop and pays for the purchase. Then, the goods already packed are provided.

It should be mentioned that, in this embodiment, methods other than cash such as pre-paid cards may be used to pay.

Figure 36:
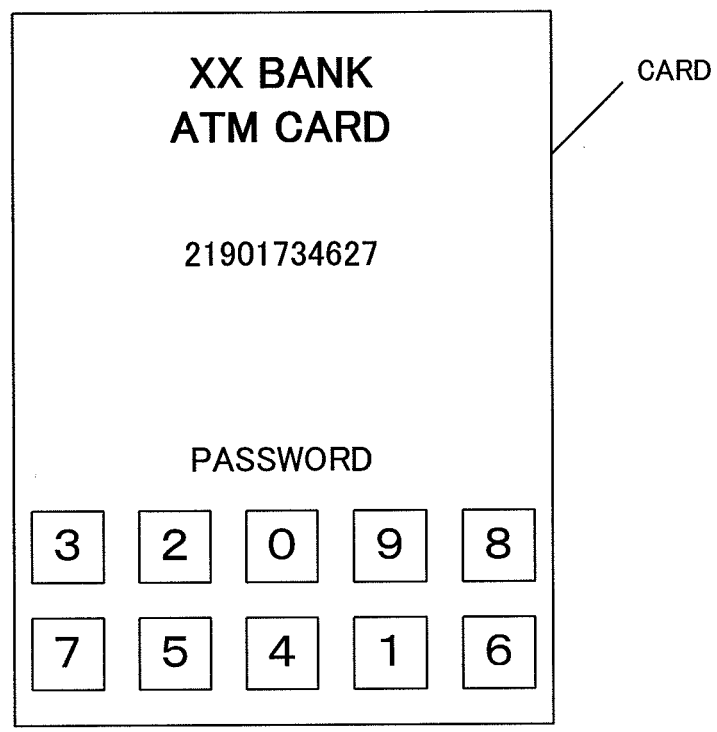
FIG. 36 is a diagram illustrating a specific use example of a card, when the card is used as an ATM card for banking.

FIG. 36 is a diagram when the card is used as an ATM card for banking.

When an operator places a card on the touch panel chassis, a dot pattern on the back surface of the card is read, and information such as an account number is recognized. The operator enters a predetermined password by touching numbers. Numbers on the card are arranged in random to prevent the password from being detected from a finger movement by a third person. When the password is recognized as entered correctly, the operator can perform processing such as a transfer or withdrawal.

FIG. 37 is a diagram when the card is used as an animal pictorial book card.

When an operator touches a picture or a photograph of an animal displayed on the card, a description of the animal is displayed on a display device. Further, when the "SOUND" symbol is clicked, the sound of the animal is output.

FIGS. 38A and 38B are diagrams when the card is used as a controller for a movie recorder.

FIG. 38A is the front surface of the card. FIG. 38B is the back surface of the card. When an operator places the card with FIG. 38A side up, it functions as a controller for a movie recorder. That is, the operator is enabled to perform operations such as movie recording, changing of sound volume, playback, play at fast speed, or play while fast rewinding. When the card is placed with the FIG. 38B side up, the operator can edit, for example, a movie title by touching alphabets, numbers, or the like.

Figure 39:
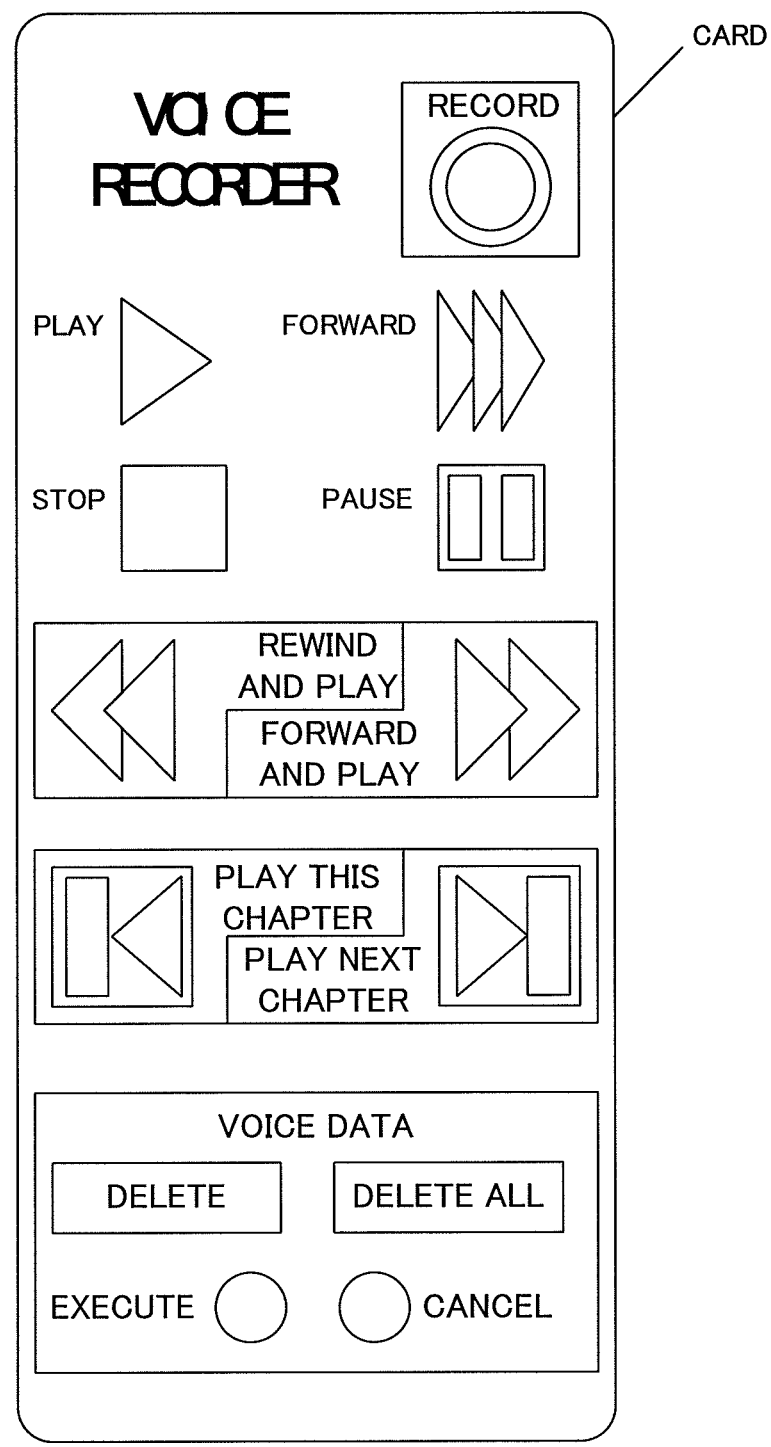
FIG. 39 is a diagram illustrating a specific use example of a card, when the card is used as a controller for a voice recorder.

FIG. 39 is a diagram when the card is used as a controller for a voice recorder. In this embodiment, the touch panel chassis is connected to a voice recorder via a USB cable, etc. When an operator touches "RECORD," sound is started to be recorded. When "PLAY" is touched, playback processing of the sound recorded in the voice recorder is performed. Likewise, when the operator touches icons such as "FORWARD," "STOP," or "PAUSE," a processing corresponding to the icon is performed.

FIGS. 40A and 40B are diagrams when the card is used as a recipe card.

FIG. 40A is the front surface of the card. FIG. 40B is the back surface of the card. When an operator touches a photograph of an ingredient (in this case, celery) displayed on the center portion of the surface, the effects of the ingredient (celery) is described on the display device. When an advertisement photograph displayed on the lower portion of the card is touched, the content of the advertisement photograph (in this case, electronic cooking equipment) is displayed via the Internet or as video. Further, when the operator touches a photograph of a serving food displayed on the upper portion of FIG. 40B, a scene of arranging food on a dish is introduced on the display device. When the description portion of the ingredient displayed on the center portion is touched, the ingredient is introduced. Also, when the cooking method displayed on the lower portion is touched, the cooking method of the food displayed as a photograph on the upper portion of the card is introduced as a video on the display device.

Figure 41A:
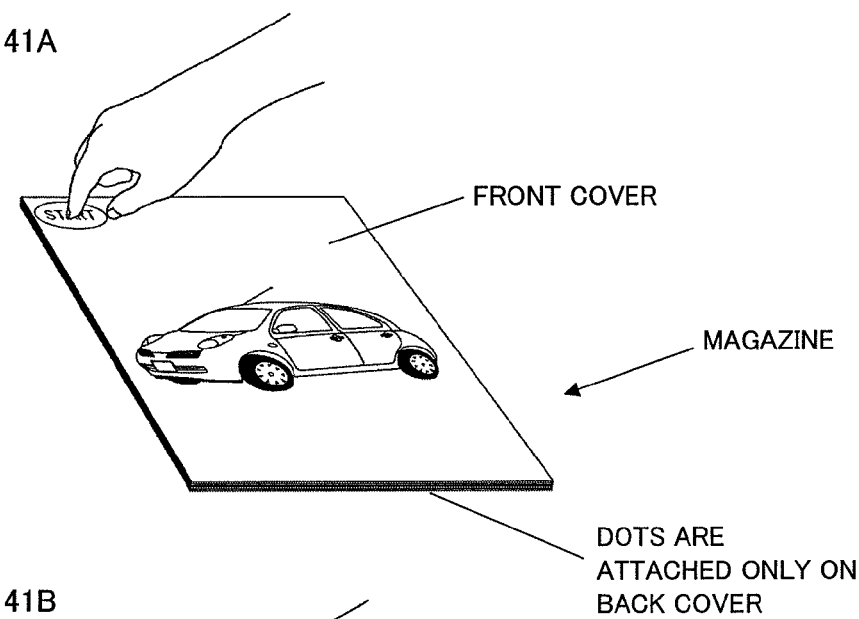
FIGS. 41A to 41C are diagrams illustrating a specific use example, when a medium to be placed on the touch panel is a booklet form (1).
Figure 41B:
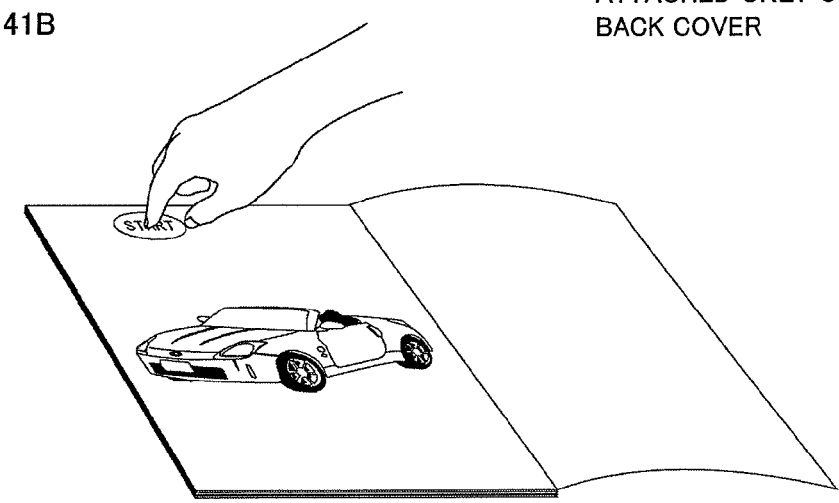
Figure 41C:
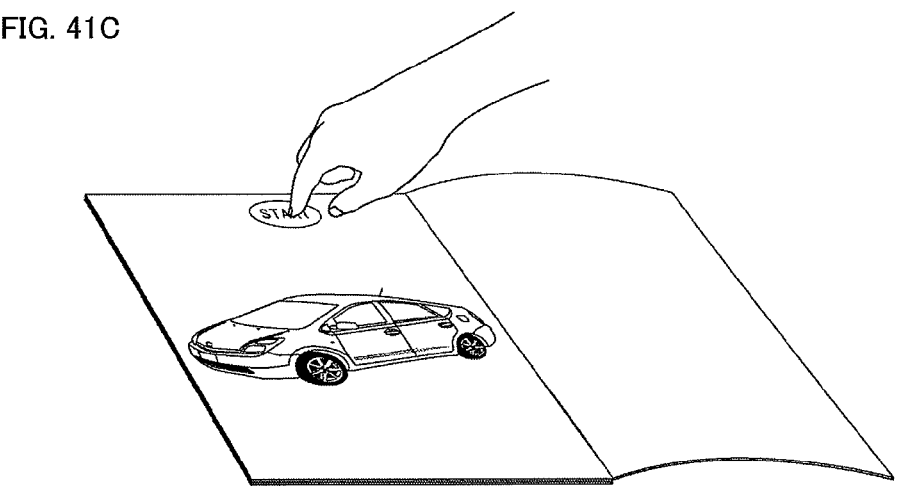

FIGS. 41A to 41C are diagrams illustrating a specific use example using a booklet as a medium.

A dot pattern is superimposed and printed on the back cover of the book. As shown in FIG. 41A, when the operator touches the "START" on the upper portion of the front cover, information about the car drawn on the front cover is displayed on the display device. "START" is printed on the upper portion of each page, and shifted page by page, as shown in FIGS. 41B and 41C. Therefore, when a "START" is touched, the page open is recognized. When a picture, a photograph, or a symbol on that page is touched, a corresponding Web page, video, or the like is displayed on the display device.

Figure 42:
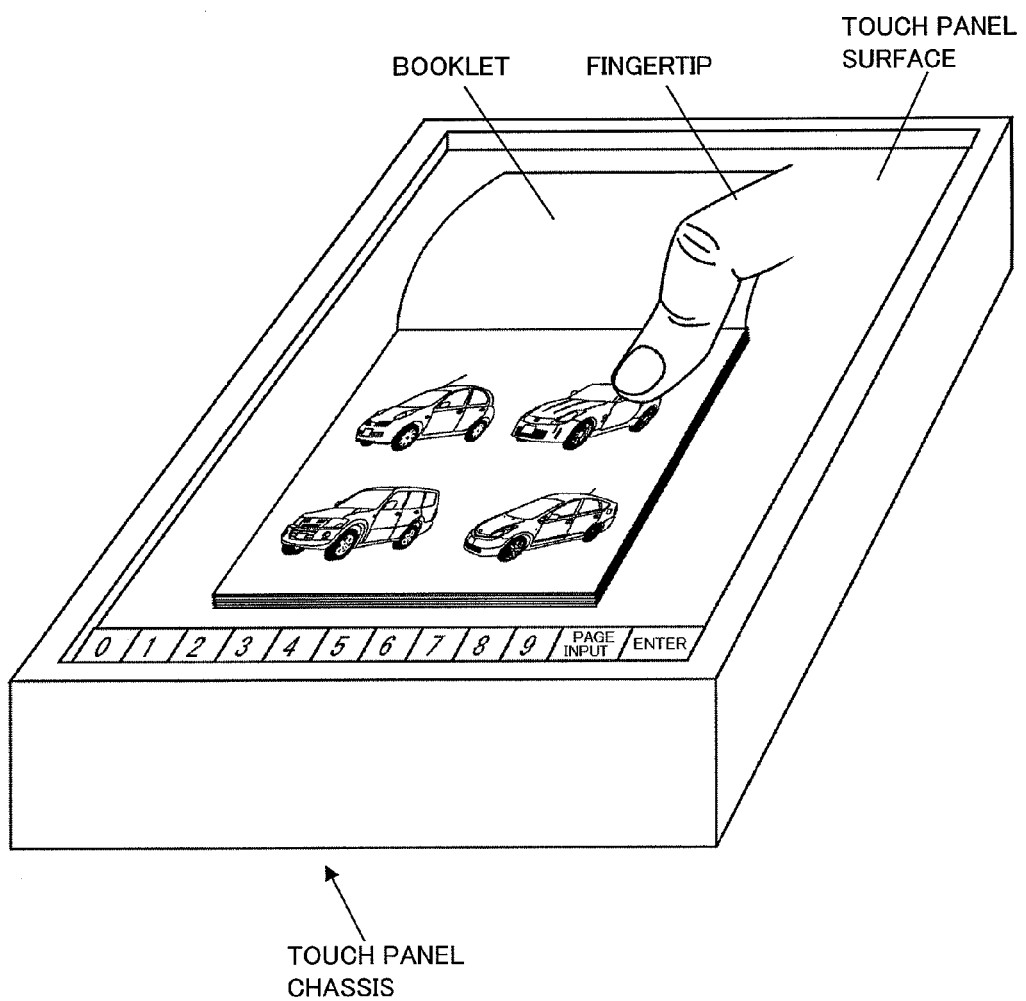
FIG. 42 is a diagram illustrating a specific use example, when a medium to be placed on the touch panel is a booklet form (2).

FIG. 42 is a diagram illustrating a specific use example using a notepad-like booklet as a medium.

In this specific use example, the booklet is formed to be flipped upward.

A dot pattern is superimposed and printed on the back cover of the booklet. The operator touches "PAGE INPUT" displayed on the touch panel and then touches a number to enter the page currently open. When entering of the number is completed, the operator touches "ENTER," then touches a picture, photograph, symbol of the page, a corresponding Web page, video, or the like is output on the display device.

Figure 43:
FIG. 43 is a diagram illustrating a specific use example of a card, when the card is used as a card for a questionnaire.

FIG. 43 is a diagram when the card is used as a questionnaire sheet.

This specific use example is a questionnaire to determine the optimum goods for an operator. A piece of goods which is a subject for the questionnaire is displayed on the upper portion of the card (in this case, moisturizer). The operator answers to the questions by touching "YES" or "NO." The answers of the operator are displayed on the display device. When the answering finishes, "DETERMINE" is touched. The operator touches "CANCEL" and answers once again in order to change an answer. As a result, a cosmetic optimum for the operator and the usage thereof is introduced.

Figure 44:
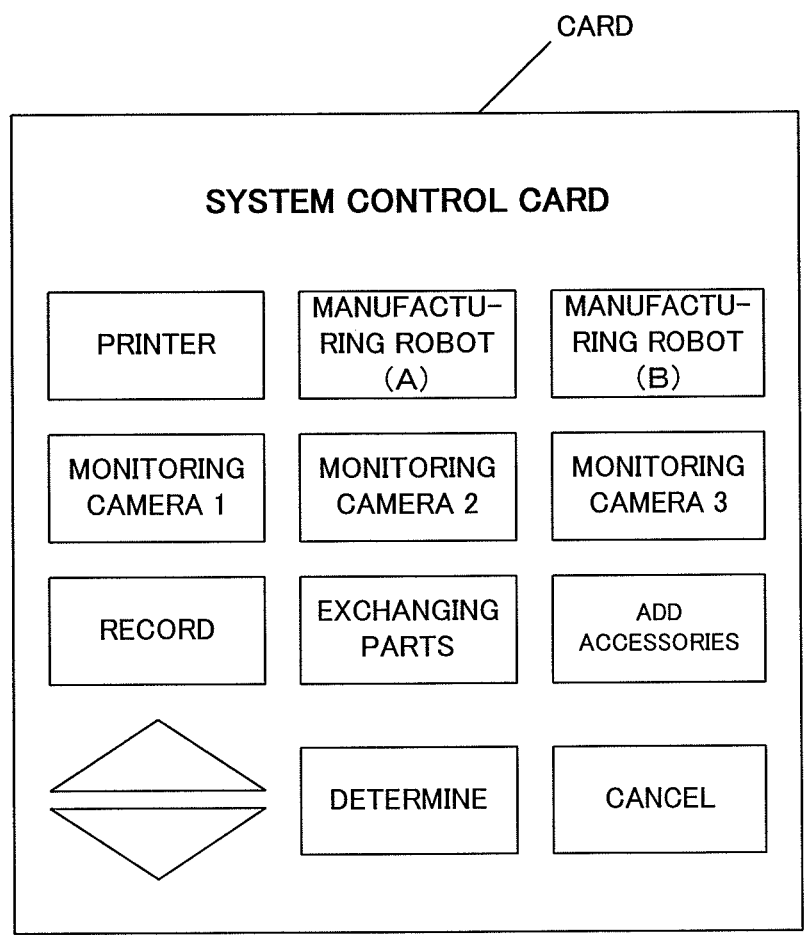
FIG. 44 is a diagram illustrating a specific use example of a card, when the card is used as a card for controlling a system.

FIG. 44 is a diagram when the card is used as a card for controlling a system.

This card is used to control a machine and the like at a factory. For example, an operator touches "MANUFACTURING ROBOT (A)" and touches instructions such as "EXCHANGE PARTS" to control a manufacturing robot. A complicated maneuvering was required to date for controlling of manufacturing machines and robots. However, with this method, they can be controlled easily by preparing cards for each purpose.

Figure 45:
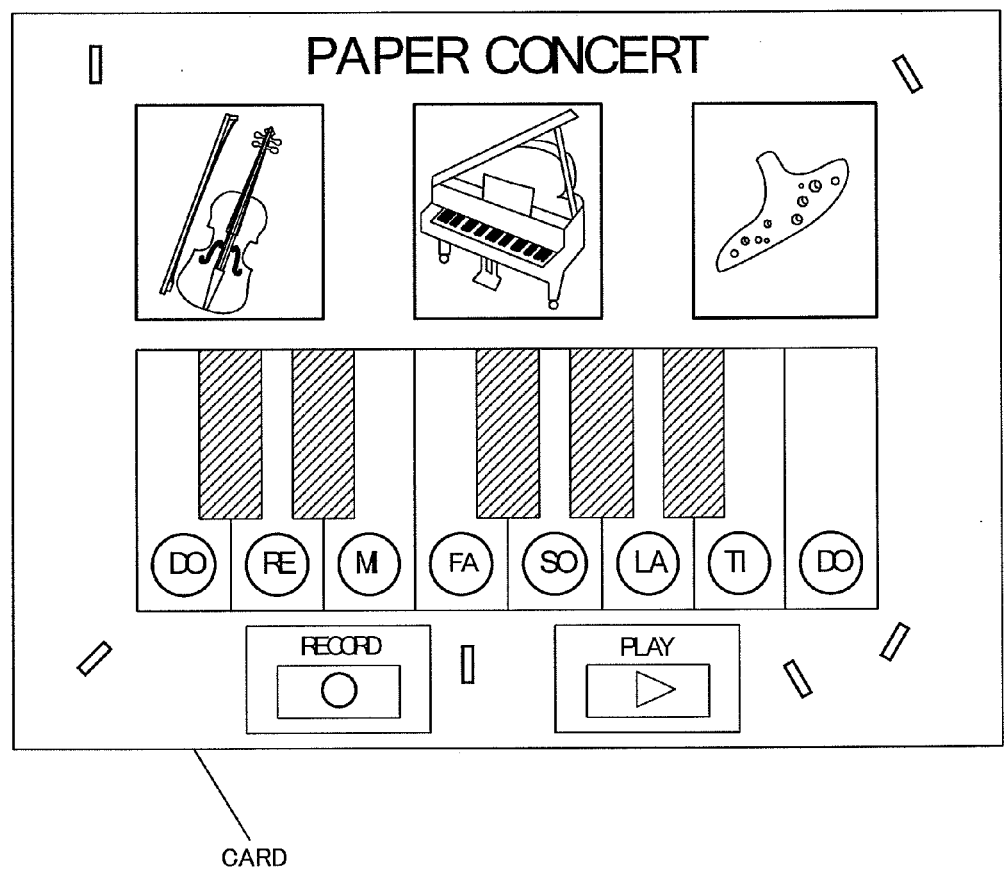
FIG. 45 is a diagram illustrating a specific use example of a card, when the card is used as a card for playing music.

FIG. 45 is a diagram when the card is used as a card for playing music.

An operator first touches any one of the instrument pictures (in this case, a violin, piano, and ocarina). Next, the operator touches a picture of a keyboard. As a result, sound corresponding to the touched key is generated in a timbre of the selected instrument. This enables the operator to play music. Also, by touching "RECORD" before touching the keyboard, the music played is recorded. Touching "PLAY" playbacks the music played.

FIGS. 46A and 46B are a modification example of the card as a medium. This card, as a mouse card, can realize the same function as a mouse as an auxiliary input device of a general-use computer.

That is, on a surface of the mouse card, there printed icons of a right click button and left click button corresponding to the click buttons of a mouse. Further, icons of scroll buttons "UP," "DOWN," "LEFT," and "RIGHT" are printed to scroll the screen.

The card is provided with a mouse-pad region. The screen displayed may be controlled by moving a fingertip within this mouse-pad region.

Further, a dot pattern is printed on the back surface of the mouse card, code values and coordinate values are patterned in a predetermined algorithm (described in FIGS. 4-11D).

Such mouse card can be loaded on a touch panel chassis with a loading slot as shown in FIGS. 26A and 26B to function as an auxiliary input device such as a mouse or a controller.

In this way, if a structure in which a card is fixed on the touch panel surface is formed by equipping a loading slot, position relations between the touch panel and the card is determined. Therefore, only code values are required as information obtained from the dot pattern on the back surface of the card.

Further, FIG. 46B shows a mouse card similar to the above-described card, but suited to a touch panel chassis with relatively wider stage surface. An image displayed on the stage surface or an image displayed on other display device can be controlled by moving the mouse card up, down, left, or right.

It should be noted that specific use examples of the card or medium placed on the touch panel chassis or stage chassis are not limited to the above. A variety of specific use examples may be, of course, considered.

Figure 47:
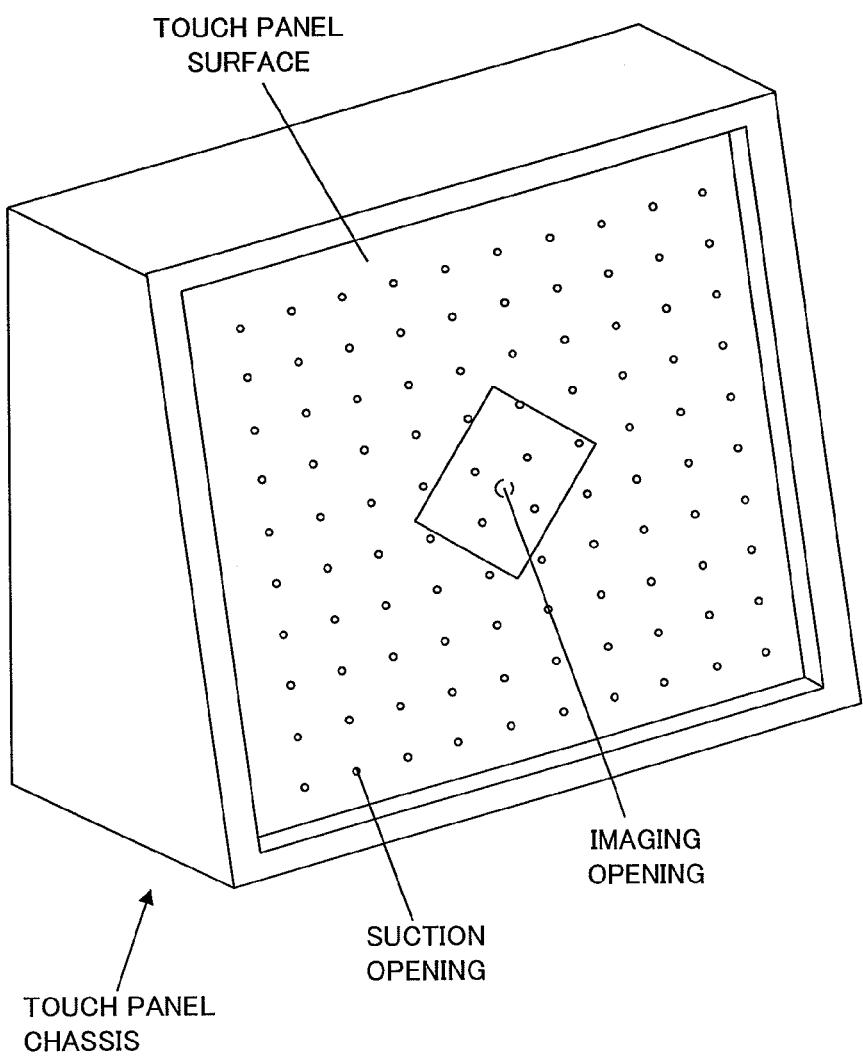
FIG. 47 is an explanatory diagram illustrating a modification example of a touch panel chassis of the present invention, and a diagram showing a touch panel chassis having suction openings.

FIG. 47 shows a standing-type touch panel chassis.

The structure of this standing-type touch panel chassis is almost the same as the one of the touch panel shown in FIGS. 12 and 48A to 49B, yet features suction openings disposed in matrix form in the vicinity of the imaging opening over the entire panel. A vacuum suction pump (not shown) is provided in the touch panel chassis, and forms a negative pressure space in the touch panel chassis. The vacuum suction pump is activated by an instruction signal from a control unit (CPU). When a card is placed in the vicinity of the imaging unit, a camera provided inside the imaging opening detects a change in light, and the control unit (CPU) activates the vacuum suction pump and causes the vacuum suction pump to start vacuum suctioning so that the back surface of the card comes in close contact with the touch panel.

Accordingly, disposing a vacuum suction opening ensures a card to be fixed on a touch panel, even with the standing-type touch panel.

Figure 48A:
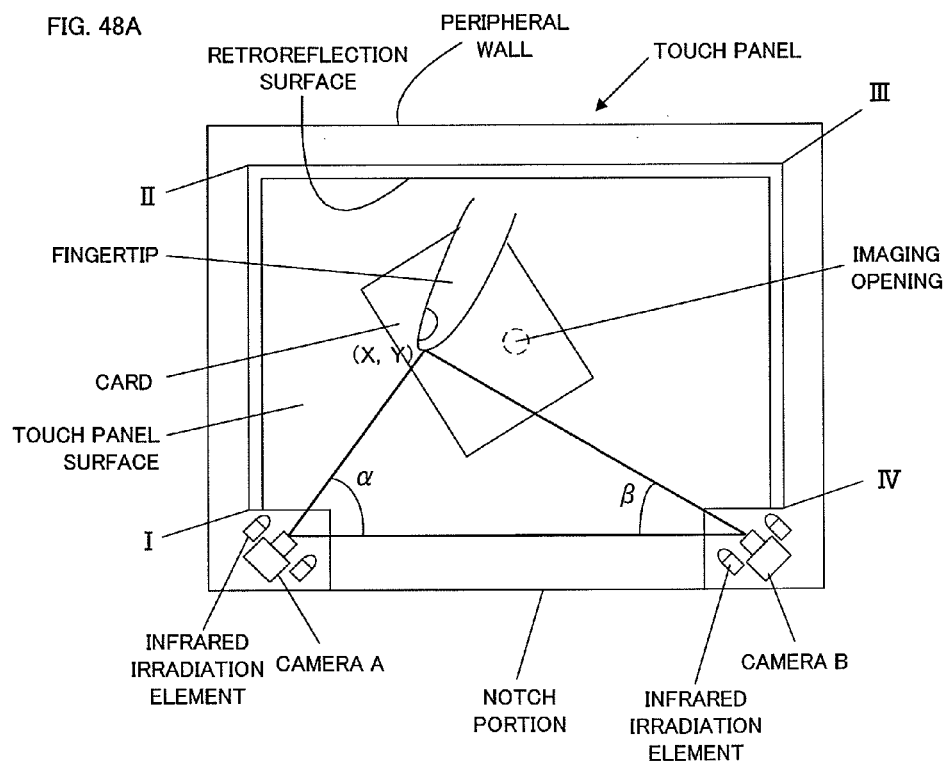
FIGS. 48A and 48B are explanatory diagrams illustrating another embodiment of a touch panel (1).

FIG. 48A shows another embodiment of a touch panel (coordinate recognition unit).

Specifically, a pair of infrared imaging devices (camera A and camera B), which allows a stage to function as a coordinate recognition unit, is provided on both inner ends of one side of a peripheral wall of the touch panel.

XY coordinates of a fingertip of a player/operator, a pen, or a three dimensional object on the touch panel or stage can be recognized by the control unit by analyzing an image captured by these infrared imaging devices.

Further, one side of the peripheral wall is a notch portion, which facilitates a card as a medium to be retracted from the stage or touch panel.

On both sides of the cameras A and B, infrared irradiation elements are provided so that the cameras capture reflected light of the infrared rays irradiated from the infrared irradiation elements. Since the cameras, although not shown, are able to capture this reflected light, these cameras A and B are provided with an IR filter respectively.

A retroreflection surface is configured in the inner surface of the peripheral wall, which has a feature of reflecting infrared rays in the same direction as the incident infrared rays.

Figure 48B:
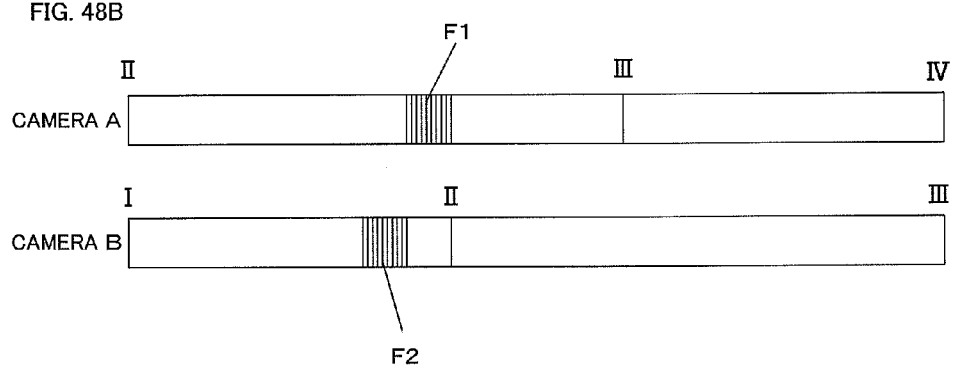

FIG. 48B shows captured images of the cameras A and B. If a fingertip is placed on the touch panel or stage surface, the images of such part F1 and F2 (fingertips) are captured as reflected light different from other part. Accordingly, XY coordinates of a fingertip on the touch panel or stage surface can be calculated by analyzing the images of both cameras A and B.

That is, an angle α can be computed by the recognition of the F1 location based on the captured image of the camera A and an angle β can be computed by the recognition of the F2 location based on the captured image of the camera B, thus, coordinate values (X, Y) can be computed.

Further, the location may be recognized by detecting the difference between an image when such fingertip does not exist on the touch panel or stage surface and an image when touched by a fingertip.

Figure 49A:
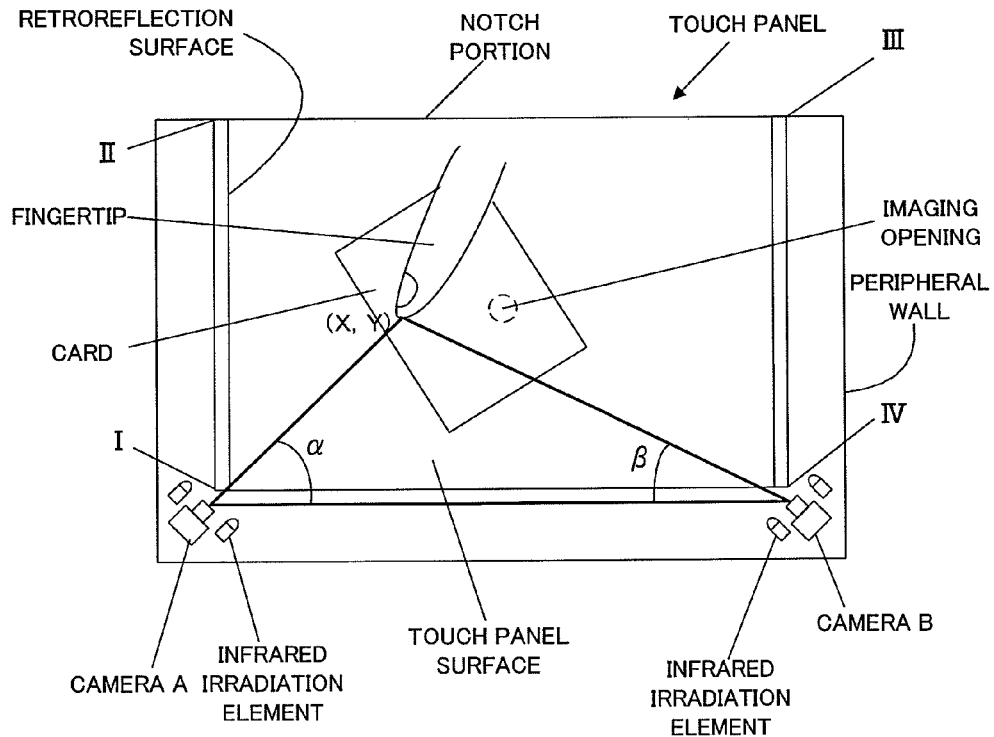
FIGS. 49A and 49B are explanatory diagrams illustrating another embodiment of a touch panel (2).
Figure 49B:
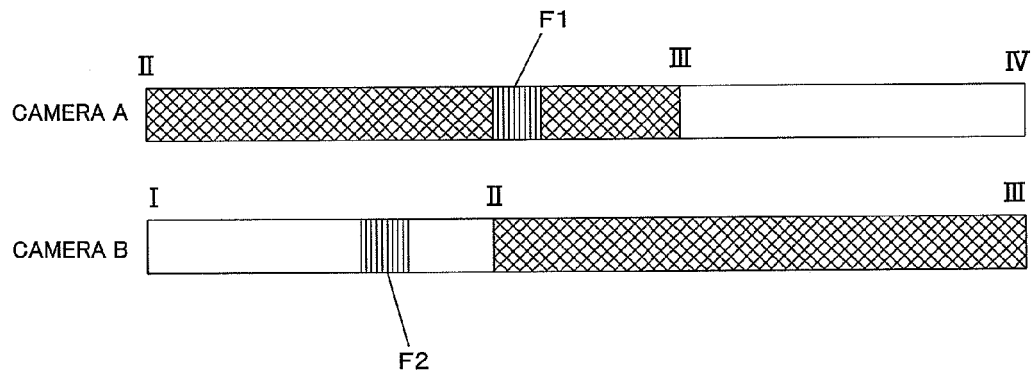

FIGS. 49A and 49B have a structure nearly the same as FIGS. 48A and 48B, yet are different in the fact where a notch portion is provided on upper one side of a peripheral wall in FIGS. 49A and 49B, while FIGS. 48A and 48B have the notch portion on lower side thereof.

In this way, regardless of the notch portion existing in the image fields of the cameras A and B, if a reflected image of the notch portion as an initial image is obtained in advance as a reference image, a deference can be detected from the captured image when touched by a fingertip, the XY coordinates of the fingertip can be easily calculated.

INDUSTRIAL APPLICABILITY

The present invention may be used as an input instruction device for a game device whose card is placed on a stage surface thereof, or a computer whose card has various functions.

What is claimed is:

1. An information processing device comprising:
    a touch panel chassis having a touch panel on at least one surface thereof, the touch panel having a medium, on which a plurality of dot patterns each of which defines a coordinate value and a code value are printed by abutting one another in vertical and horizontal directions, placed on the touch panel with a surface on which the dot pattern is printed facing the touch panel;
    a coordinate recognition unit for recognizing, as coordinate information, a touching position of a player/operator's fingertip or a position of a pen or a three dimensional object placed on the medium;
    an imaging unit for imaging the dot pattern of a region where at least one of the coordinate values and code values are defined on the medium from a back surface side of the touch panel via an imaging opening disposed to face upward at a predetermined location in a vicinity of a surface of the touch panel in the touch panel chassis; and
    a control unit for computing the coordinate values and the code values signified by the dot pattern, and an orientation of the medium from an image captured by the imaging unit, and for inputting the coordinate information that is acquired by the coordinate recognition unit;
    wherein the control unit acquires the position of the player/operator's fingertip or the position of the pen or three dimensional object, based on the coordinate values and code values of the dot pattern printed on the medium and the orientation of the medium, pre-set location information of the imaging opening, and the coordinate information acquired by the coordinate recognition unit.

2. The information processing device according to claim 1, wherein the dot pattern printed on the medium has at least the code values, and the medium is fixed at a predetermined location and orientation on the touch panel,
    wherein the control unit calculates where on the medium a placing of the player/operator's fingertip, an operation, or the three dimensional object is performed, based on the code values of the medium and the coordinate information from the coordinate recognition unit, and the control unit causes the output unit to output the multimedia information which differs depending on the location on the medium calculated.

3. The information output processing device according to claim 1, wherein irradiation light emitted from the irradiation unit is infrared light,
    dots of the dot pattern are printed on the medium with ink that absorbs infrared light, the infrared light emitted from the irradiation unit irradiates the medium through the imaging opening, the infrared light is reflected off an area of the medium other than an area where the dots are printed, the reflected infrared light is captured by the imaging unit, and
    the control portion calculates the coordinate values and code values signified by the dot pattern and the orientation of the medium based on an image obtained by capturing the reflected infrared light off the medium by the imaging unit.

4. The information processing device according to claim 1, further having:
    a peripheral wall on a periphery of the surface of the touch panel; and
    a notch portion on part of the peripheral wall so that a medium on the surface of the touch panel can be retracted from the surface of the touch panel.

5. The information processing device according to claim 4, further having:
    one or a plurality of infrared irradiation elements and one or a plurality of light-receiving elements adjacently disposed one after another on one side of the peripheral wall of the touch panel to cause the touch panel to function as a coordinate recognition unit, wherein a location in an X direction or a Y direction on the touch panel can be recognized by a reception, by the light-receiving elements, of reflected light of infrared light irradiated from the infrared irradiation elements and reflected by a player/operator's fingertip touching, or a pen or three dimensional object placed on the touch panel or on the medium on the touch panel; and
    a notch so that the medium on other side of the peripheral wall or on the touch panel can be retracted from the touch panel.

6. The information processing device according to claim 1, wherein, on sides adjacent to the one side of the peripheral wall, peripheral walls are provided on which infrared irradiation elements or light-receiving elements are disposed respectively, and the peripheral walls enable a recognition of a location in a Y direction or an X direction on the touch panel, based on the fact that the light-receiving elements on an opposed side do not receive infrared light as irradiated light irradiated from the infrared irradiation elements and blocked by a player/operator's fingertip, pen, or three dimensional object placed on the touch panel or on the medium placed on the touch panel.

7. The information processing device according to claim 1, wherein a recognition of XY coordinates of a player/operator's fingertip, pen, or three dimensional object on the touch panel is made possible by providing a pair of infrared imaging devices, which allows the touch panel to function as a coordinate recognition unit, on both inner ends of one side of a peripheral wall of the touch panel, and by having a control unit analyze images captured by each of the infrared imaging devices, wherein at least one side of the peripheral wall has the notch portion so that a medium on the touch panel can be retracted from the touch panel.

8. The information processing device according to claim 1, further having a peripheral wall on a periphery of the touch panel, embedding a coordinate recognition unit of the touch panel in the peripheral wall, and comprising a side wall curved from the touch panel so that a medium on the touch panel can be retracted from the touch panel.

9. The information processing device according to claim 1, further having a peripheral wall on a periphery of the touch panel, embedding a coordinate recognition unit of the touch panel on the peripheral wall, and providing a card loading slot on the touch panel so that a medium can be inserted or retracted therethrough.

10. The information processing device according to claim 1, wherein a selection button of multimedia information, such as a text, figure, image, motion picture, or sound information, is directly printed or a sheet on which a selection button of the multimedia information is printed is removably attached on a portion of the touch panel, and the control unit recognizes a position of a player/operator's fingertip, pen operation, or three dimensional object in relation to the selection button based on the coordinate information from the coordinate recognition unit.

11. The information processing device according to claim 1, wherein a display portion which is able to display information is configured on part of the touch panel or in the vicinity of the touch panel.

12. The information processing device according to claim 1, wherein a suction opening for absorbing a medium to the touch panel is provided, and the suction opening makes the medium in close contact with the touch panel by forming negative pressure in the suction opening.

13. The information processing device according to claim 12, wherein a negative pressure generation unit controlled by a control unit is provided in a touch panel chassis where the touch panel is provided, and the control unit, when it recognizes a location of a medium in a vicinity of the touch panel based on a change of a captured image captured by the imaging unit, instructs the negative pressure generation unit to vacuum suction from the suction opening.

14. A medium placed on the surface of the touch panel of the information processing device according to claim 1,
wherein a surface of the medium facing the touch panel when the medium is placed on the touch panel, is printed with a dot pattern where a plurality of coordinate values and code values are defined and arranged by abutting one another in vertical and horizontal directions.

15. The medium on which the dot pattern is printed according to claim 14, wherein
a number, a text, an icon, a photograph, an illustration and the like are printed in divided areas on the front surface side of the medium, which is opposite to the surface where the dot pattern is printed, and
the coordinate values and the code values of the dot pattern and the orientation of the medium, pre-set position information of the imaging unit, and the coordinate information acquired by the coordinate recognition unit, are associated one another.

16. The medium on which the dot pattern is printed according to claim 14, wherein the dots of the dot pattern are printed with ink that absorbs infrared light.

17. The information processing device according to claim 1, wherein
by defining coordinates of a predetermined position where the imaging unit is located in a touch panel coordinate system are defined as (Xs, Ys):
a position of the imaging unit on the medium imaged by the imaging unit in a coordinate system of the medium is defined as (xs, ys);

an angle between Y direction in the touch panel coordinate system and y direction in the coordinate system of the medium is defined as θ; and
the position of the player/operator's fingertip touching or the position of the pen or the three dimensional object placed on the medium is defined as (Xt, Yt) in the touch panel coordinate system,
and a touch location in the coordinate system of the medium $(x_t, y_t)$ is calculated by a following equation:

$$\begin{Bmatrix} x_t \\ y_t \end{Bmatrix} = \begin{Bmatrix} x_1 \\ y_s \end{Bmatrix} + \begin{Bmatrix} \cos\theta & \sin\theta \\ -\sin\theta & \cos\theta \end{Bmatrix} \begin{Bmatrix} X_t - X_s \\ Y_t - Y_s \end{Bmatrix}.$$

18. The information processing device according to claim 1, further comprising an irradiation unit, in the vicinity of the imaging unit, for emitting irradiation light.

19. An information processing device, comprising:
a touch panel chassis having a touch panel on at least one surface thereof;
the touch panel having a medium, on which is printed a dot pattern where at least one code value is defined, placed on the touch panel with a surface on which the dot pattern is printed facing the touch panel;
a coordinate recognition unit for recognizing a touching position of player/operator's fingertip or a position of a pen or a three dimensional object placed on a surface of the touch panel or the medium as coordinate information;
an imaging unit, disposed in a space in the touch panel chassis, for imaging a whole area where the medium is placed on the surface of the touch panel from a back side thereof, and reading the dot pattern of the medium placed at an arbitrary position on the surface of the touch panel; and
a control unit for calculating the code value signified by the dot pattern and an orientation and a position of the medium from an image captured by the imaging unit, and inputting the coordinate information acquired by the coordinate recognition unit,
wherein the control unit acquires the touching position of the player/operator's fingertip and the position of the pen or three dimensional object placed on the medium based on the code value of the dot pattern, the orientation and position of the medium, and the coordinate value acquired by the coordinate recognition unit.

20. The information processing device according to either claim 1 or 19, wherein, on the touch panel,
a predetermined graphic is printed with ink which transmits infrared light, or
a sheet on which the image is printed with the ink and that transmits at least infrared light or infrared and visible light is attached.

21. The information processing device according to claim 19, further comprising:
inside the touch panel chassis, a projection unit for projecting a motion picture or an image from a back surface side with respect to the touch panel,
wherein the control unit controls the image or the motion picture projected from the back surface side of the touch panel by the projection unit by interlocking with a touching of the player/operator's fingertip on the touch panel, or a touching of the player/operator's fingertip or the pen, or a placing of the three dimensional object on the medium, which is recognized by the coordinate recognition unit.

22. The information processing device according to claim 19, further having:
   a peripheral wall on a periphery of the surface of the touch panel; and
   a notch portion on part of the peripheral wall so that a medium on the surface of the touch panel can be retracted from the surface of the touch panel.

23. The information processing device according to claim 22, further having:
   one or a plurality of infrared irradiation elements and one or a plurality of light-receiving elements adjacently disposed one after another on one side of the peripheral wall of the touch panel to cause the touch panel to function as a coordinate recognition unit, wherein a location in an X direction or a Y direction on the touch panel can be recognized by a reception, by the light-receiving elements, of reflected light of infrared light irradiated from the infrared irradiation elements and reflected by a player/operator's fingertip touching, or a pen or three dimensional object placed on the touch panel or on the medium on the touch panel; and a notch so that the medium on other side of the peripheral wall or on the touch panel can be retracted from the touch panel.

24. The information processing device according to claim 22, wherein, on sides adjacent to the one side of the peripheral wall, peripheral walls are provided on which infrared irradiation elements or light-receiving elements are disposed respectively, and the peripheral walls enable a recognition of a location in a Y direction or an X direction on the touch panel, based on the fact that the light-receiving elements on an opposed side do not receive infrared light as irradiated light irradiated from the infrared irradiation elements and blocked by a player/operator's fingertip, pen, or three dimensional object placed on the touch panel or on the medium placed on the touch panel.

25. The information processing device according to claim 22, wherein a recognition of XY coordinates of a player/operator's fingertip, pen, or three dimensional object on the touch panel is made possible by providing a pair of infrared imaging devices, which allows the touch panel to function as a coordinate recognition unit, on both inner ends of one side of a peripheral wall of the touch panel, and by having a control unit analyze images captured by each of the infrared imaging devices, wherein at least one side of the peripheral wall has the notch portion so that a medium on the touch panel can be retracted from the touch panel.

26. The information processing device according to claim 19, further having a peripheral wall on a periphery of the touch panel, embedding a coordinate recognition unit of the touch panel in the peripheral wall, and comprising a side wall curved from the touch panel so that a medium on the touch panel can be retracted from the touch panel.

27. The information processing device according to claim 19, further having a peripheral wall on a periphery of the touch panel, embedding a coordinate recognition unit of the touch panel on the peripheral wall, and providing a card loading slot on the touch panel so that a medium can be inserted or retracted therethrough.

28. The information processing device according to claim 19, wherein a selection button of multimedia information, such as a text, figure, image, motion picture, or sound information, is directly printed or a sheet on which a selection button of the multimedia information is printed is removably attached on a portion of the touch panel, and the control unit recognizes a position of a player/operator's fingertip, pen operation, or three dimensional object in relation to the selection button based on the coordinate information from the coordinate recognition unit.

29. The information processing device according to claim 19, wherein a display portion which is able to display information is configured on part of the touch panel or in the vicinity of the touch panel.

30. A medium on which a dot pattern is printed, wherein
   the medium is to be placed on the surface of the touch panel according to claim 19, and
   a surface of the medium, which faces the touch panel when the medium is placed on the touch panel, is printed with the dot pattern that defines at least one code value.

31. The medium on which the dot pattern is printed according to claim 30, wherein
   a number, a text, an icon, a photograph, an illustration and the like are printed in divided areas on the front surface side of the medium, which is opposite to the surface where the dot pattern is printed, and
   the code value of the dot pattern, and the orientation and position of the medium, and the coordinate information acquired by the coordinate recognition unit, are associated one another.

32. The medium on which the dot pattern is printed according to claim 30, wherein the dots of the dot pattern are printed with ink that absorbs infrared light.

33. The information processing device according to either claim 1 or 19, further comprising:
   an output unit for outputting multimedia information such as a text, figure, image, motion picture, or sound information based on information from the control unit.

34. The information processing device according to claim 19, wherein
   when a width of the medium is defined as W; a height thereof, H;
   coordinates of a central position of a card in the touch panel coordinate system, acquired by the control unit, are defined as (Xc, Yc);
   an angle between Y direction in the touch panel coordinate system and y direction in a medium coordinate system that is a coordinate system of the medium is defined as θ; and
   the position of the player/operator's fingertip touching or the position of the pen or the three dimensional object placed on the medium in the touch panel coordinate system is defined as (Xt, Yt),
   the touch location $(x_t, y_t)$ in the coordinate system of the medium is calculated by a following equation:

$$\begin{Bmatrix} x_t \\ y_t \end{Bmatrix} = \begin{Bmatrix} \frac{W}{2} \\ \frac{H}{2} \end{Bmatrix} + \begin{Bmatrix} \cos\theta & \sin\theta \\ -\sin\theta & \cos\theta \end{Bmatrix} \begin{Bmatrix} X_t - X_c \\ Y_t - Y_c \end{Bmatrix}.$$

35. The information processing device according to claim 19, further comprising:
   an irradiation unit, in the vicinity of the imaging unit, for emitting irradiation light.

36. The information processing device according to claim 35, wherein
   irradiation light emitted from the irradiation unit is infrared light, the touch panel transmits the infrared light and reflection light thereof,
   dots of the dot pattern are printed with ink that absorbs infrared light on the medium, the infrared light emitted from the irradiation unit is reflected off an area of the medium other than an area where the dots are printed, the reflected infrared light is captured by the imaging unit, and the control portion calculates the code value signified by the dot pattern and the orientation and the position of the medium based on an image obtained by capturing the reflected infrared light off the medium by the imaging unit.

\* \* \* \* \*